(12) United States Patent
Steinberger et al.

(10) Patent No.: US 12,094,677 B2
(45) Date of Patent: *Sep. 17, 2024

(54) FUSE HOLDER

(71) Applicant: Wöhner Besitz GmbH, Rödental (DE)

(72) Inventors: Philipp Steinberger, Coburg (DE); Joram Masel, Küps (DE); Jonas Schwarz, Coburg (DE); Pushkar Bhalerao, Hampton, NH (US)

(73) Assignee: Wöhner Besitz GmbH, Rödental (DE)

(*) Notice: Subject to any disclaimer, the term of this patent is extended or adjusted under 35 U.S.C. 154(b) by 0 days.

This patent is subject to a terminal disclaimer.

(21) Appl. No.: 18/251,356

(22) PCT Filed: Nov. 19, 2021

(86) PCT No.: PCT/US2021/072502
§ 371 (c)(1),
(2) Date: May 1, 2023

(87) PCT Pub. No.: WO2022/109594
PCT Pub. Date: May 27, 2022

(65) Prior Publication Data
US 2023/0402244 A1    Dec. 14, 2023

Related U.S. Application Data

(60) Provisional application No. 63/116,340, filed on Nov. 20, 2020.

(51) Int. Cl.
*H01H 85/20* (2006.01)
*H01H 85/47* (2006.01)
*H01H 85/48* (2006.01)

(52) U.S. Cl.
CPC ...... *H01H 85/2045* (2013.01); *H01H 85/205* (2013.01); *H01H 85/47* (2013.01); *H01H 85/48* (2013.01); *H01H 85/203* (2013.01); *H01H 2085/2055* (2013.01); *H01H 2085/209* (2013.01)

(58) Field of Classification Search
CPC ............. H01H 85/203; H01H 85/2045; H01H 85/205; H01H 85/22; H01H 85/47; H01H 85/48; H01H 2085/2055; H01H 2085/209
See application file for complete search history.

(56) References Cited

U.S. PATENT DOCUMENTS 9,106,033 B2    8/2015  Buettner et al.
9,991,611 B1*   6/2018  Jameson ................ H01H 85/04
(Continued)

*Primary Examiner* — Jacob R Crum
(74) *Attorney, Agent, or Firm* — Maginot, Moore & Beck, LLP

(57) ABSTRACT

A fuse holder provides a safe device for connecting fuses to a three-phase busbar device. Each phase includes a corresponding load conductor and line conductor mounted within a housing. A mechanical lock is provided for each phase that locks a knife of the fuse to one of the conductors for the phase. In a further aspect, the fuse knives are frictionally locked within the housing. In both the mechanical lock and frictional lock, a release mechanism is provided that can be activated by a screwdriver to release the fuse knives from the fuse holder. In another aspect, certain conductors are provided with heat dissipation wings that contact the housing to dissipate heat generated by current flowing through the conductor.

16 Claims, 44 Drawing Sheets

(56) References Cited

U.S. PATENT DOCUMENTS

| | | |
|---|---|---|
| 10,700,464 B2 | 6/2020 | Steinberger |
| 2013/0084726 A1* | 4/2013 | Gharabegian .......... H01R 9/265 |
| | | 439/212 |
| 2014/0273640 A1* | 9/2014 | Brakefield ............. H01H 85/22 |
| | | 439/620.29 |
| 2015/0124379 A1* | 5/2015 | Bruchmann ............. H02B 1/21 |
| | | 361/624 |
| 2015/0244123 A1* | 8/2015 | Steinberger .......... H01R 25/145 |
| | | 439/119 |
| 2015/0357772 A1* | 12/2015 | Bruchmann ............. H02B 1/21 |
| | | 439/122 |
| 2017/0040777 A1* | 2/2017 | von zur Muehlen .. H01R 31/02 |
| 2019/0115676 A1* | 4/2019 | Steinberger ............ H02B 1/052 |

* cited by examiner

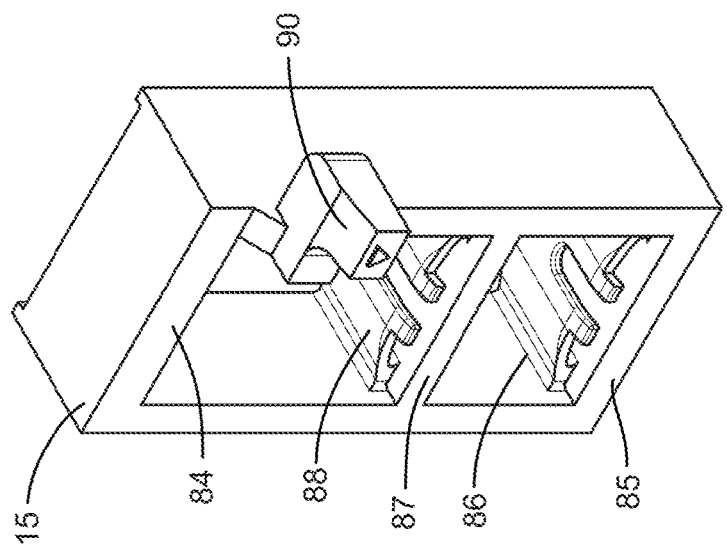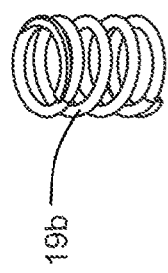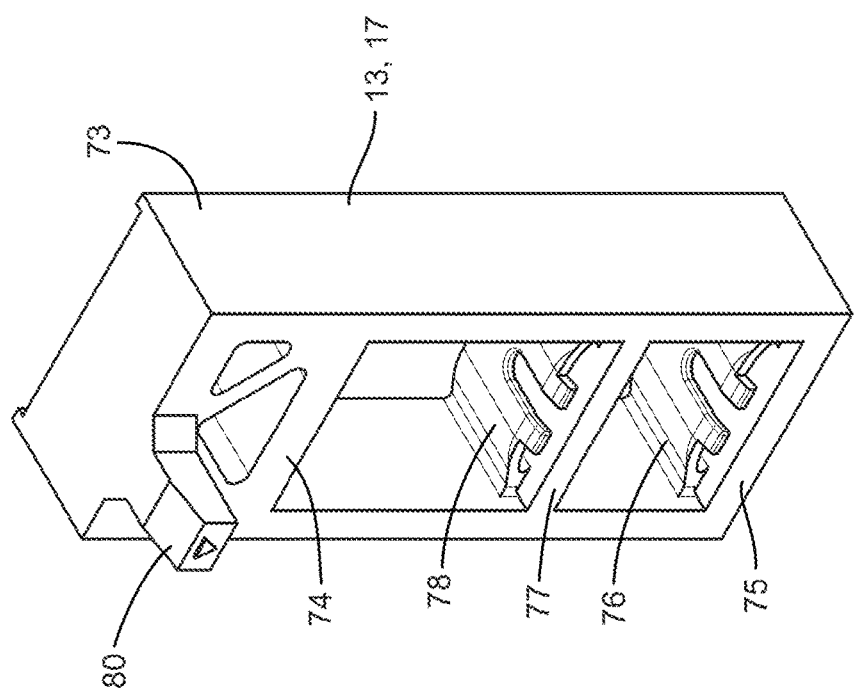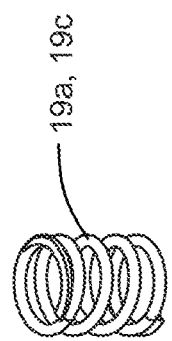
FIG. 7
FIG. 6

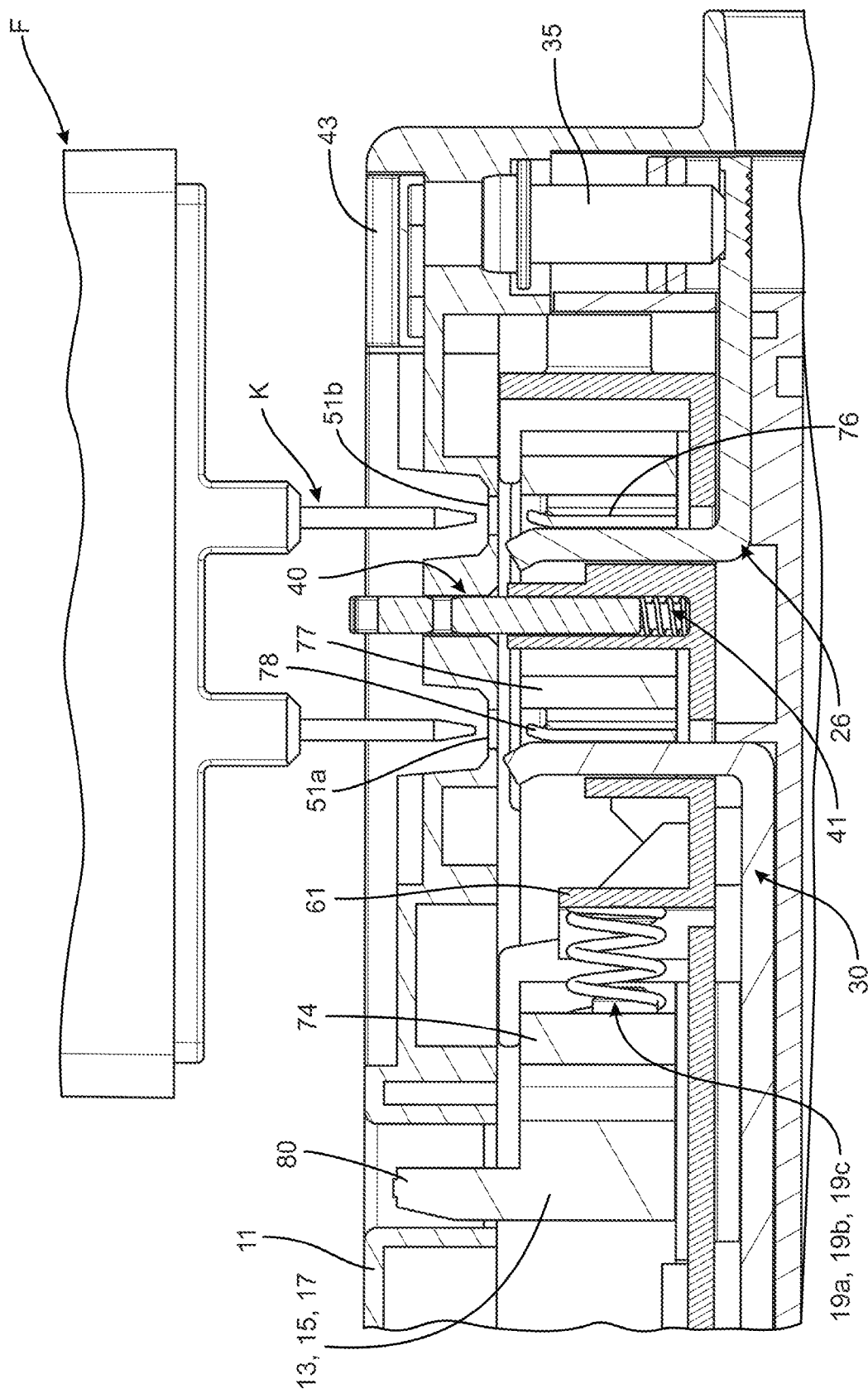

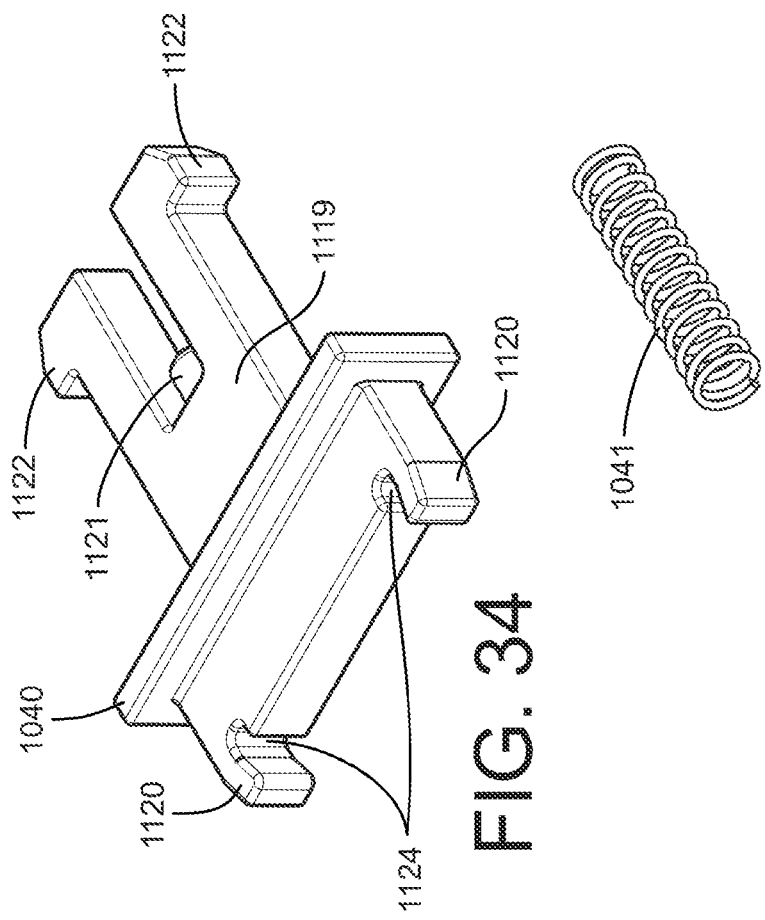
FIG. 34
FIG. 35
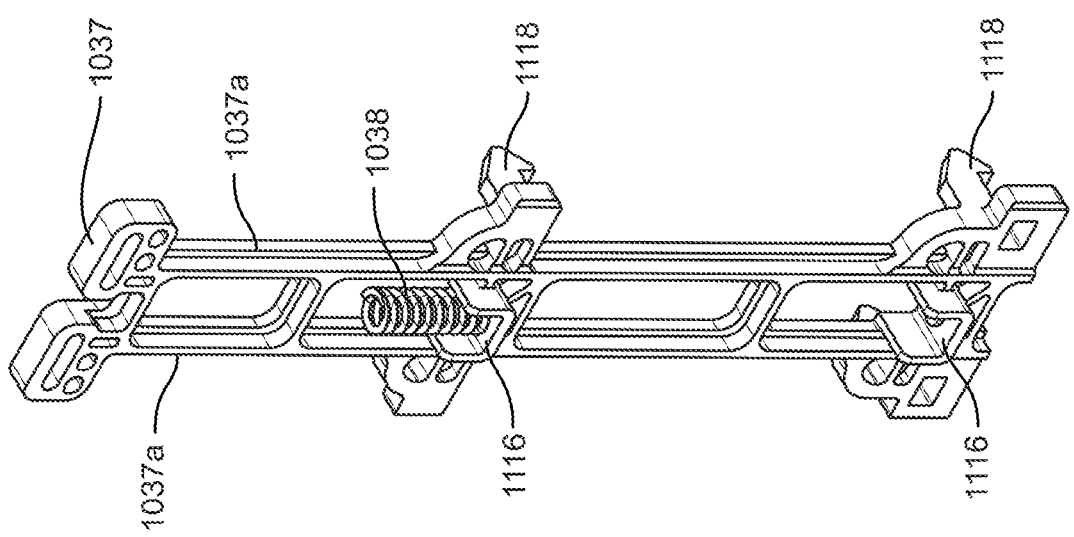
FIG. 33

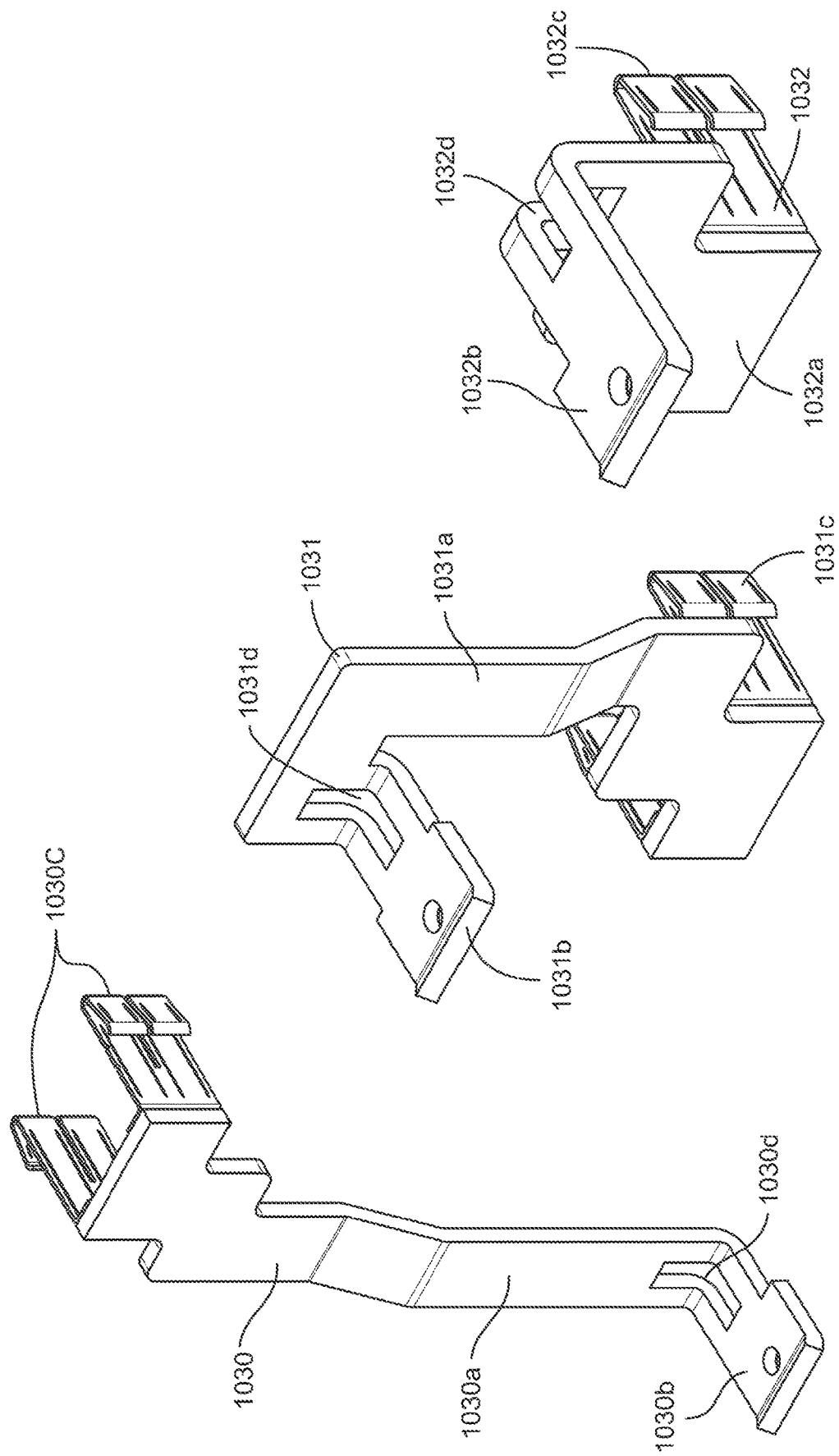

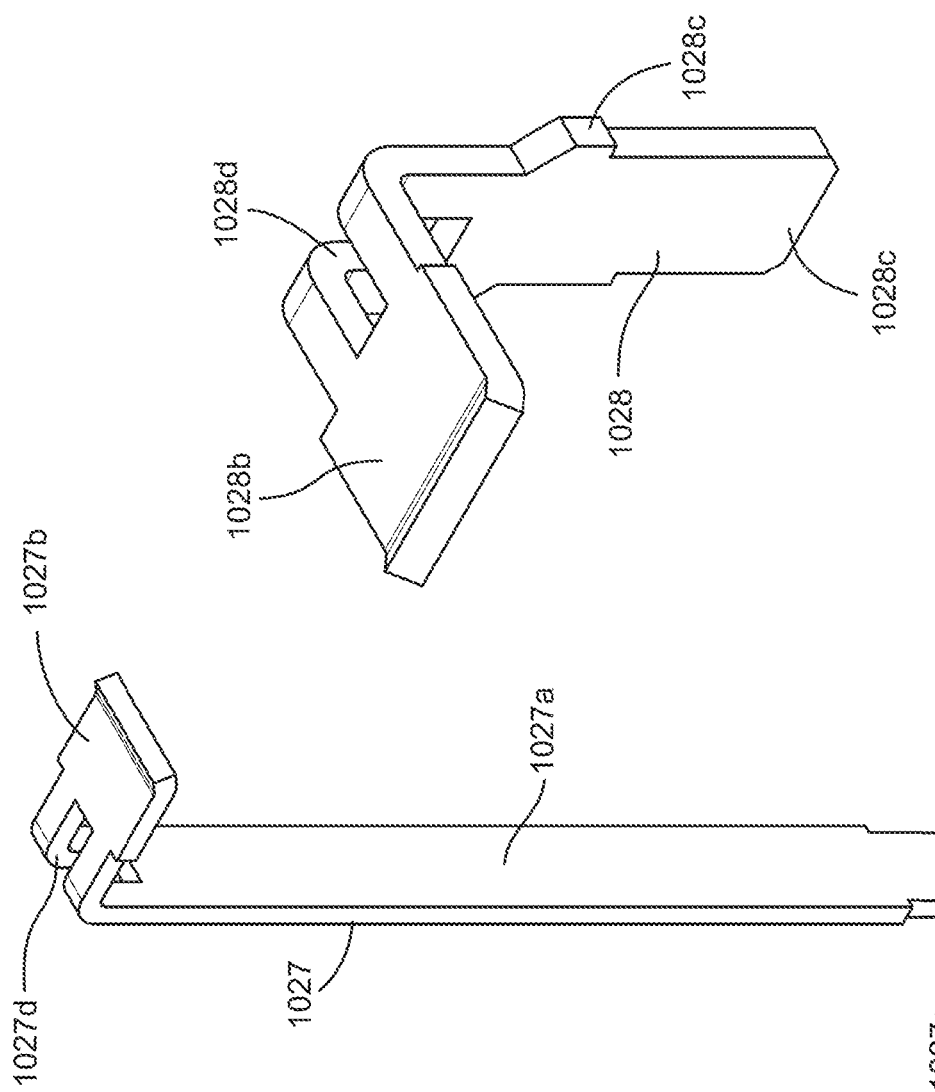
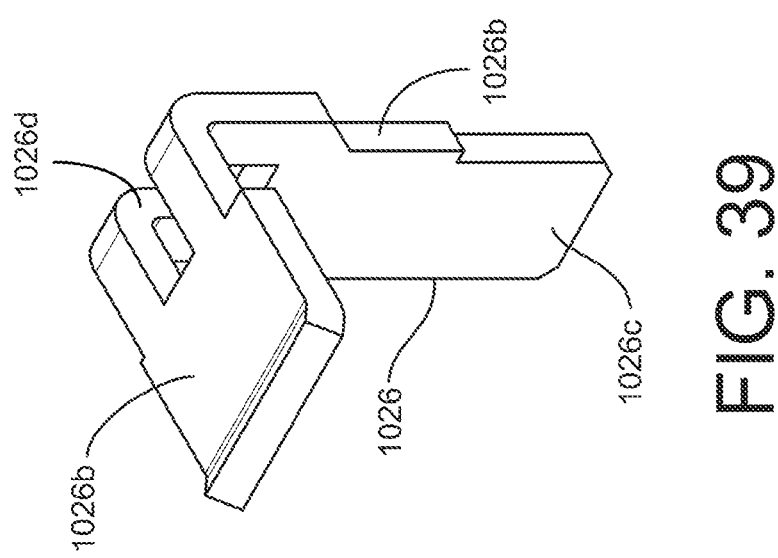
FIG. 41
FIG. 40
FIG. 39

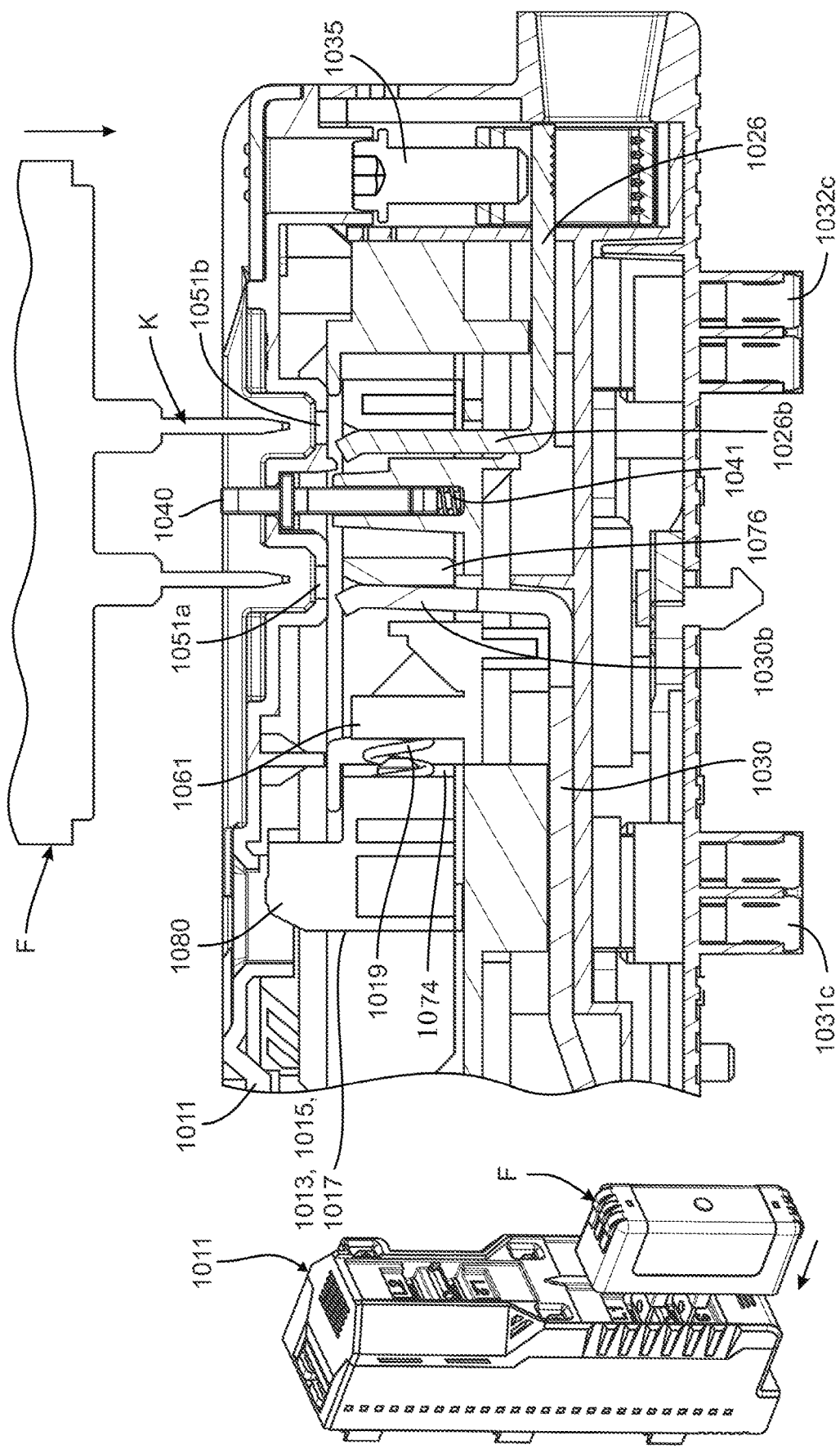

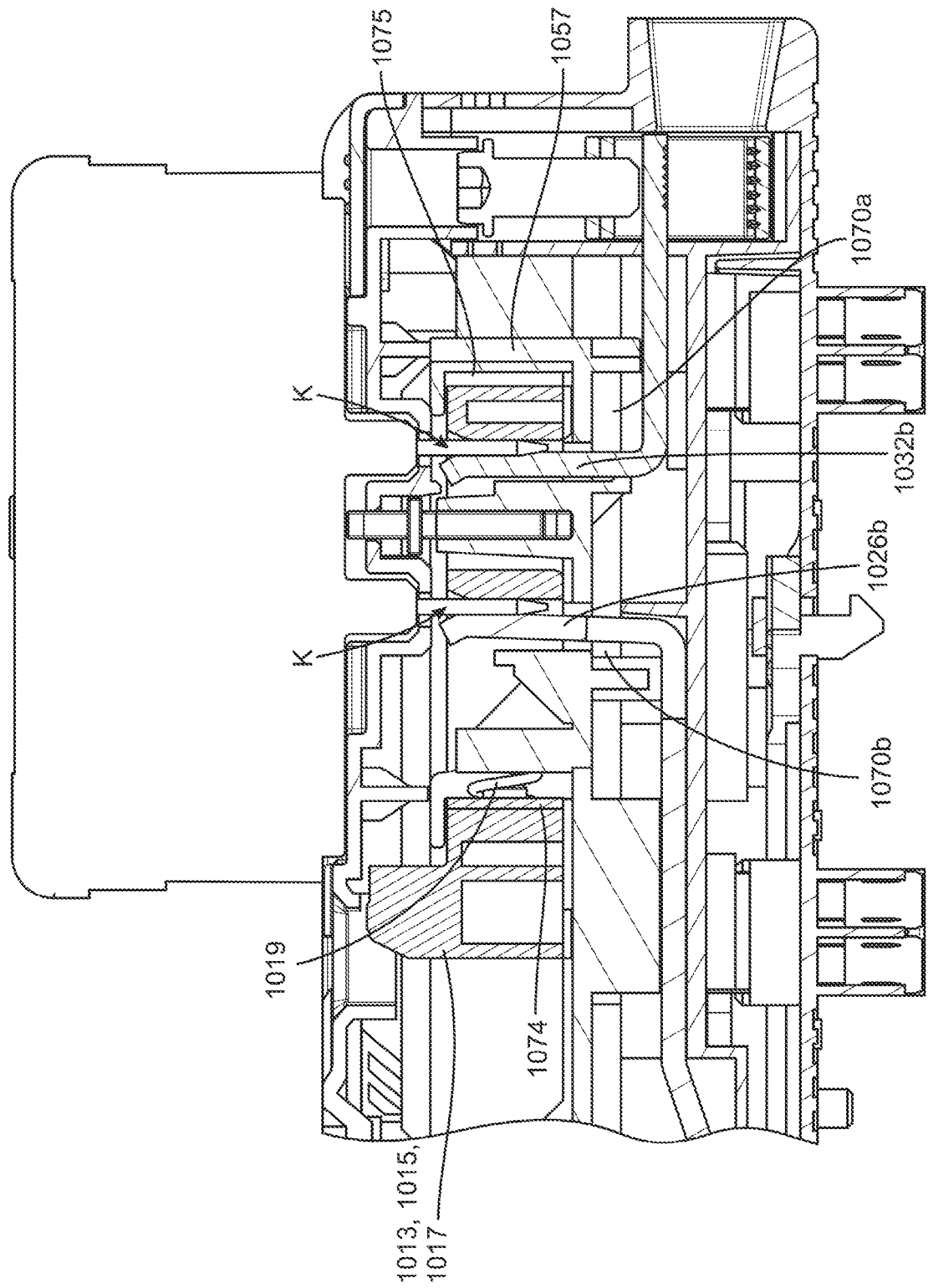

FUSE HOLDER

PRIORITY CLAIM

This application is a utility filing from and claims priority to U.S. Provisional Application No. 63/116,340, filed on Nov. 20, 2020, the entire disclosure of which is incorporated herein by reference.

BACKGROUND

The present disclosure relates to a fuse holder, and particularly to a three-pole finger-safe holder for Class CF fuses.

U.S. Pat. No. 10,700,464 (the '464 Patent), the disclosure of which is incorporated herein by reference, discloses a device for a busbar system that includes electrical connection contacts which are configured as passable through feed-through openings of a contact protection base plate module of the busbar system. The electrical contacts are insertable into uniformly spaced contact openings located below the feed-through openings of busbar modules provided inside the base plate module for producing a direct electrical and mechanical connection to the busbar modules. Various electrical modules, such as a motor control unit, display unit and fuse switch disconnector, can be mounted to the busbar system.

The busbar device disclosed in the '464 Patent provides for simple mounting and removing of various electrical devices to a busbar, while providing a high degree of contact protection. There is a need for a fuse holder that provides similar benefits and protections.

SUMMARY OF THE DISCLOSURE

A fuse holder is disclosed herein that incorporates features to provide a finger-safe device for connecting a three-pole fuse to a busbar device. The fuse holder includes a housing containing electrical conductors for connecting the fuse knives to the busbar device and to load terminals. In one feature, the housing includes an engagement mechanism configured for releasably engaging the fuse holder, with fuses mounted therein, to a busbar device. In another feature, the fuse holder includes a locking mechanism that locks the knife or knives of a fuse within the fuse holder. In one embodiment, the locking mechanism is a mechanical lock in which the knife and at least one conductor includes a hole that receives a spring-biased needle to prevent removal of the fuse. A release mechanism is provided that allows use of a screwdriver to displace the needle out of the holes in the knife and conductor.

In another feature of the disclosed fuse holder, certain conductors of within the fuse holder include wings that are arranged to contact a surface of the fuse holder housing. The wings are configured to conduct away heat generated by current flowing through the conductor, in particular conducting the heat to the housing where the heat can be dissipated by convection with the outside atmosphere. The housing material has a high thermal conductivity to facilitate extraction and dissipation of heat from the fuse holder.

In another embodiment, the fuse holder includes a mechanism that automatically ejects the fuse from the fuse holder a sufficient distance to break the electrical contact between the fuse knives and the copper conductors within the fuse holder. The mechanism includes a spring-biased carriage surrounding each pair of line and load conductors in which the carriage is biased to apply a force against a fuse knife introduced into the carriage to provide frictional engagement at the electrical contact between the fuse knife and the associated copper conductor. The carriage further includes a release post that allows the user to release the force on the fuse knife using a tool that leverages the release post at a safe location on the fuse holder without risk of touching the live conductors inside the fuse holder. In a further feature of the fuse holder disclosed herein, an automatic ejection element pushes the fuse away from the fuse holder once the frictional engagement between the fuse knife and conductor is released.

In a further aspect of the disclosure, the fuse holder is configured to have an optimized form factor with a minimal profile so that the fuse holder does not occupy excessive space on the busbar device. This optimized form factor is achieved, in part, by locating the three phase connections in a compact pattern, with two of the phase connections adjacent each other and the third phase connection above the other two. This arrangement of the three phase connections is achieved, in part, by the configuration of the line and load conductors housed within the fuse holder.

In another aspect, the fuse holder includes a spring-biased latch plate that allows the fuse holder to be easily engaged to a busbar device. The latch plate can be engaged to the base plate of the fuse holder so that it is out of the way of the coper conductors contained within the holder.

In yet another aspect of the disclosure, the fuse holder is designed for simplified assembly. The carriages described above can be clipped into the first front plate and the ejectors can be inserted into appropriate slots in the carriages. The line and load conductors are carried by an intermediate plate that can be readily engaged with a first front plate so that the fuse contacts of the line and load conductors are properly oriented within the carriages. The first front plate, intermediate plate and latch plate can be sandwiched between a base plate and a cover, with the base plate and cover configured to snap together.

DESCRIPTION OF THE DRAWINGS

FIG. 6 is a perspective view of a carriage for the $L_1$ and $L_3$ conductors for the fuse holder shown in FIGS. 1-2.

FIG. 7 is a perspective view of a carriage for the $L_2$ conductors for the fuse holder shown in FIGS. 1-2.

FIG. 18 is a side partial cross-sectional view of the fuse holder of the present disclosure showing a first step of receiving a fuse.

FIG. 33 is a perspective view of a latch plate for the fuse holder shown in FIGS. 23-24.

FIG. 34 is a perspective view of ejectors for the fuse holder shown in FIGS. 23-24.

FIG. 35 is a perspective view of a spring used with the ejector of FIG. 34.

FIG. 36 is a perspective view of the $L_2$ line conductor for the fuse holder shown in FIGS. 23-24.

FIG. 37 is a perspective view of the $L_1$ line conductor for the fuse holder shown in FIGS. 23-24.

FIG. 38 is a perspective view of the $L_3$ line conductor for the fuse holder shown in FIGS. 23-24.

FIG. 39 is a perspective view of the $L_1$ load conductor for the fuse holder shown in FIGS. 23-24.

FIG. 40 is a perspective view of the $L_2$ load conductor for the fuse holder shown in FIGS. 23-24.

FIG. 41 is a perspective view of the $L_3$ load conductor for the fuse holder shown in FIGS. 23-24.

FIG. 42A is a perspective view of a fuse being inserted into the fuse holder of FIGS. 23-24.

FIG. 42B is a side partial cross-sectional view of the fuse holder of the present disclosure showing a first step of receiving a fuse.

FIG. 43 is a side partial cross-sectional view of the fuse holder shown in FIG. 42B showing a second step of receiving a fuse.

DETAILED DESCRIPTION

Figure 1:
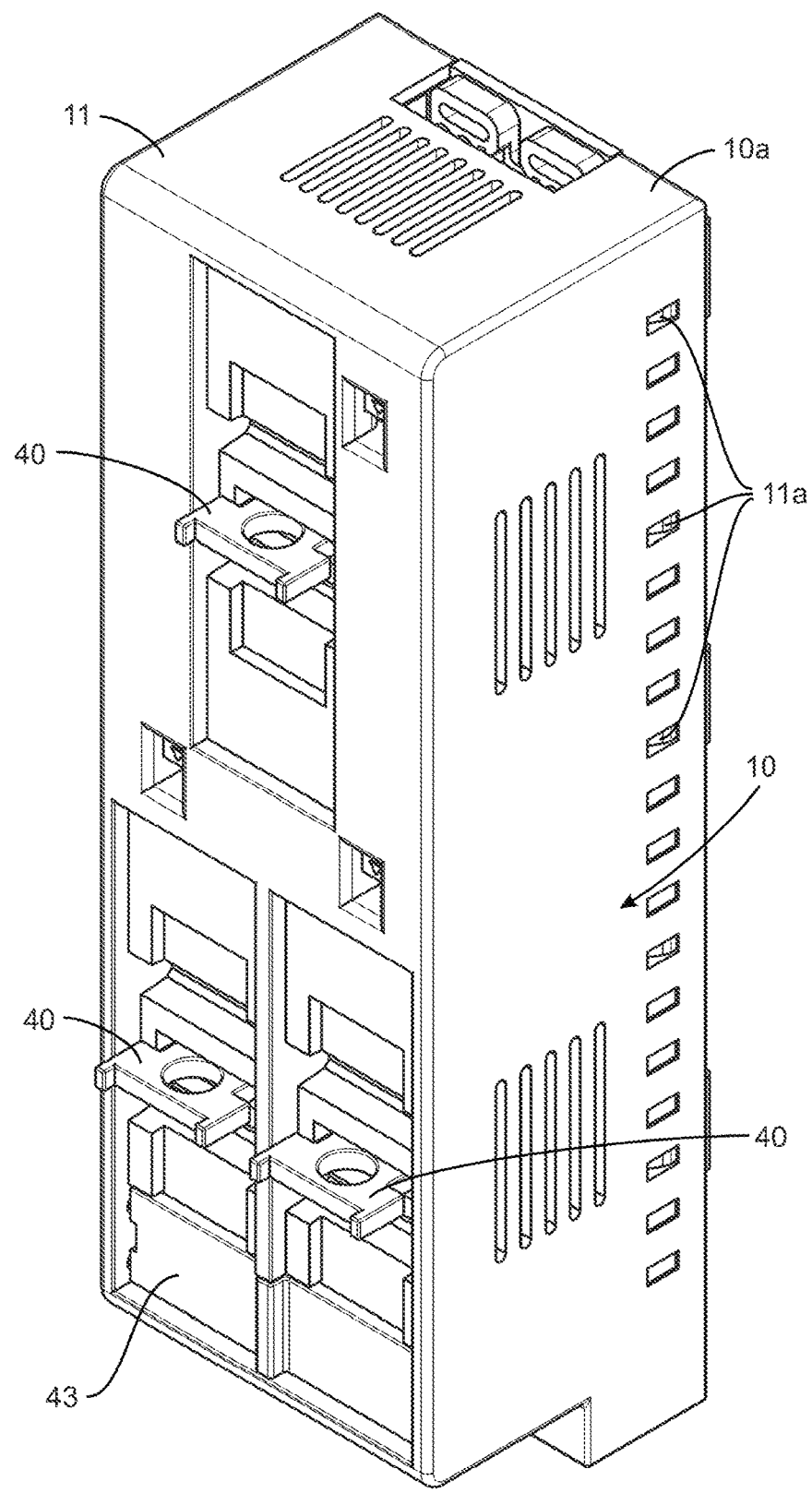
FIG. 1 is perspective view of a fuse holder according to the present disclosure.

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles disclosed herein as would normally occur to one skilled in the art to which this disclosure pertains.

Figure 2:
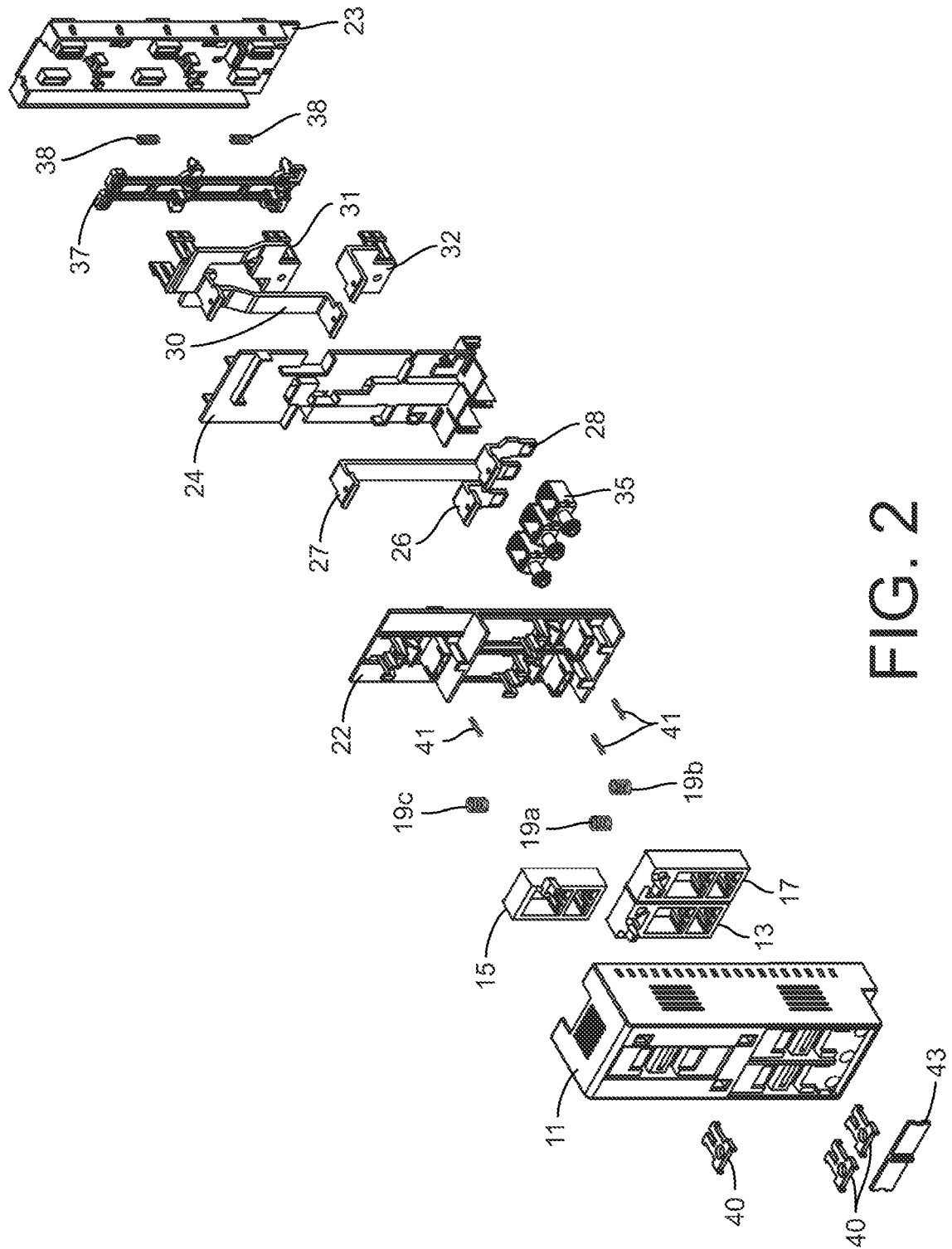
FIG. 2 is an exploded view of the fuse holder shown in FIG. 1.

A fuse holder 10 according to the present disclosure is shown in FIGS. 1-2. The holder includes a housing 10a formed by a cover 11 mounted to a base plate 23 in a conventional manner. In one embodiment, the cover can be removably mounted by a snap latch engagement 11a between openings in the cover and projections on the base plate. In the assembled ready-to-use configuration shown in FIG. 1, the holder 10 includes three ejectors 40 that are depressed when a fuse is mounted to the holder, and a terminal cover 43 that encloses terminals for electrical connection to the load copper conductors within the holder.

As shown in the exploded view of FIG. 2, the cover and base plate encloses the components of the fuse holder with a plate arrangement that supports the load conductors 26-28 and the line conductors 30-32. The fuse holder further includes carriages 13, 15 and 17 corresponding to respective $L_1$, $L_2$, $L_3$ copper conductors 26-28 and 30-32. As described in more detail herein, the carriages are movably supported on a first front plate 22 of the plate arrangement so that the carriages can shift relative to the connecting knife of a fuse engaged to the fuse holder. The load conductors 26-28 are supported on a second intermediate plate 24 of the plate arrangement in electrical contact with load wire terminals 35 that are also supported on the intermediate support plate. Each wire terminal is configured in a known manner for electrical connection to a wire of an external device. Line conductors 30-32 are also supported on the intermediate plate. The front plate 22 and intermediate plate 24 are fixed relative to the base plate so that the line and load conductors are held in a fixed position within the fuse holder. The fuse holder 10 includes an engagement mechanism for engaging the fuse holder, and thus an array of fuses, to a busbar device. In one embodiment, the engagement mechanism includes a latch plate 37 disposed between the intermediate plate and the back plate that is configured to releasably latch the fuse holder 10 to a busbar device, such as the busbar device disclosed in the '464 Patent.

Figure 3:
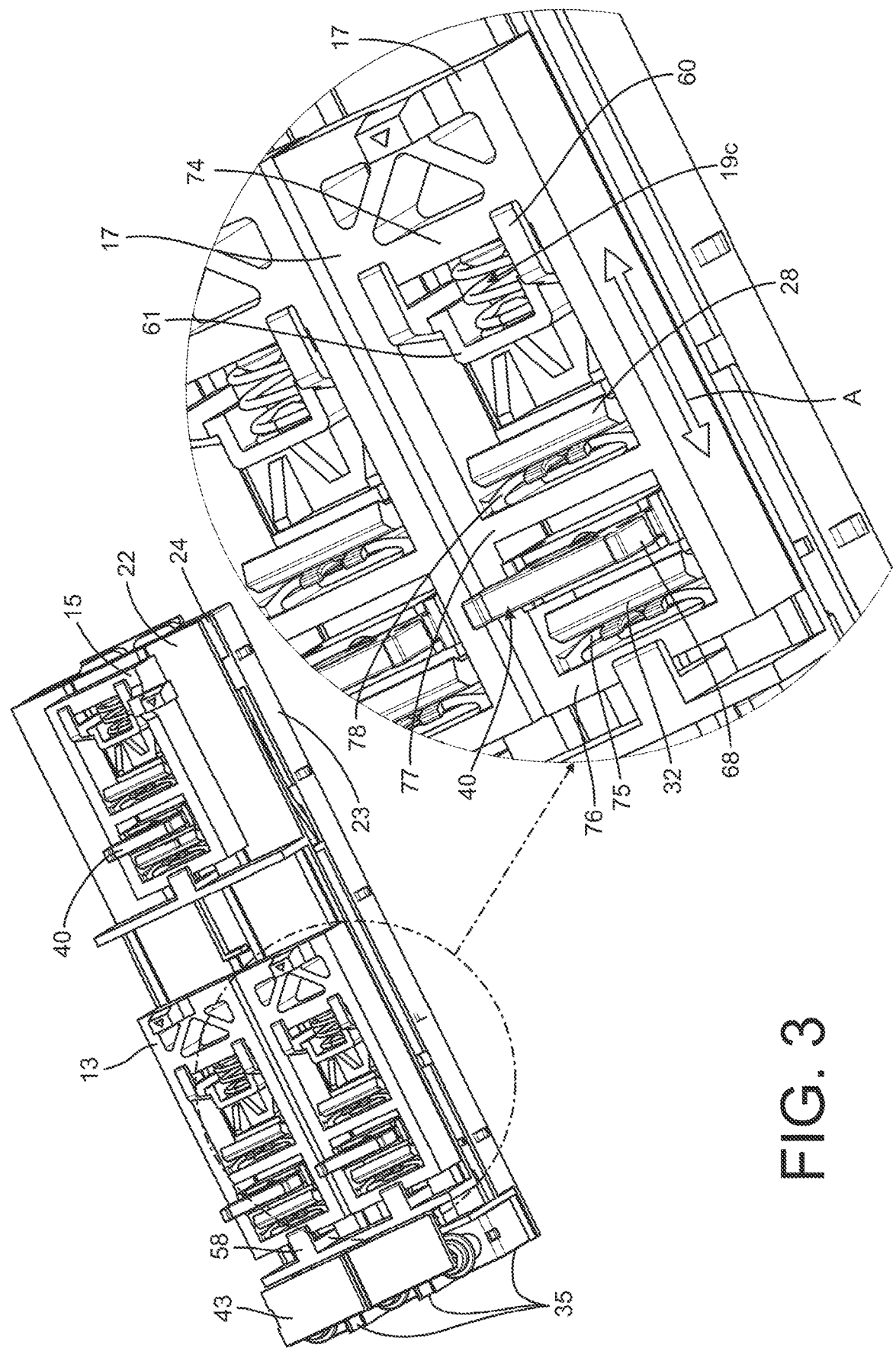
FIG. 3 is a detailed view of a fuse carriage and ejection feature of the fuse holder shown in FIGS. 1-2.

The stack up of the components is shown in more detail in FIG. 3. The carriages 13, 15, 17 are supported on the first front plate 22 with contact ends of the load conductor, such as $L_3$ load conductor 27, and line conductors, such as $L_3$ line conductor 32, extending through the carriages. The ejectors 40 are also supported by the first front plate 22 inside the carriages. As indicated by the arrow A in the enlargement of FIG. 3, the carriages can move up and down relative to the first front plate 22 and relative to the contact ends of the line and load conductors. Each carriage includes a spring, such as spring 19b to bias the carriages upward (to the right in FIG. 3) toward the fixed line and load conductors.

Figure 4:
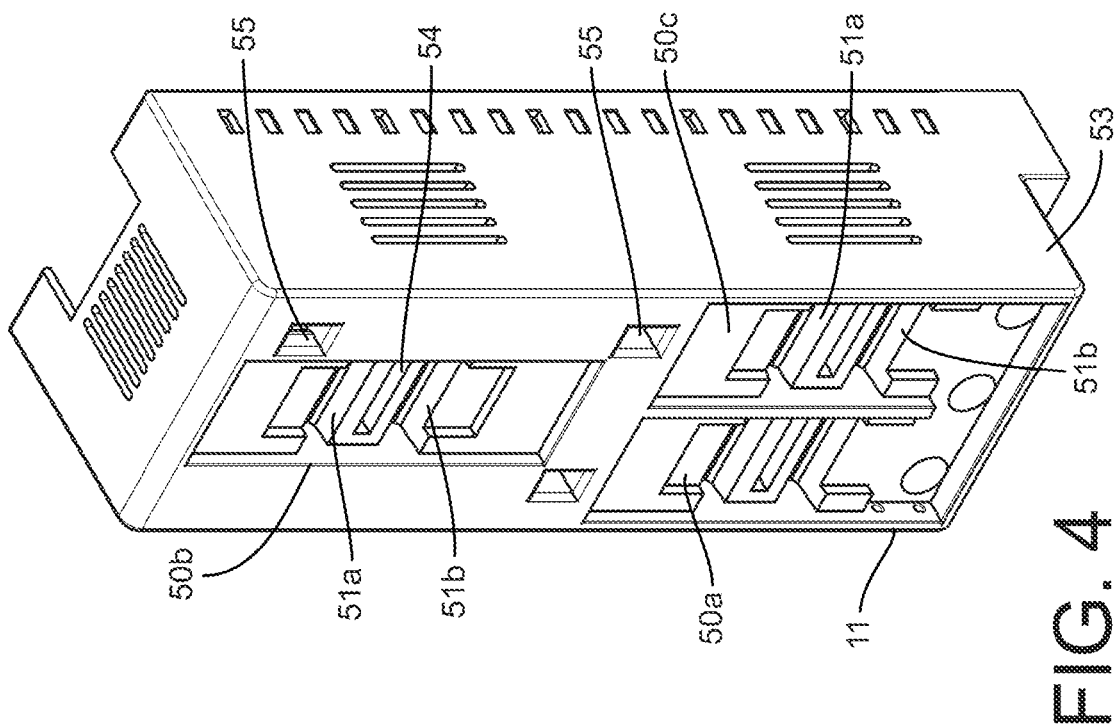
FIG. 4 is a perspective view of a housing for the fuse holder shown in FIGS. 1-2.

Details of the cover 11 are shown in FIG. 4. The cover defines fuse bays 50a, b, c to receive fuses for the $L_1$, $L_2$ and $L_3$ phases. The bays can be in the form of recesses in the cover sized to receive the fuse, such as a Class CF fuse. Each bay defines a pair of slots 51a, 51b through which the two knives K of the fuse extend when the fuse is mounted to the fuse holder. An ejector slot 54 is disposed between the two slots 51a, 51b to receive a respective ejector 40. An ejector tool opening 55 is associated with each fuse bay. The opening 55 is sized to receive the working end of a tool used to release the corresponding carriage 13, 15, 17, as described herein. The cover 11 further defines a wire terminal bay 53 beneath the fuse bays. The wire terminal bay 53 is enclosed by the terminal cover 43 which can be snap-fit within the wire terminal bay.

Figure 22B:
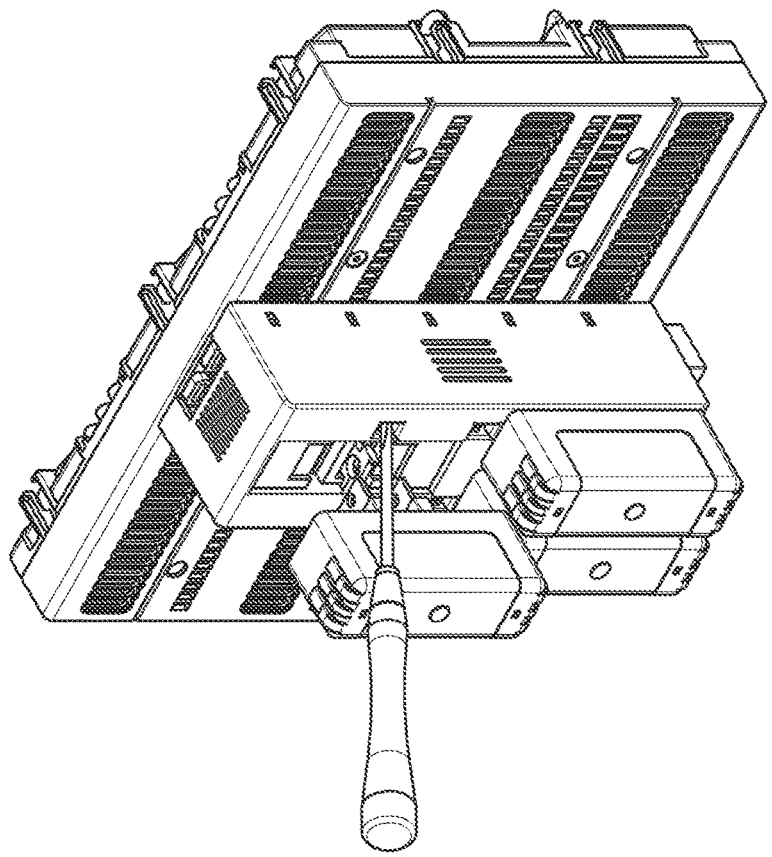
FIG. 22 is a perspective view of the fuse holder of the present disclosure mounted on a busbar device of the type shown in U.S. Pat. No. 10,700,464.
Figure 22A:
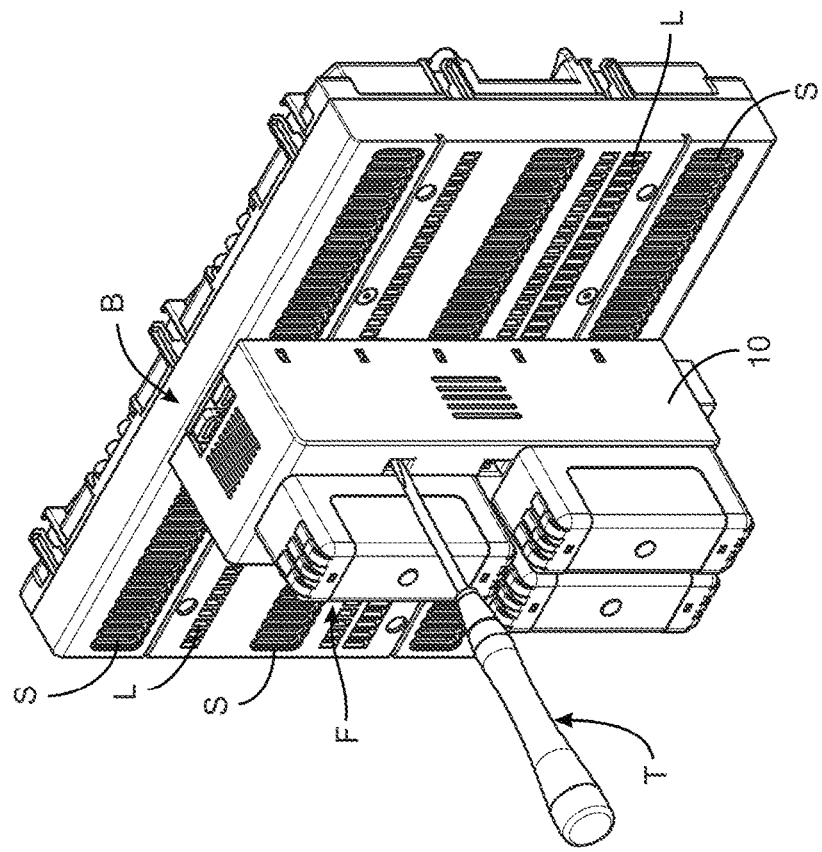

As shown in FIGS. 2 and 4, the three phases are arranged to define a compact profile or form factor. Thus, in the illustrated embodiment, the line and load conductors for the first and third phases are adjacent at the lower end of the cover 11, while the line and load conductors for the second phase are centered above the other two phases. Thus, the $L_1$ fuse bay 50a is adjacent the $L_3$ fuse bay 50c and the $L_2$ fuse bay 50b is centered above the other two bays. This arrangement provides a compact profile which allows several fuse holders and other electrical devices to be conveniently mounted on a common busbar device. Thus, as shown in FIG. 22, the fuse holder 10 can be mounted on a cross-board-type busbar device B, which can be configured like the device of the '464 Patent to include several locations for receiving electrical devices. The slim profile of the fuse holder 10 minimizes the area of the busbar device covered by the fuse holder and leaves the majority of the busbar device B available for other electrical devices.

Figure 5:
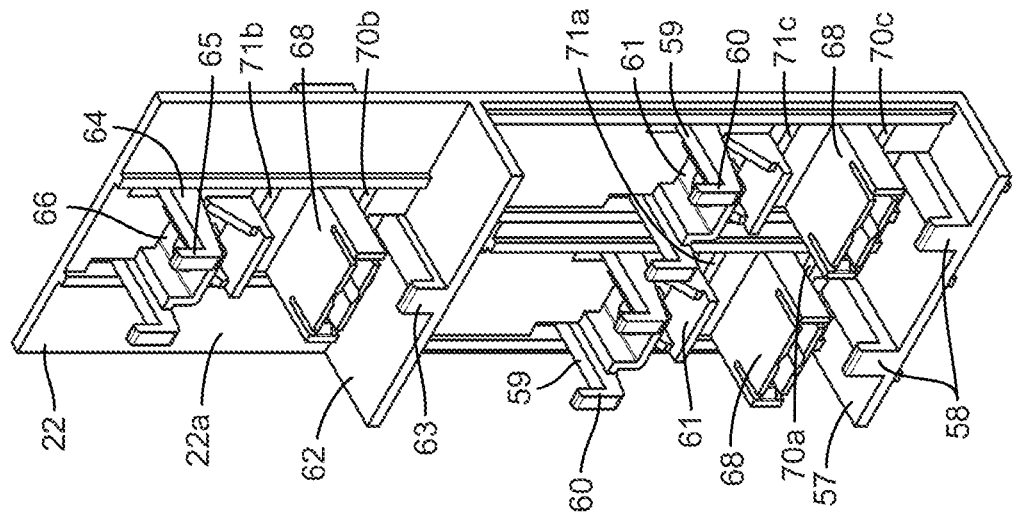
FIG. 5 is a perspective view of a first front plate for the fuse holder shown in FIGS. 1-2.

Details of the first front plate 22 are shown in FIG. 5. The first front plate includes a lower stop 57 that projects from the first plate surface 22a. The lower stop limits the downward movement of the $L_1$ and $L_3$ carriages 13, 17, respectively. The lower stop includes a pair of retainer flanges 58 projecting upward to retain the two carriages, as best seen in FIG. 3. A pair of upper carriage stops 59 include retainer flanges 60 that also help retain and guide each of the two carriages 13, 17, again as best seen in FIG. 3. A similar lower stop 62 and retainer flange 63, and a similar pair of upper stops 64 and retainer flanges 65, are provided for the $L_2$ carriage 15 at an upper portion of the first front plate 22. A biasing spring support 61 is disposed between the pairs of upper stops 59 for the two lower carriages, and a spring support 66 is provided between the upper stops 64 for the $L_2$ carriage. The spring supports 61, 66 support the biasing springs 19a-19c and provide a reaction base for the biasing force generated by the springs on the respective carriages.

Figure 11:
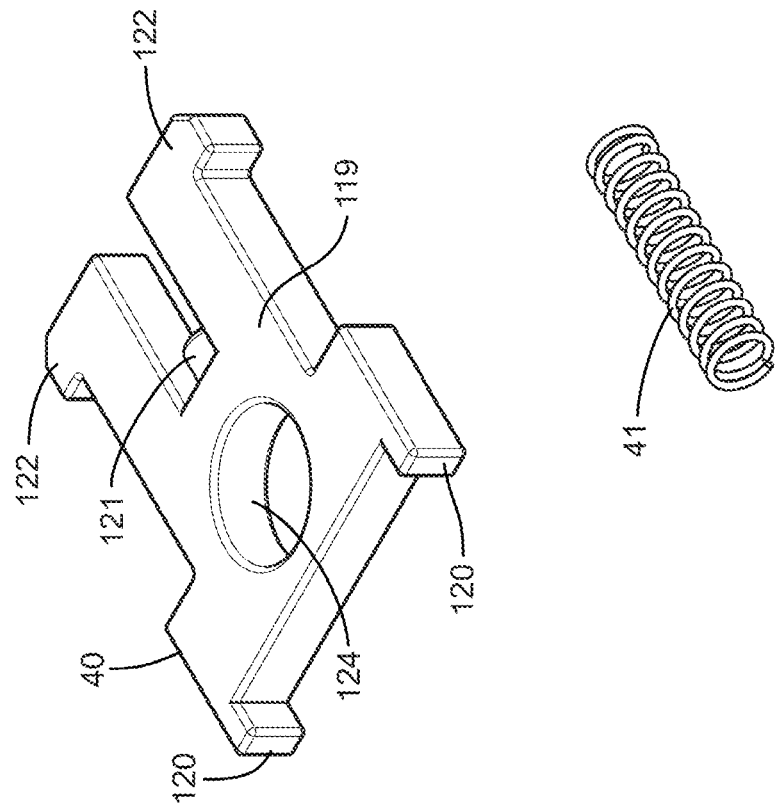
FIG. 11 is a perspective view of ejectors for the fuse holder shown in FIGS. 1-2

The first front plate 22 includes ejector guides 68 positioned between the lower and upper stops of each fuse bay. The guides are aligned with corresponding ejector slots 54 in the cover 11. The guides 68 are thus sized to slidably receive the ejectors 40 therein. As shown in more detail in FIG. 11, the ejectors 40 include a generally flat body 119 that fits within the generally rectangular shape of the guides. The end of the body 119 bears against a fuse to push the fuse outward—i.e., to eject the fuse from the fuse holder 10. The body includes a pair of prongs 120 that are configured to engage openings in the fuse to hold onto the fuse when it is ejected. The prongs can be configured for a slight press-fit with the openings in the fuse. The body defines a center post 121 on which is mounted the ejection spring 41. The end of the body 119 defines retention hooks 122 that bear against an interior wall of the ejector guide 68 to hold the ejector 40 within the guide even as the spring 40 pushes the ejector body 119 outward. The retention hooks thus limit the outward extension of the ejector 40, which in a specific embodiment can be 5 mm. The body 119 can define a bore 124 that can receive the hasp of a padlock when the ejector 40 is in its unloaded position, as shown in FIG. 1. The padlock can prevent installation of a fuse into the fuse holder 10.

Figure 20:
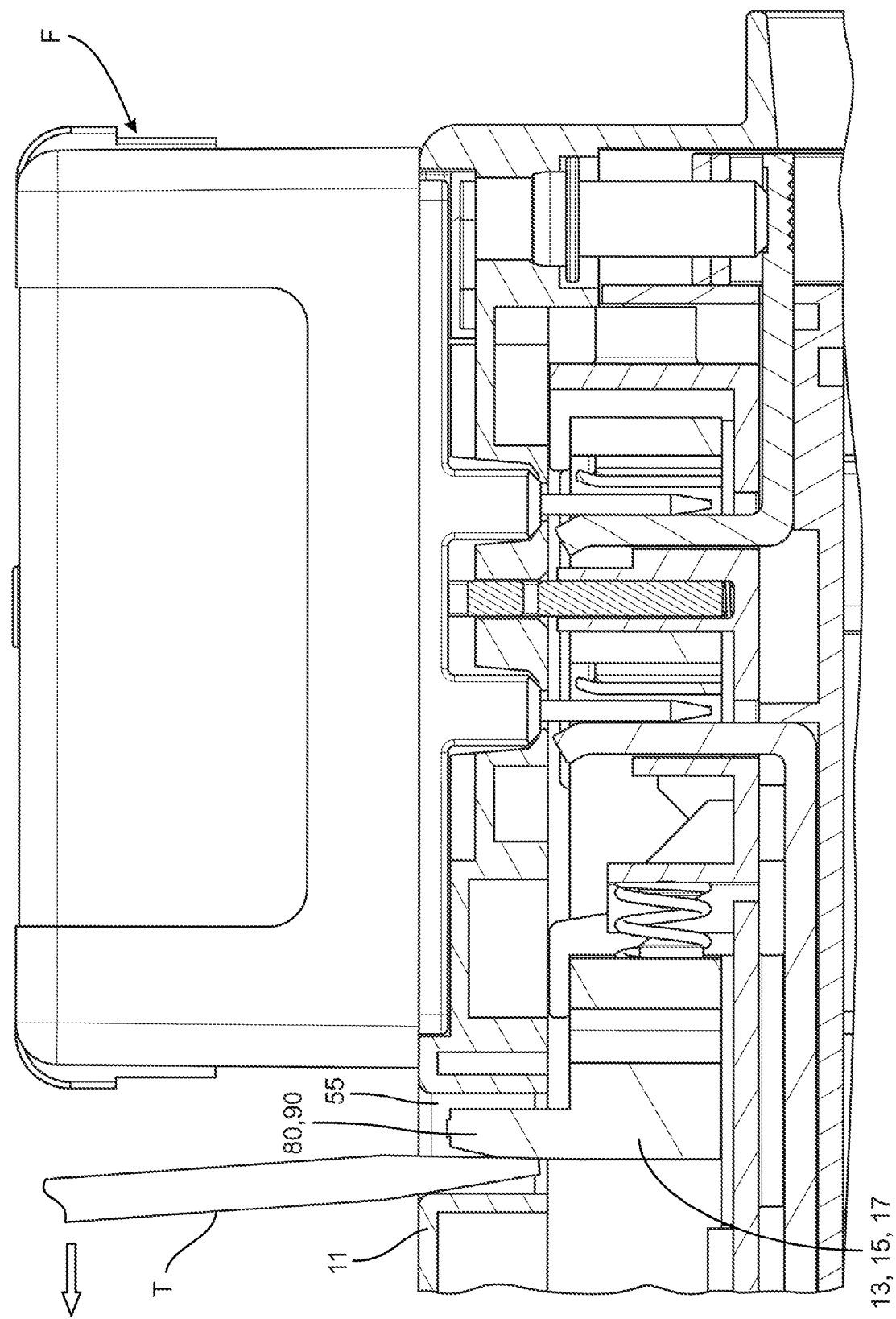
FIG. 20 is a side partial cross-sectional view of the fuse holder of the present disclosure showing a first step of removing a fuse.

Returning to FIG. 5, the first front plate 22 defines a series of slots through which portions of the line and load conductors extend. Thus, load slots 70a-70c and line slots 71a-71c are provided with pairs of load slots and line slots (such as slot 70a and 71a) arranged so that the load conductor and line conductor flank the ejector guide 68. Moreover, the line and load slots are specifically arranged to receive a respective knife of the fuse (see FIG. 20). As shown in FIG. 3, the L₃ load conductor 27 is above the L₃ line conductor 32 and on opposite sides of the ejector guide 68.

Details of the carriages are shown in FIGS. 6-7. The L₁, L₃ carriages 13, 17 can be of identical construction. The carriages 13, 17 include a generally rectangular body 73 with a biasing spring plate 74 spanning the body near the top of the body. As shown in FIG. 3, the biasing spring 19c is disposed between the spring support 61 and the spring plate 74 of the carriage. The spring support 61 is fixed within the fuse holder 10 so that the spring 19c exerts and upward force on the spring plate 74 to bias the carriage upward. The body 73 further includes a lower clamping plate 75 with a leaf spring element 76 and an upper clamping plate 77 with a leaf spring element 78. The lower clamping plate 75 and leaf spring element 76 are positioned to be beneath the line conductor 32 for the L₃ phase. The upper clamping plate 77 and leaf spring element 78 are similarly arranged for the load conductor 27 for the L₃₂ phase. The same plate and leaf spring arrangement is provided for the line and load conductors for the L₁ phase. As shown in FIG. 7, the carriage 15 for the L₂ fuse bay has a similar construction with the biasing spring plate 84, lower plate 85, leaf spring element 86, upper plate 87 and leaf spring element 88.

Figure 19:
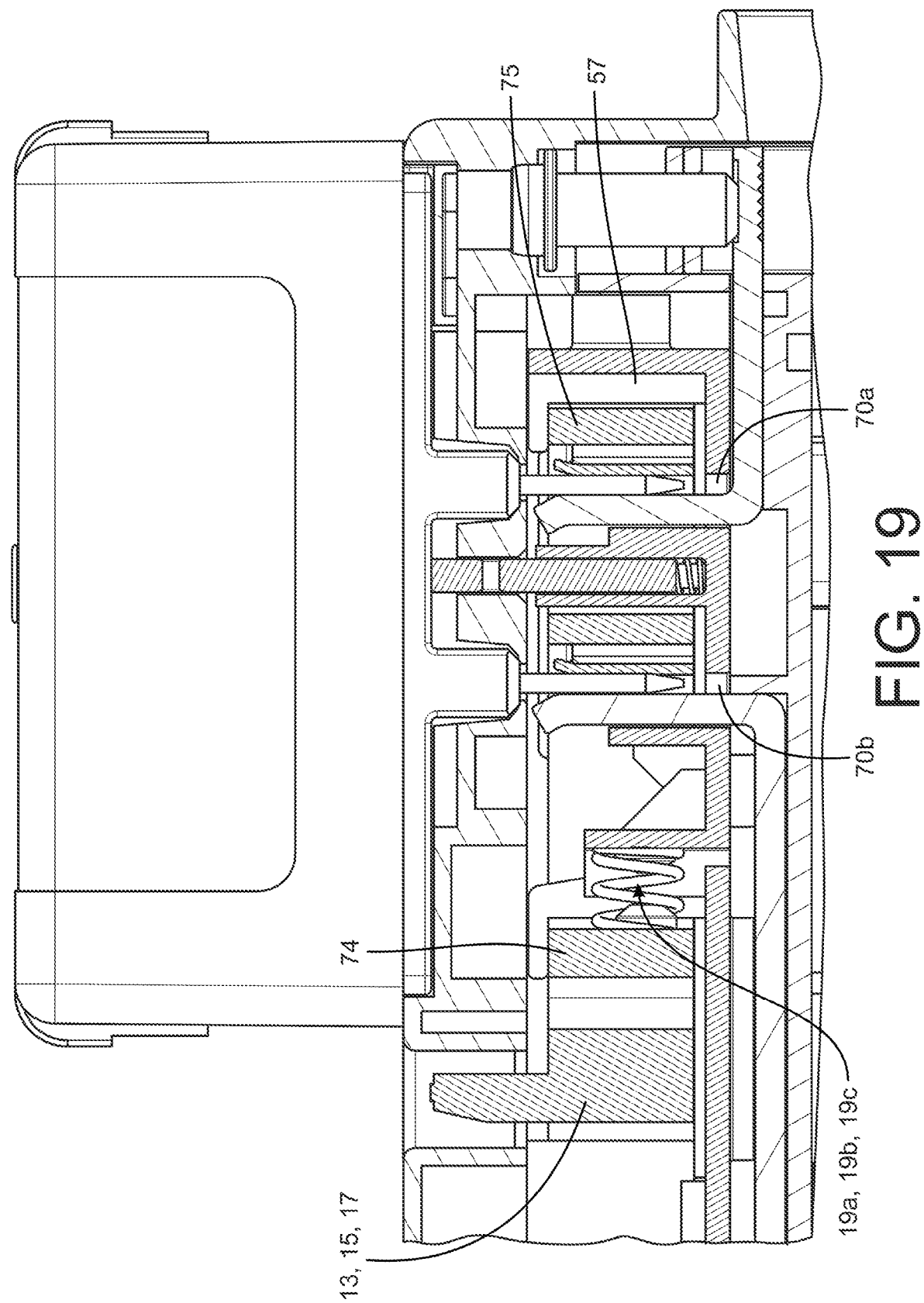
FIG. 19 is a side partial cross-sectional view of the fuse holder shown in FIG. 18 showing a second step of receiving a fuse.

It can be appreciated that the respective biasing springs 19a, 19b, 19c bear against the three carriages 13, 15, 17 to push the carriage upward toward the line and load conductors extending through the carriages. In the biased position, the leaf spring elements 76, 78, 86, 88 can bear against the respective line and load conductors in the absence of a fuse supported by the fuse holder. The construction of the carriages 13, 15, 17 provides one feature of the fuse holder of the present disclosure, as illustrated in FIGS. 18-19. As shown in FIG. 18, a fuse F is positioned with each fuse knife K aligned with a corresponding slot 51a, 51b in the cover 11. The ejector 40 projects out from the cover toward the body of the fuse F. Each knife K is aligned with a corresponding load conductor 26 and line conductor 30, and more specifically to the intersection between the conductor and the leaf spring element 76, 78. As each knife is advanced between the conductor and the leaf spring element the carriage 13, 15, 17 is pushed downward so that the lower clamping plate 75 of the carriage approaches or abuts the lower stop 57 of the first front plate 22, as shown in FIG. 19. This movement of the carriage compresses the spring 74, which means that the spring applies a force against the carriage that pushes the carriage toward the newly inserted knives K. This force essentially clamps each knife K between the corresponding conductor 26, 30 and the lead spring element 76, 78 of the carriage. The conductor 27, 32 is backed by the conductor slot 70a, 70b so that the entire spring force is devoted to clamping the knives of the fuse with sufficient force to hold the fuse in position against being inadvertently dislodged.

In one specific embodiment, the springs 19a, 19b, 19c are coil compression springs with a spring rate of 12.3 Nmm (108 lb./in) to generate a force of 50N in the baseline position shown in FIG. 18, and a clamping force of 150N in the position shown in FIG. 19. The force in the baseline position is not enough to prevent manual insertion of the fuse knives K into the fuse holder, but is enough to provide a tactile feel during insertion. The clamping force is sufficient to prevent manual removal of the fuse from the fuse holder and to maintain a solid electrical connection between the fuse knives K and the conductors 26, 30. It is contemplated that the springs 19a, 19b, 19c can be other forms of springs or resilient components capable of being compressed and exerting a force when compressed.

Figure 21:
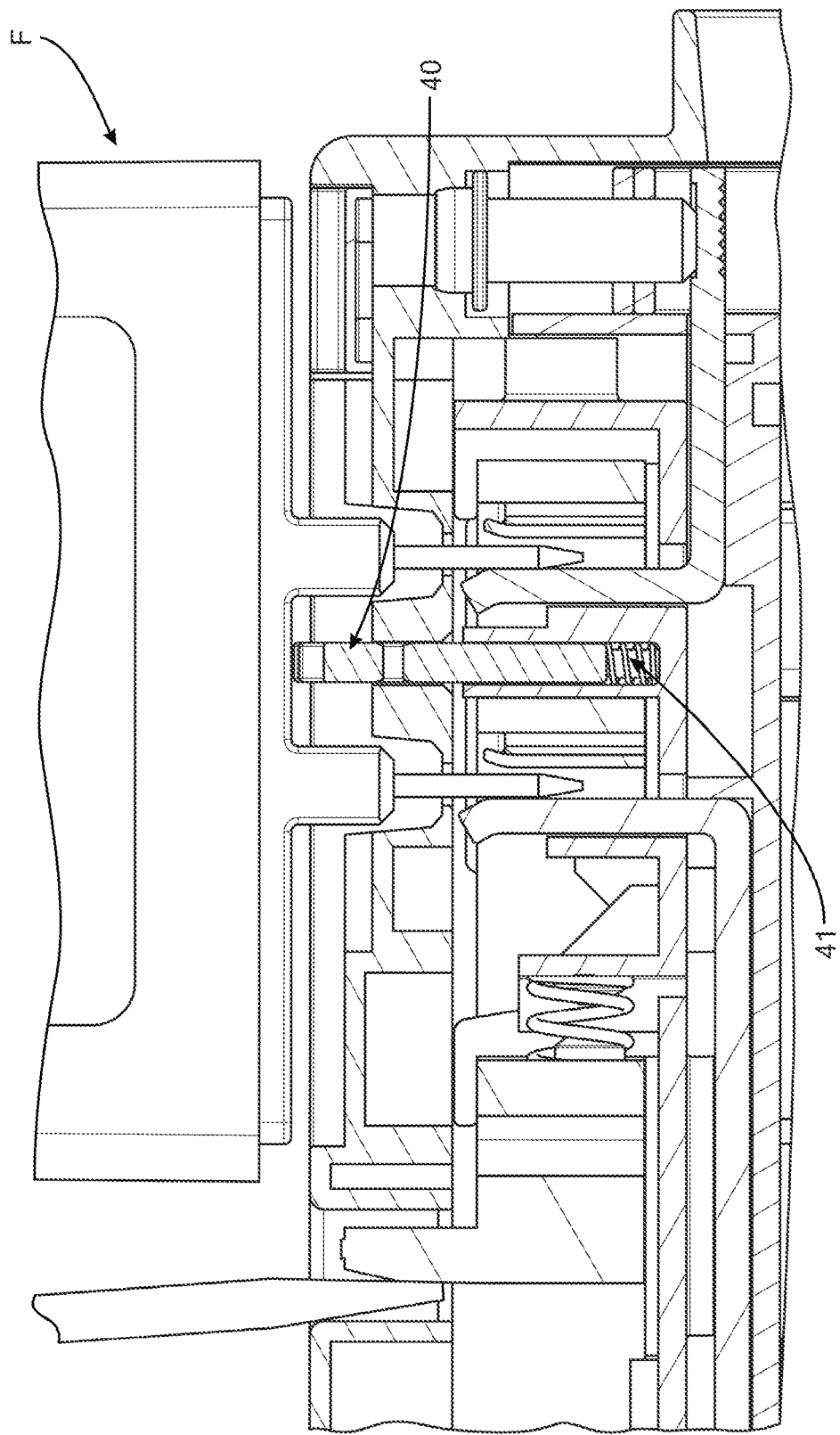
FIG. 21 is a side partial cross-sectional view of the fuse holder shown in FIG. 20 showing a second step of removing a fuse.

Returning to FIGS. 6, 7, each of the carriages 13, 17 include a release post 80, while the carriage 16 includes a release post 90. The release posts project into ejector tool openings 55 in the cover 11 (FIG. 4). As shown in FIG. 19, the opening 55 is configured to receive the working end of a tool T, such as a flat head screwdriver. The tool can be used as a lever to push the release post 90, and thereby the carriage 13, 15, 17 downward. This movement shifts the two clamping plates 75, 77 (85, 87) and associated leaf spring elements 76, 78 (86, 88) downward away from contact with the respective fuse knife K, as shown in FIG. 21. In this configuration there is no meaningful friction force acting on the fuse knives K to prevent the fuse from being disengaged and removed from the fuse holder 10. In this configuration the fuse can be readily removed manually. The carriage, and particularly the release post 90, can be configured so that a 1.6 mm movement of the carriage by the tool T is enough to release the fuse knives. The tool openings 55 and release posts 80, 90 are arranged to be physically remote from the line and load conductors so that a tool introduced through the openings 55 cannot contact the electrical conductors.

In a further feature of the fuse holder of the present disclosure, the ejector 40 automatically operates to push the fuse F away from the fuse holder. In particular, a spring 41 pushes the ejector body 119 outward which pushes the fuse far enough outward to electrically disconnect the fuse knives K from the line and load conductors inside the fuse holder. The prongs 120 on the ejector body 119 hold the fuse F so that it does not simply fall from the fuse holder when ejected. In one specific embodiment the spring 41 is a coil compression spring having a spring constant of 0.96 Nmm (8.5 lb/in) to produce a spring force of 3N in its neutral position with no fuse present, and a spring force of 10N in its compressed position when a fuse is engaged in the fuse holder. It is contemplated that the springs 41 can be another form of spring or resilient component capable of being compressed and exerting a force when compressed. It can be appreciated that the spring is compressed by the body of the fuse F when it is pushed into the fuse holder as depicted in FIGS. 18-19. The 10N fully compressed force of the spring 41 is easily overcome by manual force and is not sufficient to dislodge the fuse against the friction forces holding the fuse knives K in the fuse holder as described above. The ejector 40 and spring 41 are configured to push the fuse F away from the fuse holder by about 3 mm, which is a sufficient distance to allow the fuse to be grasped and completely removed.

Figure 8:
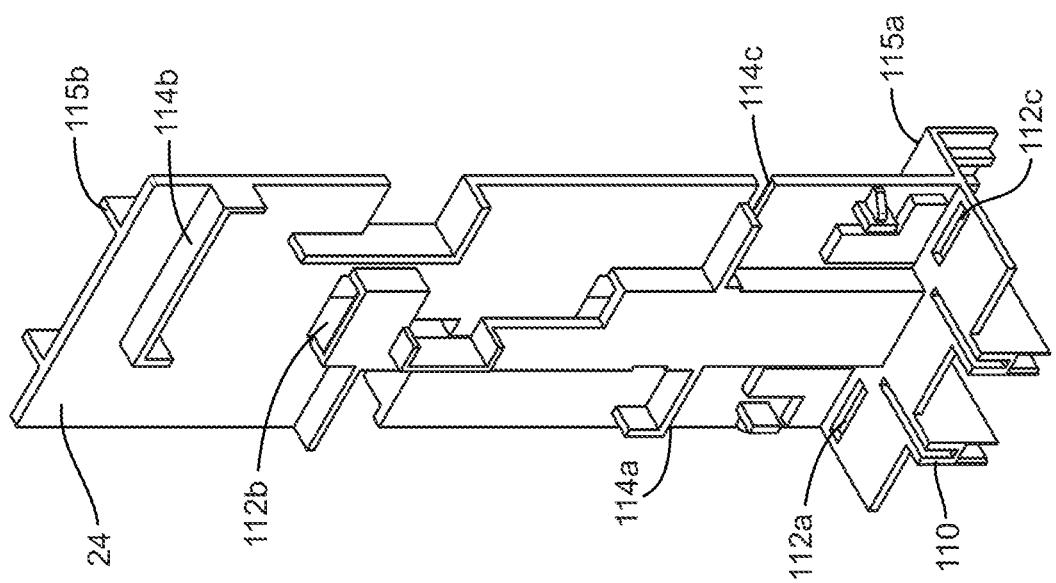
FIG. 8 is a perspective view of a base plate for the fuse holder shown in FIGS. 1-2.

Details of the intermediate plate 24 are shown in FIG. 8. The intermediate plate is configured to carry the conductors and align them with the appropriate slots 70a-c, 71a-c in the first front plate 22. The bottom of the first plate includes terminal supports 110 for supporting the wire terminals 35 in alignment with the terminal bay 53 in the cover 11. The intermediate plate 24 further defines load conductor slots 112a, 112b and 112c for the corresponding load conductors 26-28. The intermediate plate also defines line conductor slots 114a, 114b and 114c for receiving the corresponding line conductors 30-32. As shown in FIGS. 2 and 18, the conductors are inserted into the respective slots 112a-c, 114a-c from the back of the intermediate plate 24. The back of the intermediate plate 24 includes an array of flanges 115a, 115b configured to align and engage the conductors to hold them in position on the intermediate plate. The flanges 115a are configured to support the load conductors 26-28 so that they extend through the appropriate slots 112a-112c and so that they are in electrical contact with the wire terminals 35 retained by the terminal supports 110.

As shown in FIGS. 12-17 the line and load conductors are configured to be carried by the intermediate plate 24 with the contact surfaces accessible through the carriages 13, 15, 17. The $L_1$ load conductor 26, shown in FIG. 12, includes an anchor leg 26a that is seated within the flanges in the back of the intermediate plate 24, a fuse contact portion 26b for establishing electrical contact with the fuse knife K as shown in FIG. 19, and a terminal contact portion 26c for establishing electrical contact with one of the wire terminals 35. Likewise, the $L_2$ load conductor 27, shown in FIG. 13, includes an anchor leg 27a that is seated within the flanges in the back of the intermediate plate 24, a fuse contact portion 27b for establishing electrical contact with the fuse knife K, and a terminal contact portion 27c for establishing electrical contact with one of the wire terminals 35. It can be appreciated that the anchor leg 27a of the $L_2$ load conductor 27 is longer than the anchor leg of the other two conductors so that the $L_2$ connection is oriented above the other two conductors in order to minimize the form factor of the fuse holder 10. The $L_3$ load conductor 28 shown in FIG. 14 includes an anchor leg 28a, fuse contact portion 28b and terminal contact portion 28c that is similar to the $L_1$ load conductor 26, but offset to an opposite side of the fuse holder.

Figure 9:
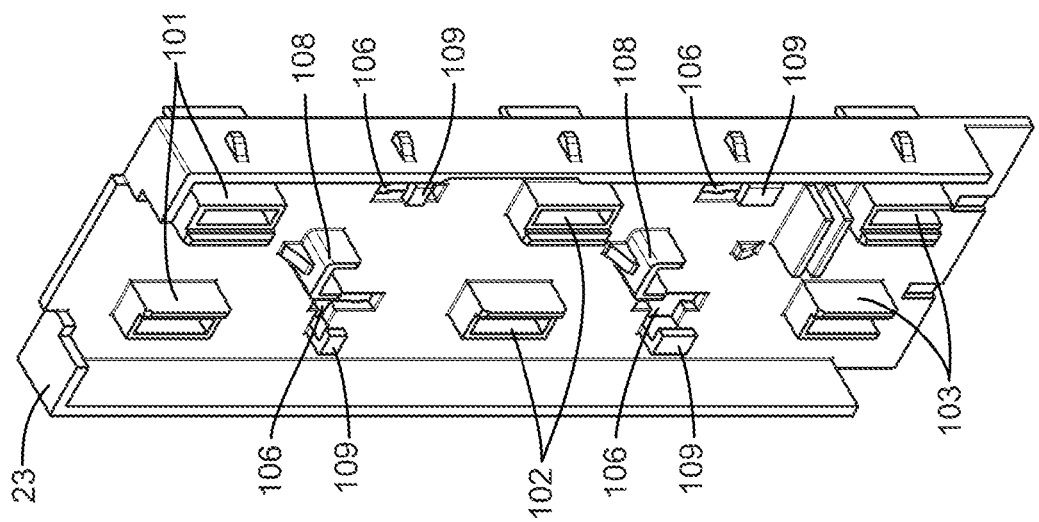
FIG. 9 is a perspective view of an intermediate plate for the fuse holder shown in FIGS. 1-2.
Figure 15:
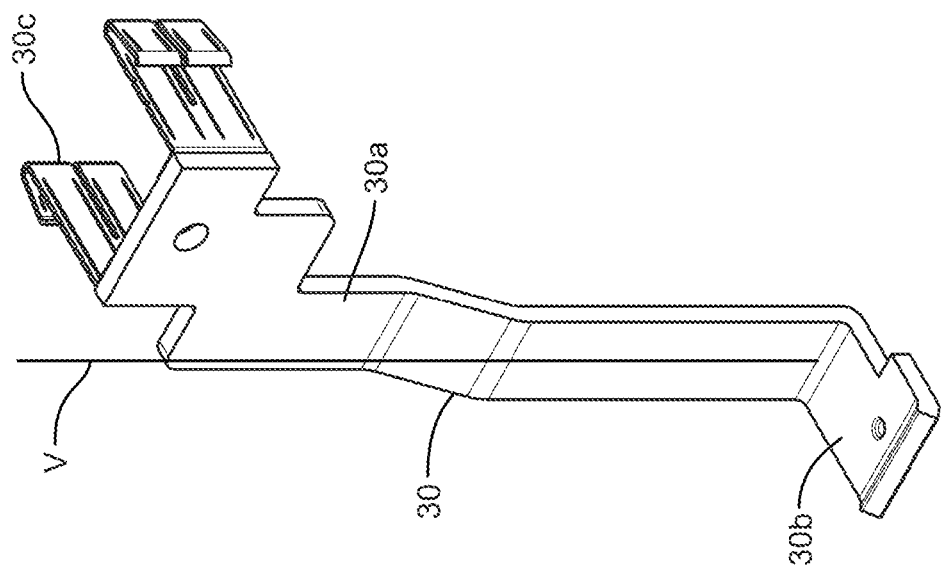
FIG. 15 is a perspective view of the $L_3$ line conductor for the fuse holder shown in FIGS. 1-2.
Figure 14:
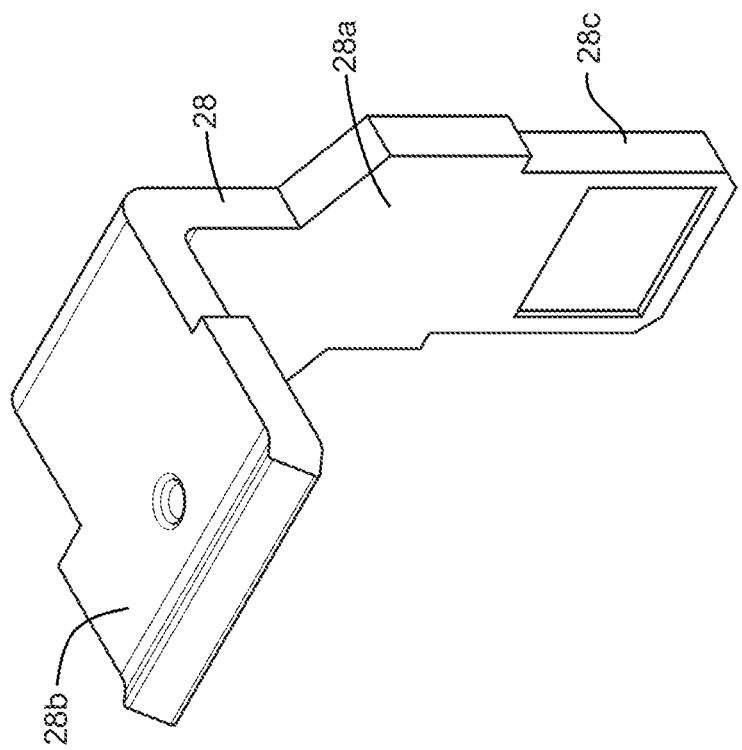
FIG. 14 is a perspective view of the $L_3$ load conductor for the fuse holder shown in FIGS. 1-2.

The $L_1$ line conductor 30, shown in FIG. 15, includes an anchor leg 30a configured to be engaged by the flanges on the back of the intermediate plate 24. The anchor leg 30a terminates in a fuse contact portion 30b that is arranged to oppose the load conductor fuse contact portion 26b within the $L_1$ carriage 13. The other two conductors 31, 32 include respective anchor legs 31a, 32a and fuse contact portions 31b, 32b that are configured so that the line conductor fuse contact portions oppose the load conductor fuse contact portions 27b, 28b within the corresponding carriages 15, 17. In contrast to the load conductors, the line conductors include contact portions 30c, 31c, 32c configured to engage contact slots S of a busbar device, such as busbar device B in FIG. 22, on which the fuse holder is mounted. Thus, the $L_1$ line conductor 30 includes a pair of busbar contact portions 30c that project rearwardly from the conductor— i.e., toward the base plate 23 when the fuse holder is assembled. The pair of contact portions 30c are arranged to extend into one of the feed-through contact slot S in the busbar device B, shown in FIG. 22, to make electrical contact with contacts within the device. The other line conductors 31, 32 include similar pair of busbar contact portions 31c, 32c that also project rearwardly. The busbar contact portions 30c-32c are arranged to pass through corresponding slots 101-103 in the base plate 23 shown in FIG. 9. As shown in FIG. 9, the busbar slots 101-103 are vertically aligned and uniformly separated on the base plate. It can thus be appreciated that the anchor legs 30a-32a of the conductors are configured so that the fuse contact portions can be properly positioned within the carriages while the busbar contact portions 30c-32c are optimally located for engagement to a busbar device. In particular, the busbar contact portions 30c, 31c, 32c are arranged vertically, with the $L_1$ connection at the top, the $L_3$ connection at the bottom and the $L_2$ connection in the middle, to coincide with the conventional $L_1$-$L_3$ positioning of the slots S in the busbar device B.

Figure 17:
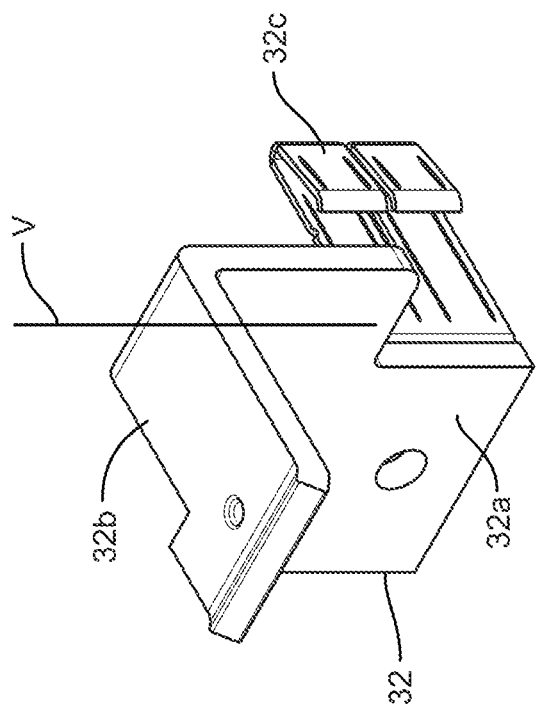
FIG. 17 is a perspective view of the $L_2$ line conductor for the fuse holder shown in FIGS. 1-2.
Figure 16:
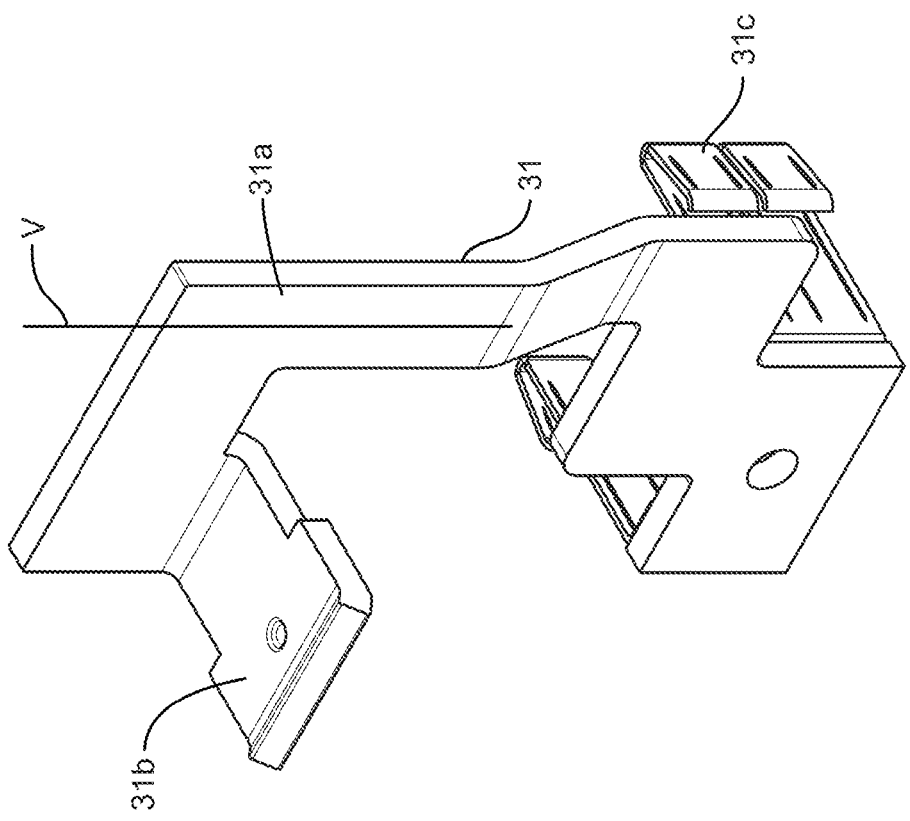
FIG. 16 is a perspective view of the $L_1$ line conductor for the fuse holder shown in FIGS. 1-2.

In order to optimize the form factor and minimize the profile of the fuse holder, the line conductors 30-32 are configured as shown in FIGS. 15-17 so that the fuse contact portions, 30b, 32b, of two of the phases, $L_1$ and $L_3$ in the illustrated embodiment, are laterally adjacent each other while the contact portion, 31b, of the remaining phase, $L_2$, is vertically above the other two phases when the conductors are mounted within the fuse holder. As shown in FIG. 15, the anchor leg 30a is not linear as it extends from the contact portion 30b to the contact portion 30c. Instead, the anchor leg is configured so that the two contact portions are laterally offset relative to each other relative to a vertical axis V through the leg 30a. The anchor legs 30b, 30c of the other two line conductors 31, 32, are similarly configured so that the respective contact portions 31b, 31c and 32b, 32c are laterally offset relative to each other.

Figure 10:
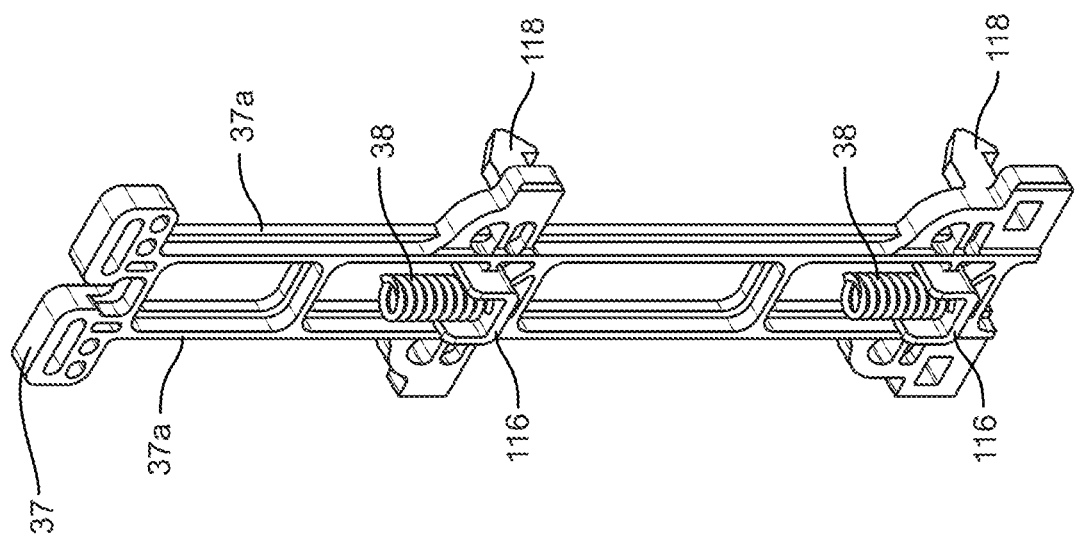
FIG. 10 is a perspective view of a latch plate for the fuse holder shown in FIGS. 1-2.
Figure 13:
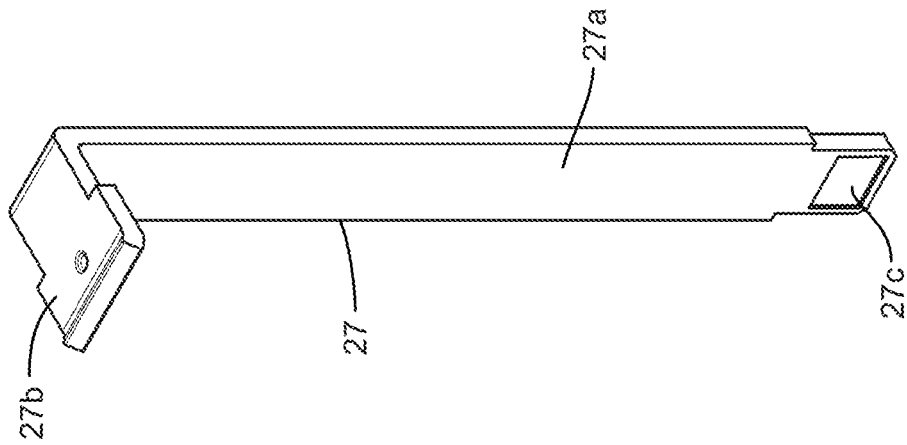
FIG. 13 is a perspective view of the $L_2$ load conductor for the fuse holder shown in FIGS. 1-2.
Figure 12:
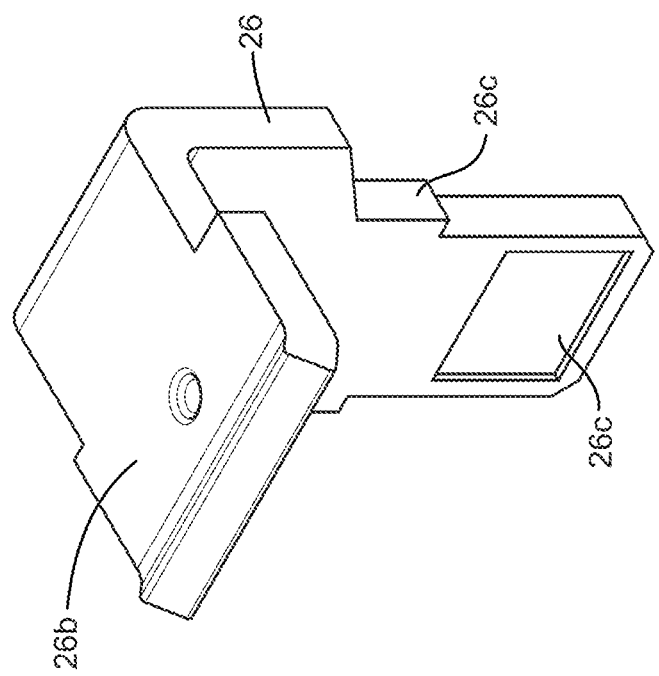
FIG. 12 is a perspective view of the $L_1$ load conductor for the fuse holder shown in FIGS. 1-2.

The base plate 23 also includes busbar latch slots 106 that receive the latches 118 formed on the latch plate 37 shown in FIG. 10. As shown in FIG. 10, the latches 118 are in the form of downward facing hooks that are configured to engage slots in the busbar device on which the fuse holder is mounted. The latches 118 are biased by two springs 38 that are supported on associated spring mounts 116 of the latch plate 37 and that react against associated spring stops 107 on the base plate 23. When the fuse holder is mounted on a fuse device, such as the busbar device B shown in FIG. 22, the latches 118 extend through latch openings L in the device. The latches are pushed upward as the latches are inserted into the openings L until the latches are fully disposed within the opening, at which point the springs 38 push the latches 118 down to engage a lower edge of the latch slots L. The latch plate 37 includes opposite rails 37a on which the latches 118 are formed. The base plate 23 includes clips 109 that engage the rails to hold the latch plate 37 to the base plate. It can be appreciated that the latch plate does not interfere with the line conductors or bus contact portions when the bus contact portions extend through the slots 101-103.

One benefit of the fuse holder 10 disclosed herein is that the carriages, first front plate, second intermediate plate, latch plate, base plate, cover and ejector body can all be formed of a plastic or resin material. In one specific embodiment, these components can be formed of a polyamide. The cover, base plate and intervening plates can be configured to snap together without the need for fasteners and tools. The interior of the cover 11 can be provided with flanges to receive the plates 22, 24 in snap-fit or force-fit engagement.

Figure 23:
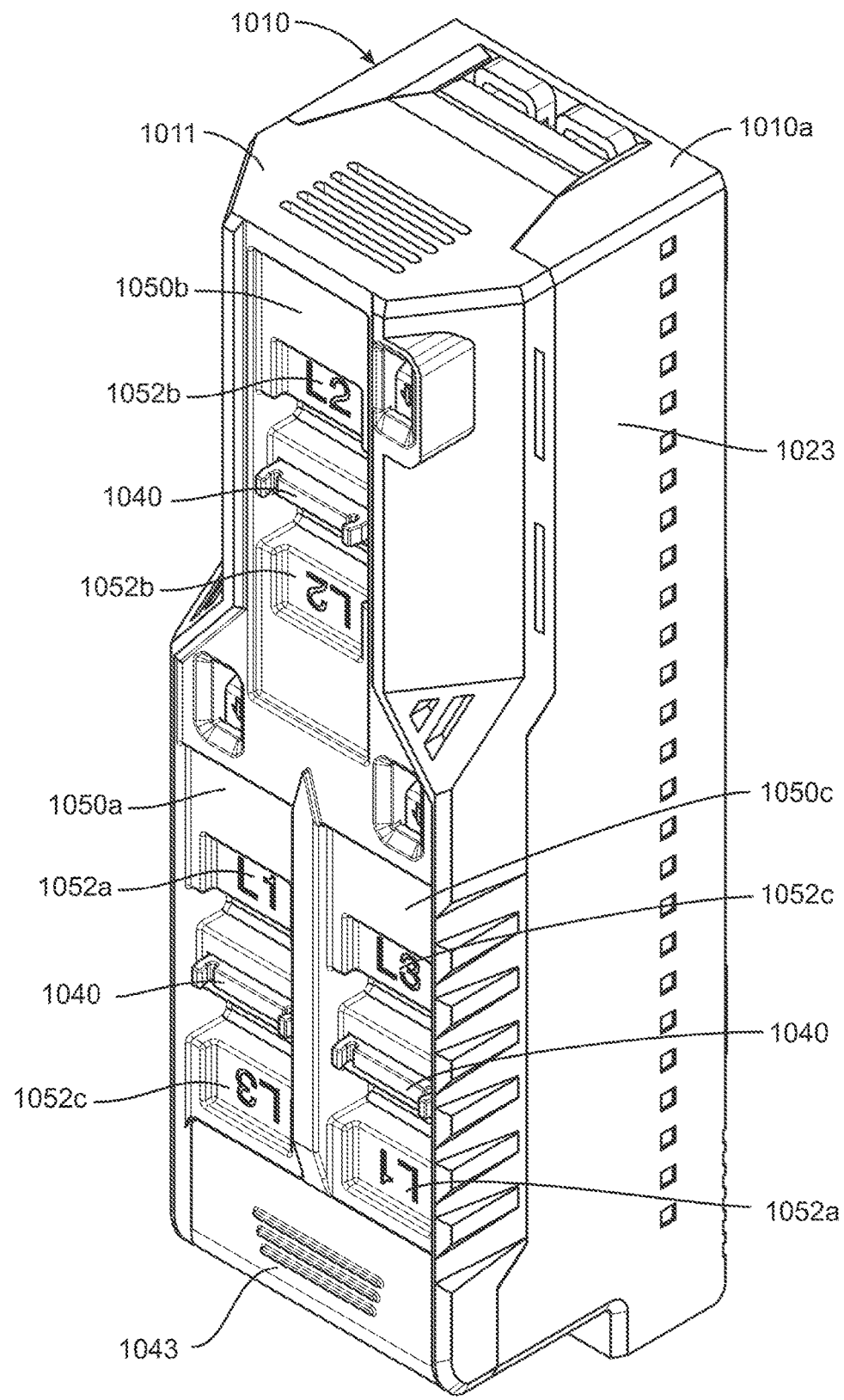
FIG. 23 is perspective view of a fuse holder according to another embodiment of the present disclosure.

Another fuse holder 1010 according to the present disclosure is shown in FIG. 23 that presents a more streamlined envelope and improved aesthetics. Details of the fuse holder 1010 are shown in FIGS. 24-46. The general construction of the fuse holder 1010 is substantially similar to the construction of the fuse holder 10. Features identified with the numerals 10xx of the fuse holder 1010 are have the same descriptor and are substantially similar in form and function as the features identified with the numerals xx of the fuse holder 10. Thus, like the holder 10, the fuse holder 1010 includes a housing 1010a formed by cover 1011 engaged to a base plate 1023 that houses the line and load conductors and supports the ejectors 1040 for ejecting fuses engaged to the holder. The fuse holder 1010 includes fuse bays 1050a, 1050b, 1050c for fuses engaged to the $L_1$, $L_2$ and $L_3$ electrical lines, respectively. The cover can include indicia 1052a, 1052b, 1052c identifying the particular line phase. As seen in FIG. 23, each bay includes two indicia that are oriented upside down relative to each other. This configuration accounts for the fuse holder being mounted upright, as shown in FIG. 23, or upside down. It can be further noted that the $L_1$ and $L_3$ bays, 1050a, 1050c, each include indicia 1052a for $L_1$ and indicia 1052c for $L_3$, upside down relative to each other. It can be appreciated that in the upright orientation shown in FIG. 23, the first phase is on the left side of the fuse holder 1010 within bay 1050a. When the fuse holder is inverted, the first phase is still on the left side, which places it in the bay 1050c.

Figure 24:
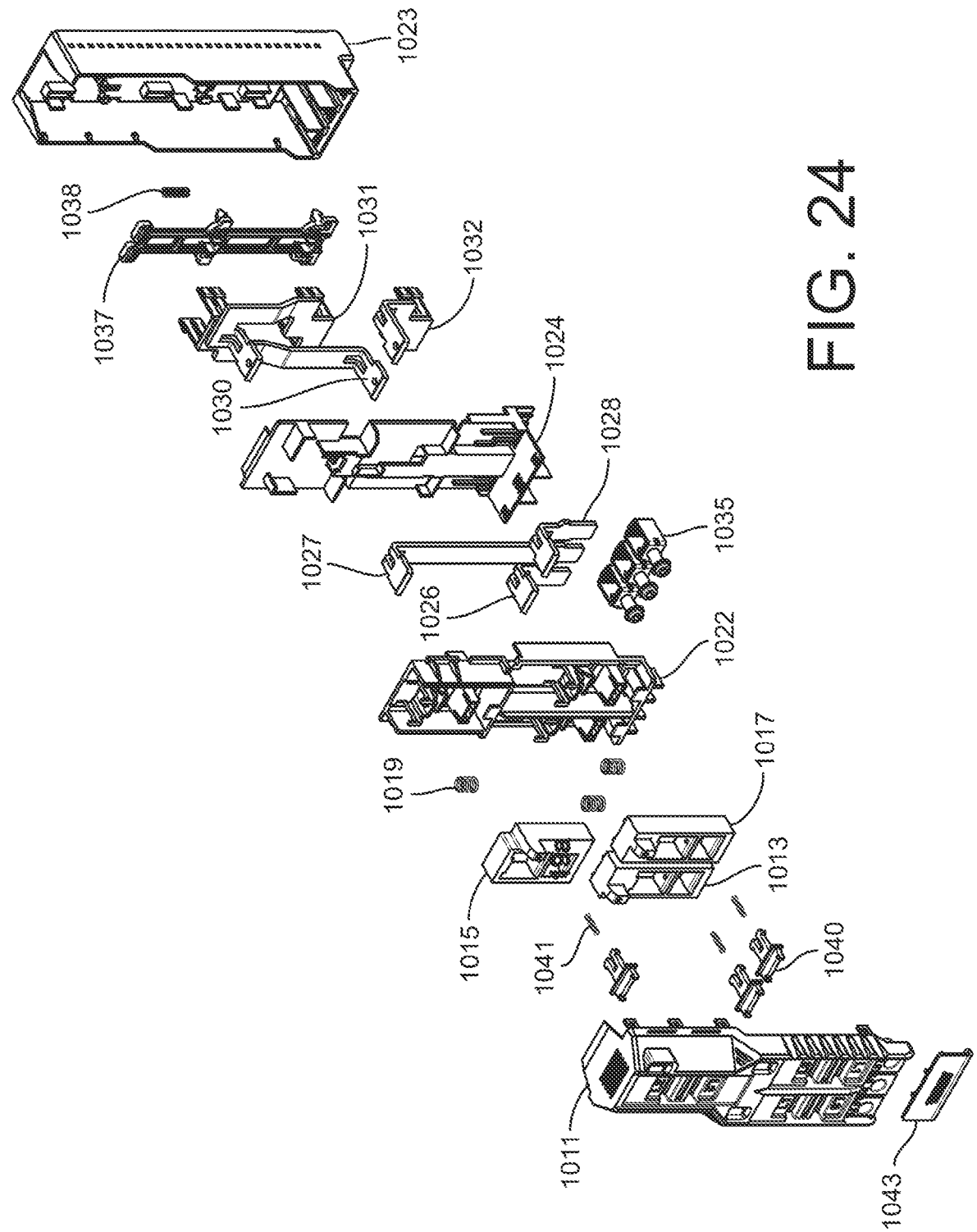
FIG. 24 is an exploded view of the fuse holder shown in FIG. 23.
Figure 25:
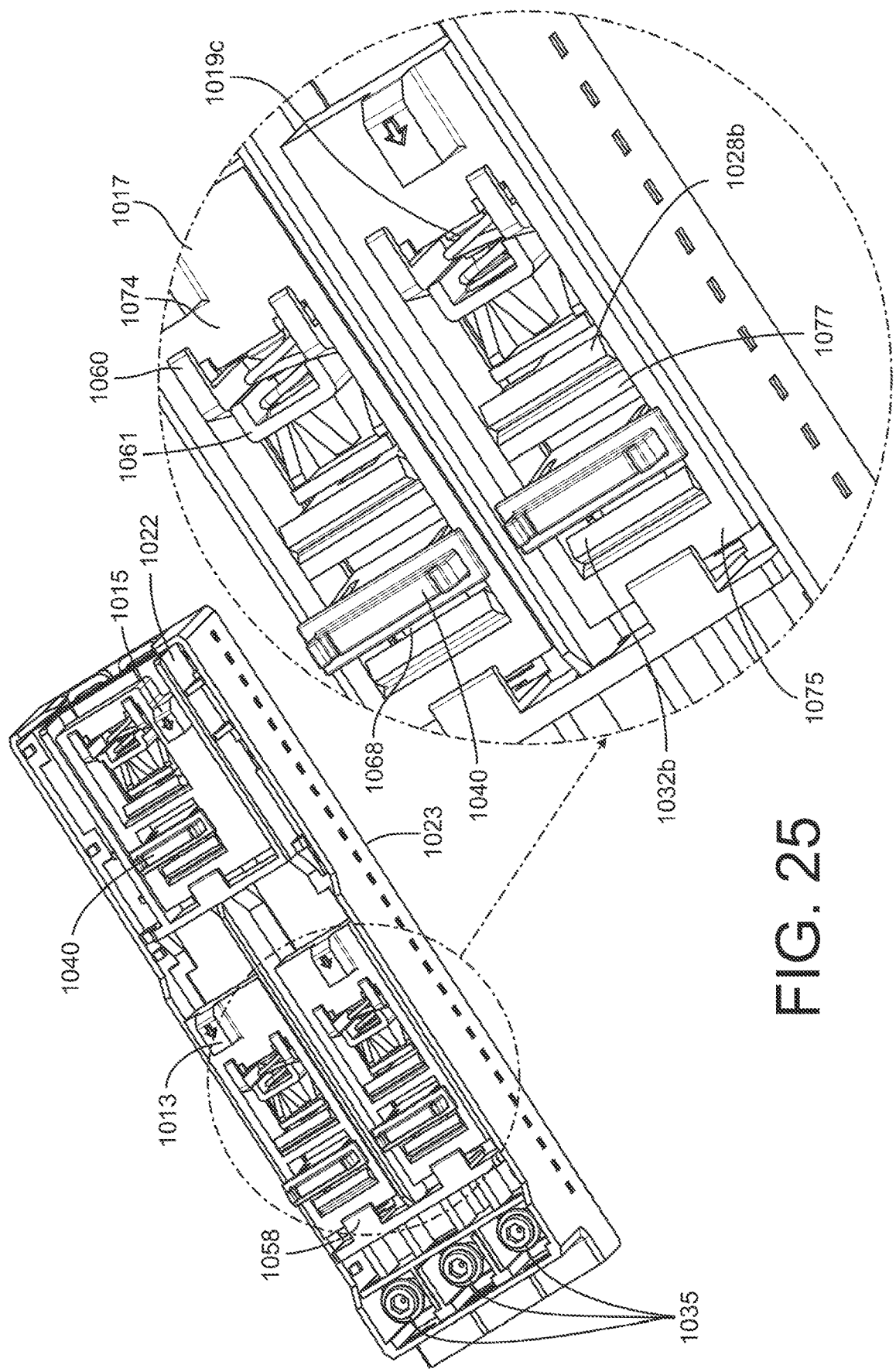
FIG. 25 is a detailed view of a fuse carriage and ejection feature of the fuse holder shown in FIGS. 23-24.

As shown in the exploded view of FIG. 24, the fuse holder 1010 further includes $L_1$, $L_2$, $L_3$, carriages 1013, 1015, 1017 that correspond to the carriages 13, 15, 17 of the holder 10. As shown in FIG. 25, the carriages are biased by corresponding springs 1019a, 1019b, 1019c, that operate in the same manner as the carriages and springs of the holder 10 as explained above in connection with FIG. 3. The springs 1019a-c can be coil compression springs having a spring rate of 38.3 Nmm (218 lb/in)

Figure 26:
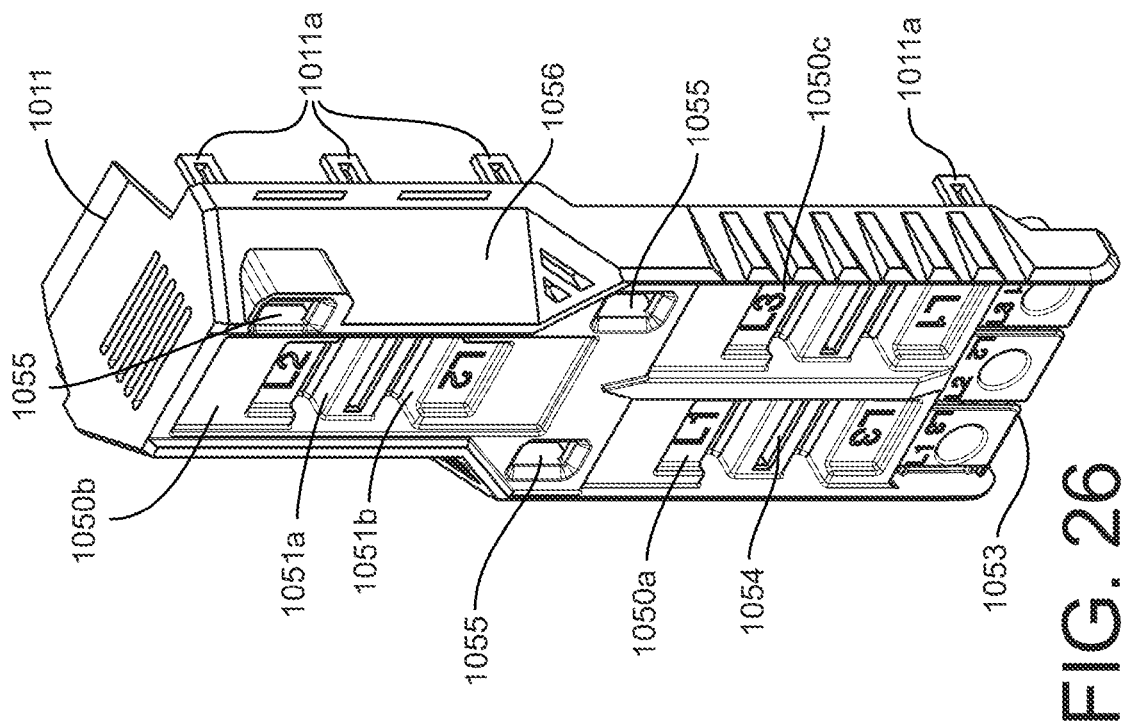
FIG. 26 is a perspective view of a housing for the fuse holder shown in FIGS. 23-24.
Figures 28, 29, 30:
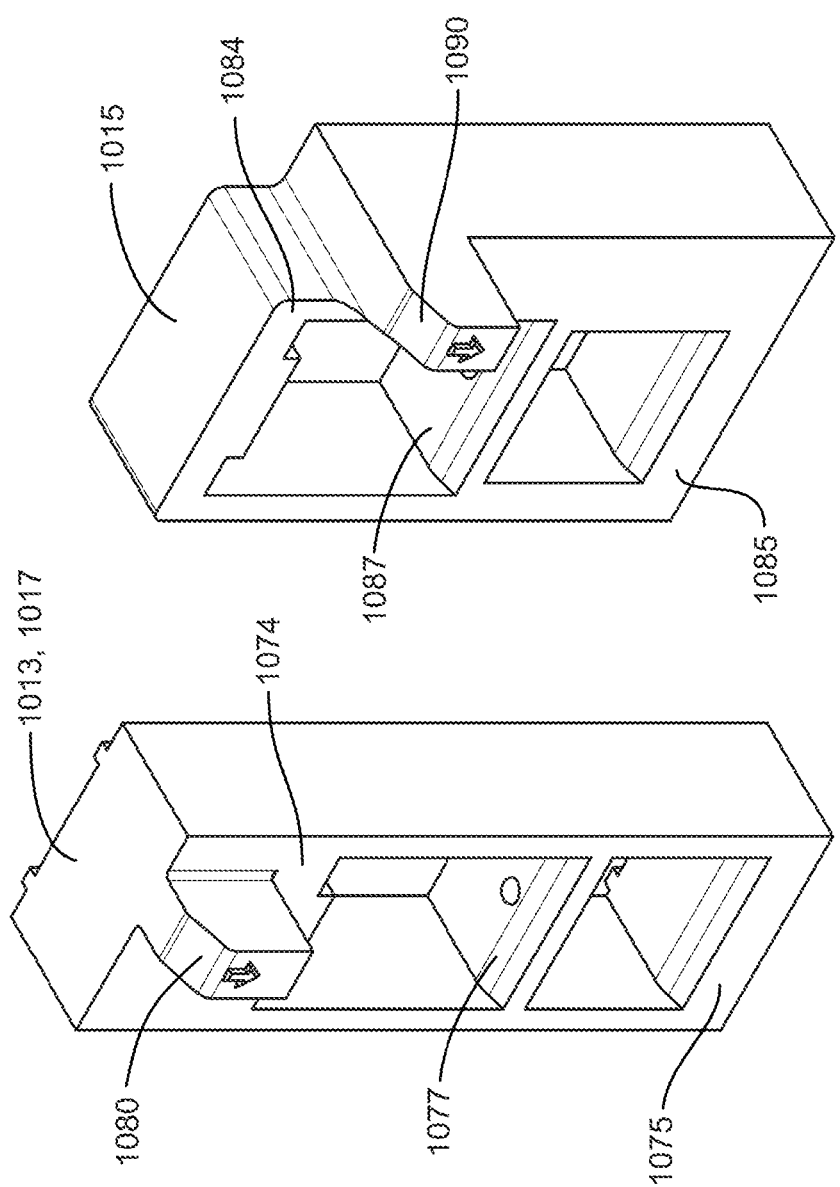
FIG. 28 is a perspective view of a carriage for the $L_1$ and $L_3$ conductors for the fuse holder shown in FIGS. 23-24.
FIG. 29 is a perspective view of a carriage for the $L_2$ conductor for the fuse holder shown in FIGS. 23-24.
FIG. 30 is a perspective view of a biasing spring used with the carriages shown in FIGS. 28-29.

The fuse holder 1010 provides a more streamlined and aesthetic appearance than the fuse holder 10. Thus, as shown in FIG. 26, the cover 1011 is less "boxy" than the cover 11 (FIG. 4). In one modification from the prior embodiment, the cover includes a pair of angled side walls 1056 on either side of the $L_2$ fuse bay 1050b. The angled walls 1056 reduce the footprint of the upper end of the fuse holder 1010 since the space on either side of the $L_2$ fuse bay is unused. As with the prior embodiment, the cover 1011 defines ejector slots 1054, and knife slots 1051a, 1051b in each bay to receive the respective knives K of the fuse F (FIGS. 42A, 42B). The cover also defines three tool openings 1055, which receive a tool T, like the openings 55, to eject a corresponding fuse from the holder. Two of the openings associated with the $L_1$ and $L_3$ bays are generally the same as the corresponding openings of the fuse holder 10. However, the tool opening 1055 for the $L_2$ bay of fuse holder 1010 extends outside one angled wall 1056, albeit in the same relative position as the opening 55 in the fuse holder 10.

Figure 32:
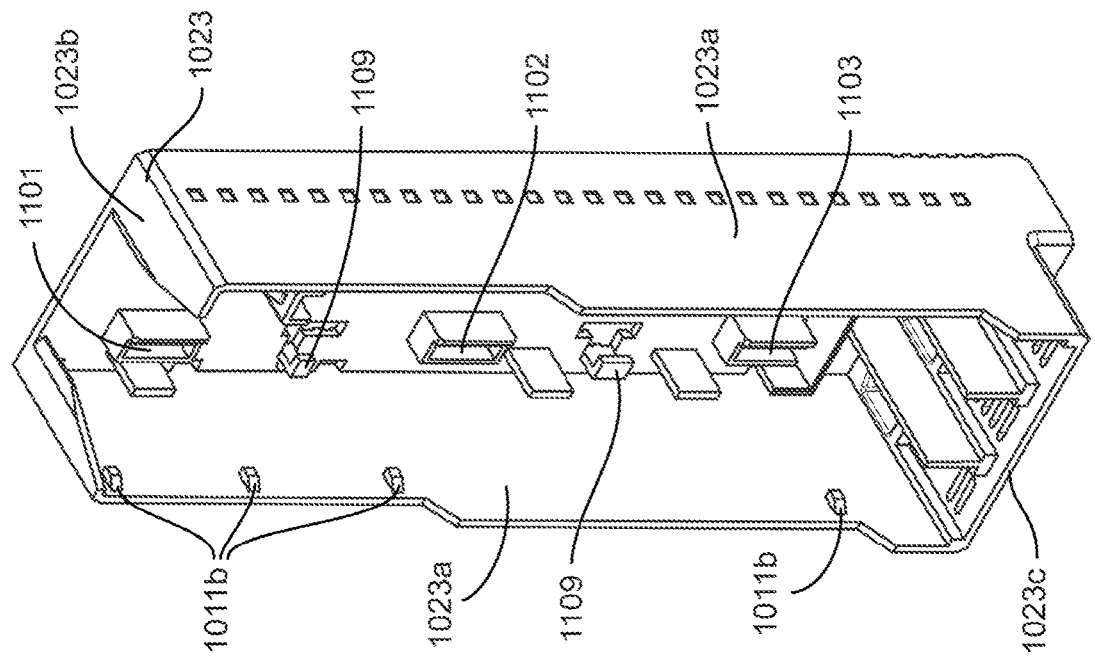
FIG. 32 is a perspective view of a base plate for the fuse holder shown in FIGS. 23-24.

In the prior embodiment fuse holder 10, the cover 11 has a depth sufficient to encompass the base plate 23. In the fuse holder 1011, it is the base plate 1023 that has a depth sufficient to encompass the cover 1011, as shown in FIGS. 24, 26 and 32. The cover and base plate can be configured for releasable mechanical engagement, or can be fixed together such as by glue or welding. In certain embodiments, the releasable mechanical engagement can include engagement latches 1011a formed on either side of the cover that are configured for snap-fit or press-fit engagement with corresponding ramps 1011b defined on the inside of side walls 1023a of the base plate 1023. As with the cover and base plate of the holder 10, the cover and base plate of the holder 1010 are configured to be pressed together with a snap-fit or press-fit engagement between the latches 1011a and ramps 1011b.

Figure 27:
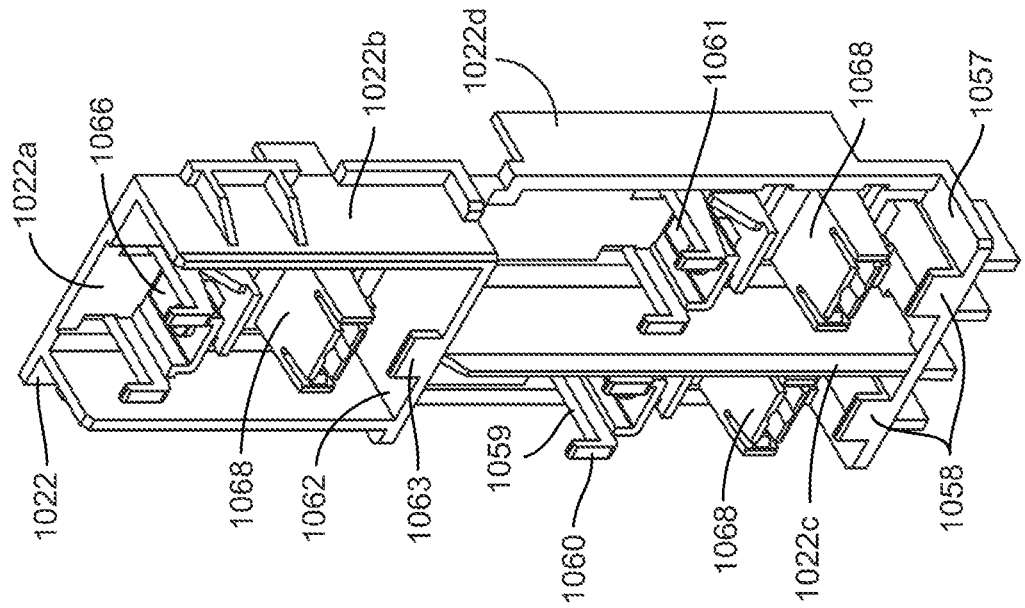
FIG. 27 is a perspective view of a first front plate for the fuse holder shown in FIGS. 23-24.

The fuse holder 1010 includes a plate arrangement with a first front plate 1022 that performs the same function as the first front plate 22 of the prior embodiment, but does so in a narrower space, as can be seen by comparing FIG. 27 to FIG. 5. Like the first plate 22, the first front plate 1022 includes stops and retainer flanges for supporting the carriages 1013, 1015, 1017 and the biasing springs 1019. The first front plate 1022 also includes the ejector guides 1068 for guiding and supporting the ejectors 1040. Unlike the first front plate 22, the first front plate 1022 includes side walls 1022b and 1022d, and center wall 1022c projecting from a back wall 1022a. These walls add stiffness to the first front plate and fuse holder and electrically isolate the $L_1$ and $L_3$ phases from each other and from the cover and base plate. Otherwise, the components of the first front plate 1022 are the same and function the same as the like components of the first front plate 22. It can be appreciated that the location and orientation of the carriages 1013, 1015, 1017 and the features supporting the load conductors 1026, 1027, 1028 and line conductors 1030, 1031, 1032 are dictated by the configurations of the fuses F and of the busbar device B to which the fuse holder is connected.

The $L_2$ carriage 1015 is substantially similar to the carriage 15, including the placement and orientation of the release post 1090. However, the $L_1$ and $L_3$ carriages 1013, 1017 are modified from the carriages 13, 17 in that the release post 1080 is centrally located relative to the width of the carriage. In the carriages 13, 17 of the prior embodiment, the release posts 80 were offset to an outboard position. In order to maintain the reduced profile, the release posts 1080 have been shifted centrally, together with the associated tool openings 1055 that provide access to the release posts. Like the prior embodiment, the carriages are biased by a biasing spring 1019 that is disposed between the biasing spring plate 1074, 1084 of the carriage and the respective biasing spring support 1061, 1062 of the first front plate 1022.

However, unlike the prior embodiment, the carriages 1013, 1015, 1017 do not include the leaf springs 78, 88. In the fuse holder 10, the leaf springs applied biasing pressure to the load and line conductors. In the fuse holder 1010, the biasing effect is provided by the configuration of the conductors themselves. As shown in FIGS. 36-41, each of the load conductors 1026, 1027, 1028 is similar in configuration to the load conductors 26, 27, 28, with each load conductor including a terminal contact portion, 1026c for instance, for establishing electrical contact with one of the wire terminals 1035, and a fuse contact portion, 1026b for instance, for establishing electrical contact with the knife of a fuse. Each of the line conductors 1030, 1031, 1032 is similar in configuration to the line conductors 30, 31, 32, with each line conductor including a fuse contact portion, such as 1030b, for electrical contact with the knife of a fuse, and a busbar contact portion, such as 1030c, for establishing electrical contact with a busbar device. The six conductors are arranged in the fuse holder 1010 to establish electrical contact between the fuse knives K and the wire terminals 1035 as well as the contact slots S in the busbar device B. The line conductors 1030-1032 are configured like the line conductors 30-32 so that the busbar contact portions are arranged vertically from $L_1$ to $L_3$, while the fuse contact portions are arranged with the $L_1$ and $L_3$ fuse contact portions laterally adjacent and the $L_2$ contact portion vertically above the other two phases.

In the fuse holder 1010, the fuse contact portions 1026b, 1027b, 1028b, 1030b, 1031b, 1032b are oriented at less than a 90° angle relative to the respective anchor legs 1026a, 1027a, 1028a, 1030a, 1031a, 1032a. In one specific embodiment, the fuse contact portions are at an 88° angle relative to the anchor leg. The fuse contact portions are configured to flex when contacted by the fuse knife K. To facilitate this flexing, the conductors define a slot 1026d, 1027d, 1028d, 1030d, 1031d, 1032d in the bend between the anchor leg and the fuse contact portion. This slot reduces the stiffness of the bend so that the fuse contact portions can deflect as needed when the fuse knife is inserted into engagement with the contact portions. The fuse contact portion, such as the contact portions 1028b and 1032b in FIG. 25, bears directly against the respective clamping plates 1077, 1075. The knives K of the fuse are interposed between the fuse contact portions 1028b, 1032b and the clamping plates 1077, 1075, to push the carriage upward (to the right in FIG. 25) against the biasing springs 1019. As the springs are compressed, they exert increasing pressure on the knives K to effectively clamp the knives against the fuse contact portions.

Figure 31:
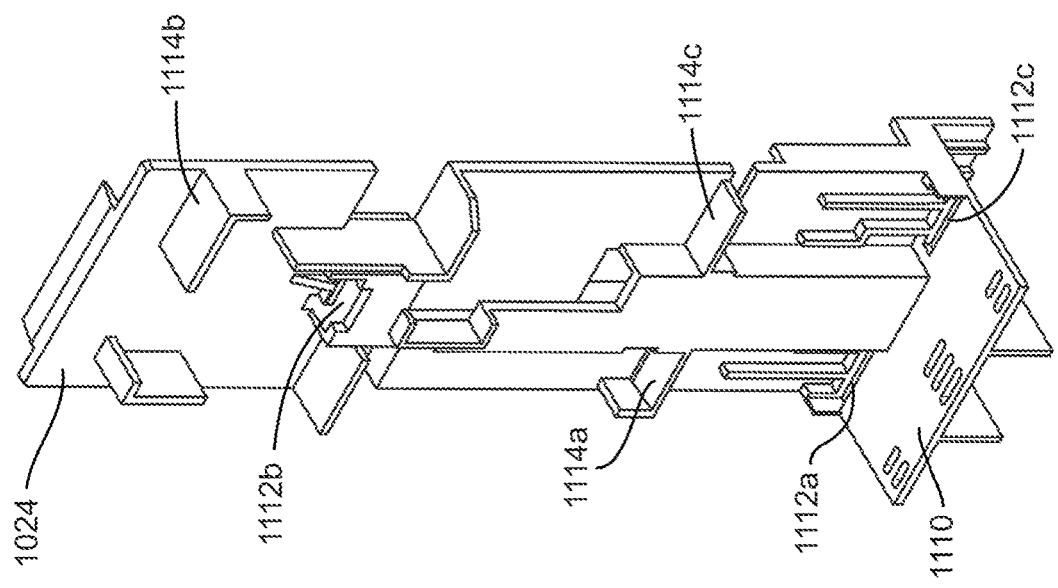
FIG. 31 is a perspective view of an intermediate plate for the fuse holder shown in FIGS. 23-24.

Moving back to FIG. 31, the second intermediate support plate 1024 is similar to the second intermediate plate 24, albeit narrower to fit within the narrower envelope of the fuse holder 1010. As with the intermediate plate 24, the intermediate plate 1024 carries the electrical conductors 26-28, 30-32, holding them in a fixed orientation within the base plate 1023. As mentioned above, the base plate 1023 of the fuse holder 1010 differs from the base plate 23 of the holder 10. However, like the prior base plate, the base plate 1023 includes the slots 1102, 1103 through which the busbar contact portions of the line and load conductors extend. The base plate 1023 includes side walls 1023a, a top wall 1023b and a bottom wall 1023c configured to receive the intermediate plate 1024 with the electrical conductors supported thereon, the first front plate 1022 with the carriages 1013, 1015, 1017 and associated biasing springs supported thereon, and the cover 1011. As reflected in FIG. 23, the walls of the cover align with the walls of the base plate when the two components are in snap-fit engagement.

The fuse holder 1010 includes an engagement mechanism configured to engage the fuse holder to a busbar device. In one embodiment, the engagement mechanism can include a latch plate 1037 and biasing springs 1038 that are identical to the latch plate 37 and spring 38 of the prior holder. The latch plate 1037 provides the interface for engaging the fuse holder 1010 to latch openings L of the busbar device B, as described above, and as shown in FIGS. 46A, 46B.

Figure 45:
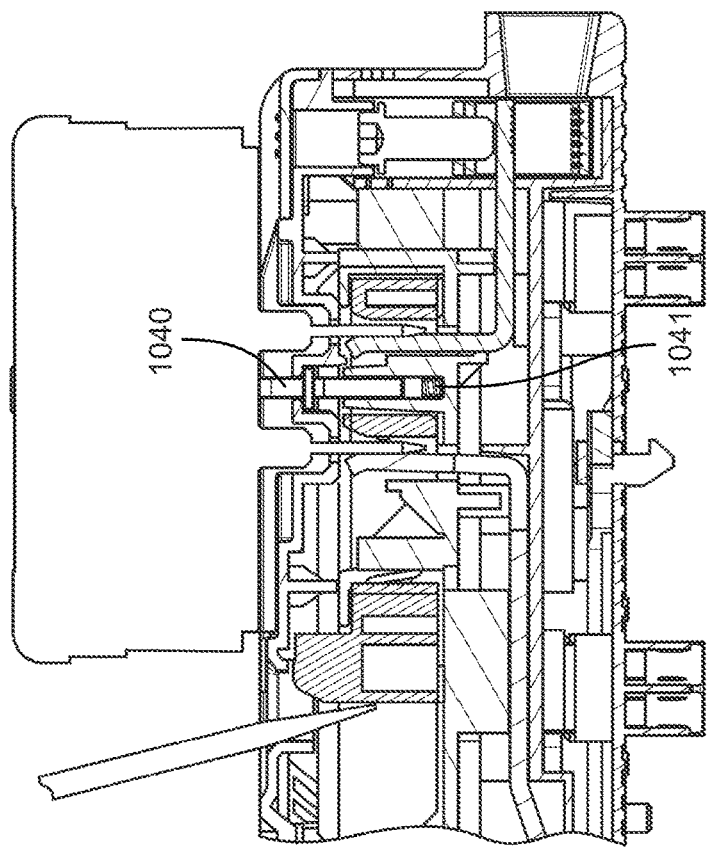
FIG. 45 is a side partial cross-sectional view of the fuse holder shown in FIG. 44 showing a second step of removing a fuse.
Figure 44:
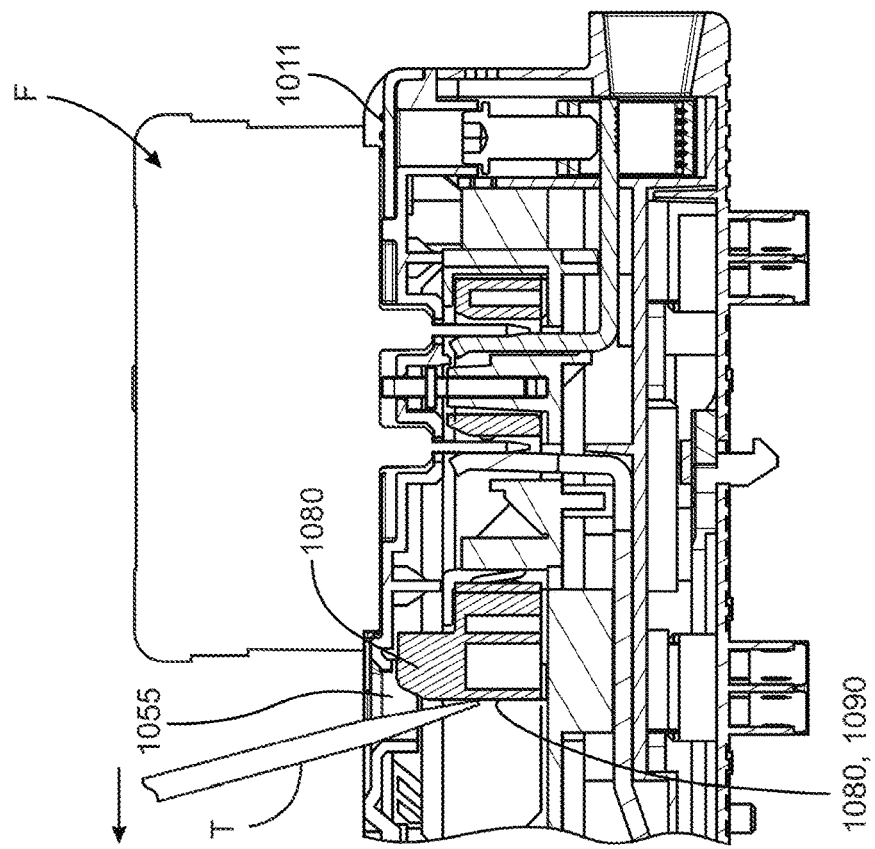
FIG. 44 is a side partial cross-sectional view of the fuse holder of the present disclosure showing a first step of removing a fuse.
Figure 46B:
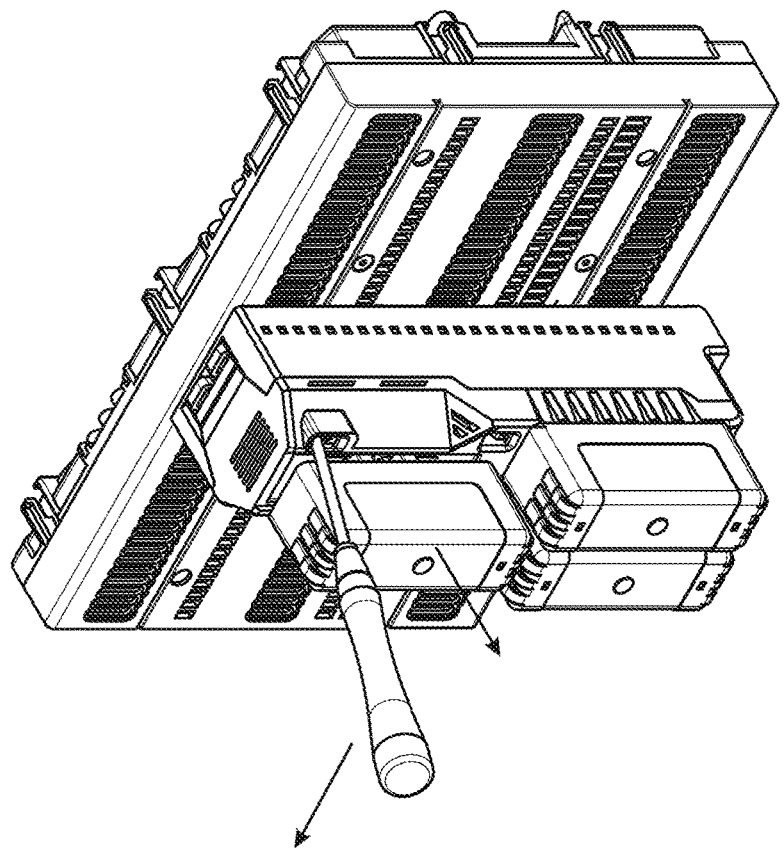
FIGS. 46A-46B are perspective view of the fuse holder of the present disclosure mounted on a busbar device of the type shown in U.S. Pat. No. 10,700,464.
Figure 46A:
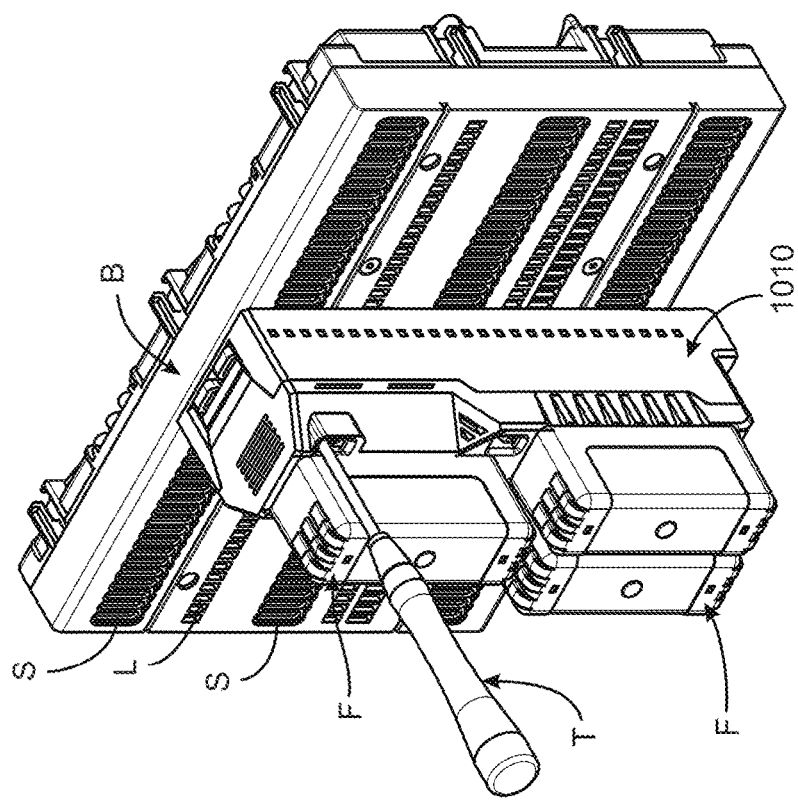

The manner of insertion and removal of a fuse F on the fuse holder 1010 is shown in FIGS. 42a-45. The manner of operation is identical to the operation of the fuse holder 10 shown in FIGS. 18-21 and as described above. To reiterate, the biasing springs 1019 bias the carriages 1013, 1015, 1017 toward the fuse contact portions of the respective line and load conductors. As the fuse F is introduced into the holder, the knives K move between the fuse contact portions (such as contact portions 1026b, 1030b shown in FIG. 43) and the carriages to move the carriages to the right in the drawings, thereby compressing the biasing springs 1019. As the fuse is pushed further into the fuse holder, the body of the fuse contact portions the ejector 1040 and compresses the spring 1041, which can have the same properties as the spring 41 discussed above. The spring force of the biasing springs is calibrated to provide sufficient frictional force to hold the fuse knives in position and avoid accidental dislodgement. As shown in FIGS. 44-45, the fuse can be removed by levering the tool T against the release post 1080 to push the carriage further to the right to relieve the frictional contact between the carriage and the fuse knife K. When the frictional pressure is removed, the spring 1041 pushes the ejector 1040 outward, which in turn pushes the body of the fuse F away from the fuse holder 1010. The ejector 1040 is configured similar to the ejector 40, as seen by comparing FIG. 34 to FIG. 11. One modification is that the ejector includes notches 1124 formed adjacent the prongs 1120. This feature provides some flexibility to the prongs as they contact the body of the fuse F. The prongs deflect slightly when the fuse is pushed into the holder, and this slight deflection generates a force to assist the spring 1041 in ejecting the fuse from the holder.

Another embodiment of a fuse holder 2010 is shown in FIGS. 47-60 that eliminates the ejectors 40, 1040 of the previous embodiments and that replaces the spring-based frictional engagement of the fuse knife with a direct mechanical locking mechanism. Like the fuse holders 10 and 1010, the fuse holder 2010 includes a cover 2011 and base plate 2023 that house and insulate the line and load coppers disposed therein and that can be releasably mechanically engaged to each other. The cover 2011 defines three fuse bays 2050a-c, with indicia 2052a-c provided to identify the particular line of the particular line phase that the associated fuse is to be connected across. The front cover includes a removable terminal cover 2043 that allows access to wire terminals 2035 that are in electrical contact with the $L_1$-$L_3$ load conductors 2026-2028 as in the prior embodiments. The fuse holder 2010 includes a plate arrangement with a front plate 2022 that supports carriages 2013-2017, and an intermediate plate 2024 that supports the load conductors and the line conductors 2030-2032, all in substantially the same manner as the front and intermediate plates of the prior fuse holders. The fuse holder 2010 includes an engagement mechanism configured to engage the fuse holder, with fuses mounted therein, to a busbar device. In one embodiment, the engagement mechanism can include a cross-board latch 2037 and a biasing spring 2038 integrated into the base plate 2023 and operable in the same manner as the fuse holders 10, 1010. The cross-board latch includes latches 2037a similar to the latches 118 and 1118 that are adapted to engage corresponding slots in the busbar device B as described above. The fuse holder 2010 orients the three phases in the same manner as the fuse holders 10, 1010 with two phases laterally adjacent and the third phase vertically oriented relative to the other two phases. It can be appreciated that the fuse holder 2010 is substantially similar to the fuse holders 10, 1010, except for the modification described below.

In one modification from the other fuse holders, the conductors are each provided with a pair of spring-biased contacts for engaging the corresponding knives of a fuse mounted on the fuse holder 2010. Using the $L_2$ load conductor 2027 as an example, each conductor includes a leg 2027a that includes a wire terminal contact 2027c at one end and is bent into a fuse contact portion at the opposite end, which portion includes two contacts 2027b facing each other. As is known in the art, one of the contacts 2027b is an extension of the leg 2027a, while the other contact 2027b is affixed to the leg in a known manner. The two contacts 2027b are capable of deflecting apart to receive the knife of a fuse therebetween. In one feature of the fuse holder 2010, a wire spring 2027d encircles the two contacts 2027b to bias the two legs toward each other. The wire spring 2027d is stretched on the introduction of a knife between the contacts so that the increased spring force clamps the knife between the contacts. The wire spring 2027d has a spring force that is primarily calibrated to simply hold the contacts 2027b in solid electrical contact with the fuse knife. The spring force does not require significant manual force by the user to push the fuse knife between the contacts 2027b. In particular, the spring force is not strong enough to clamp the fuse knife, as in the fuse holders 10 and 1010 described above.

Figure 49:
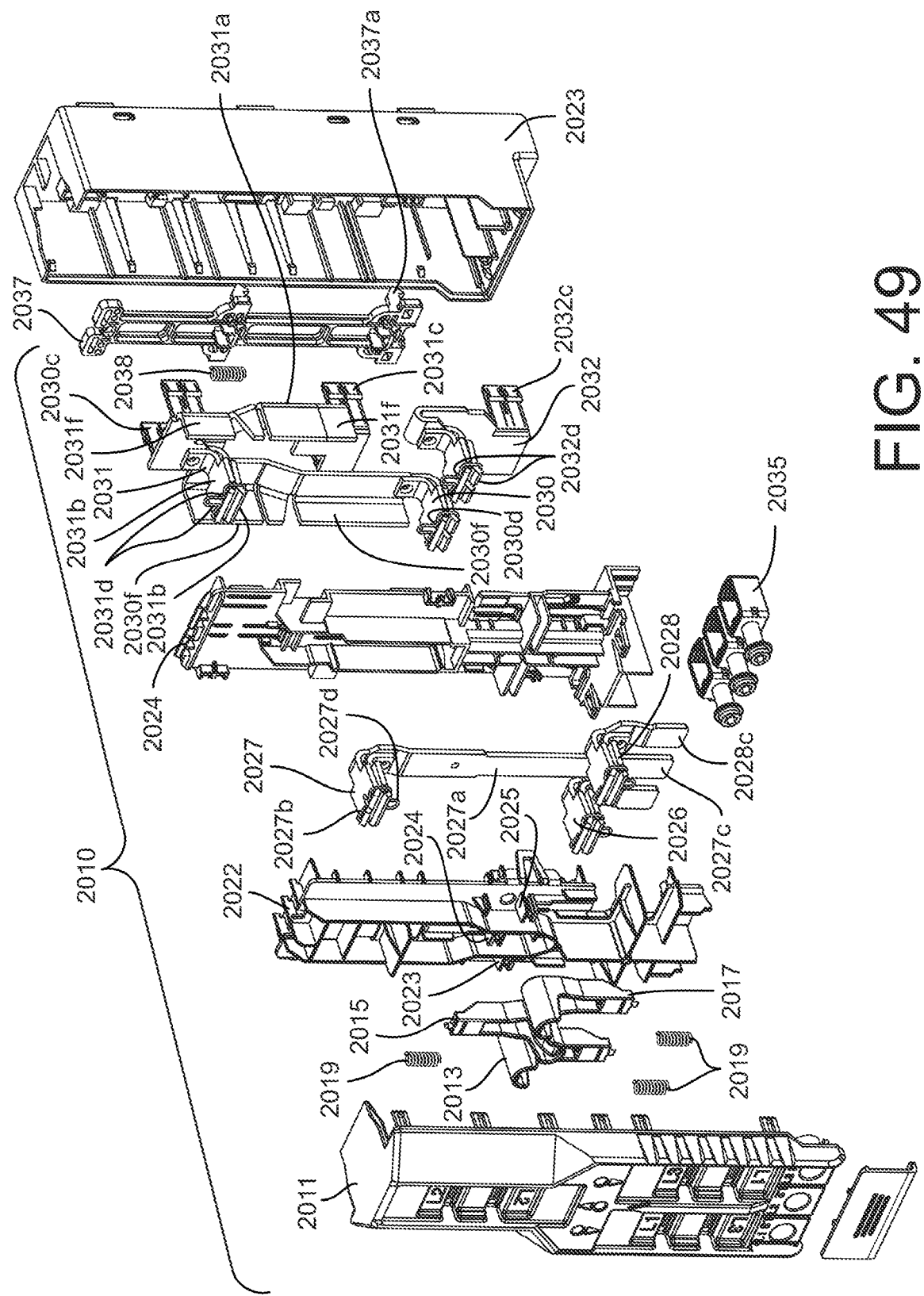
FIG. 49 is a second exploded vide of the fuse holder shown in FIG. 47.

As shown in FIG. 49 in particular, each load conductor 2026-2028 and each line conductor 2030-2032 includes the same spring-biased fuse contact portion. The free ends of the contacts, such as contacts 2028b and 2032b shown in FIG. 51, are angled away from each other to help guide the knife K of the fuse F between the contacts.

The load conductors 2026-2028 are configured so that the terminal contacts 2026c-2028c are in contact with the wire terminals 2035 when the conductors are supported on the front plate 2022, in a manner similar to the prior embodiments. Likewise, the line conductors 2030-2032 are configured so that the busbar contacts 2030c-2032c extend through the base plate 2023 in the manner described above when the line conductors are supported by the intermediate plate 2024.

Figure 50:
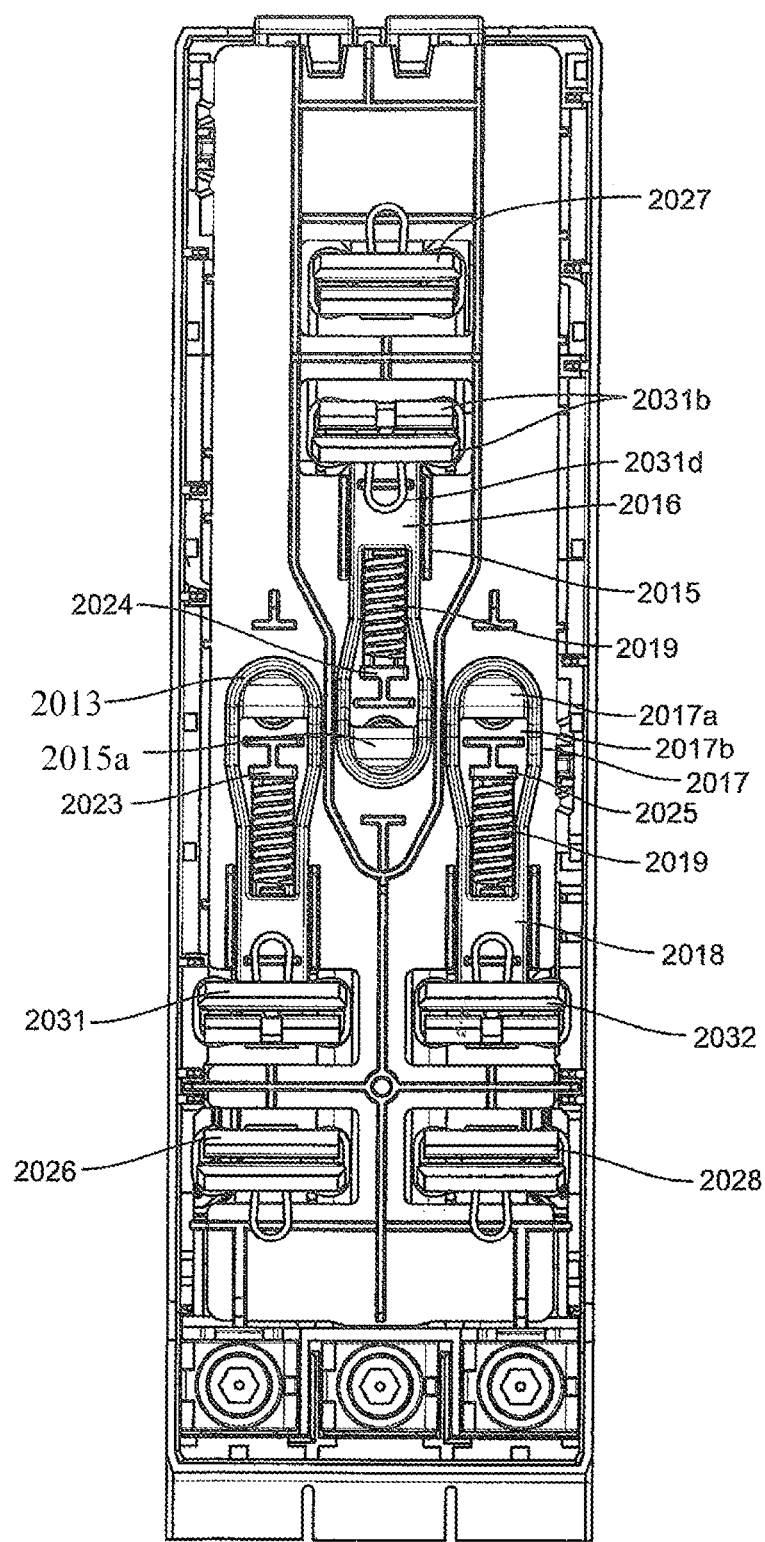
FIG. 50 is a top view of the fuse holder shown in FIG. 47 with the cover removed.

As indicated above, the fuse holder 2010 does not rely upon spring force and friction to hold the fuse knife between the contacts 2026b-2028b. Thus, the locking mechanism includes modifications to the carriages from the other fuse holders in the fuse holder 2010. Each phase includes a corresponding carriage 2013, 2015, 2017 that is slidably supported by the front plate 2022. The carriages are generally elongated tear-drop shaped, as best seen in FIG. 50, with a central opening 2017b. The opening is sized and arranged to fit over an anchor plate 2025 extending from the front plate (FIG. 49, 50). The carriages, such as carriage 2017 in FIG. 50, are elongated to receive a biasing spring 2019 that is disposed between a corresponding anchor plate 2025 and a locking body 2018 that is fixed within the carriage 2017. Thus, the spring 2019 is configured to push the locking body 2018 downward toward a corresponding line conductor 2030-2032, as shown in FIG. 50. The carriage 2017, as well as the other carriages, includes a cam element 2017a at the end of the carriage opposite the locking body 2018.

Figure 51:
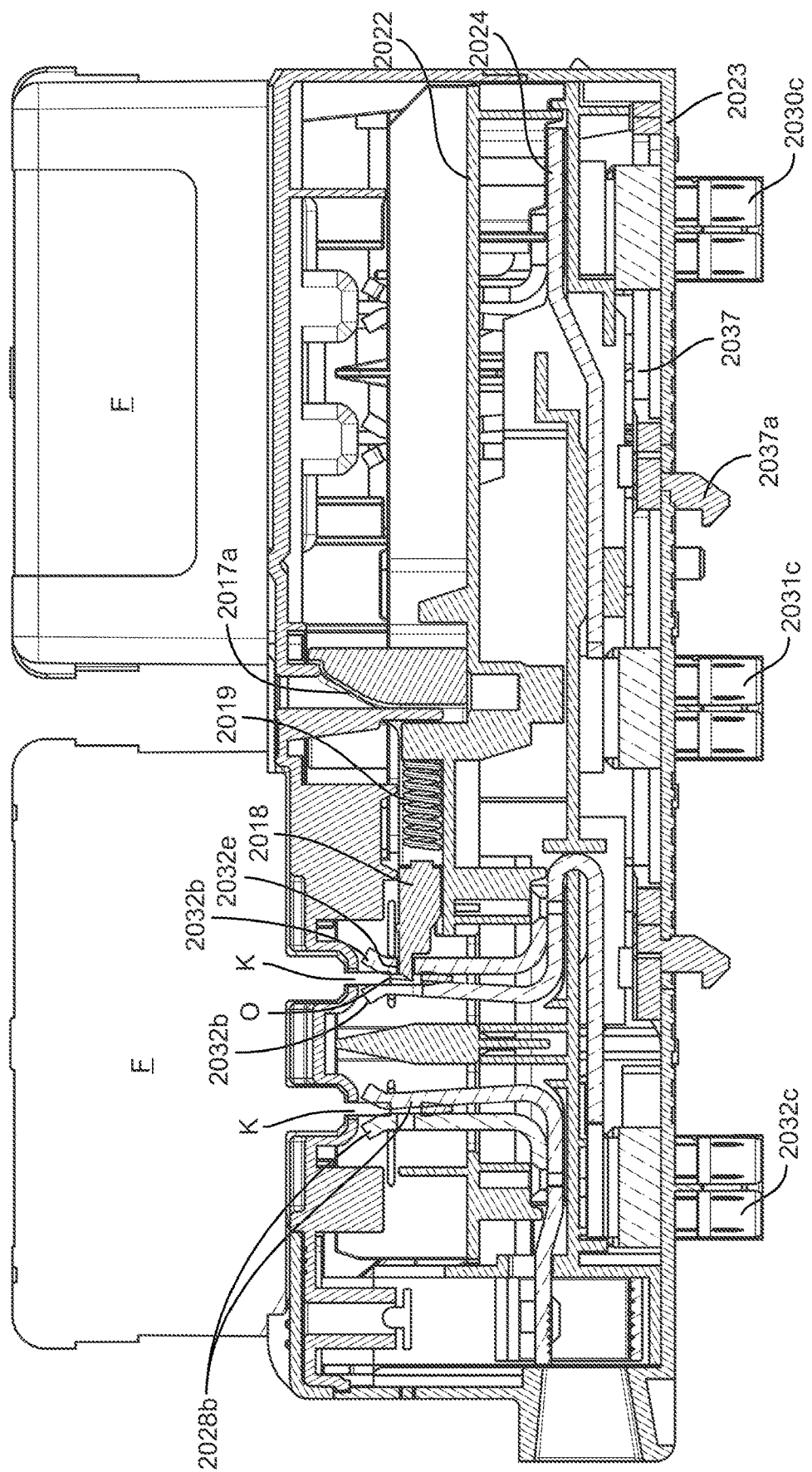
FIG. 51 is a side cut-away view of the fuse holder shown in FIG. 47 with two fuses engaged to the holder.
Figure 52:
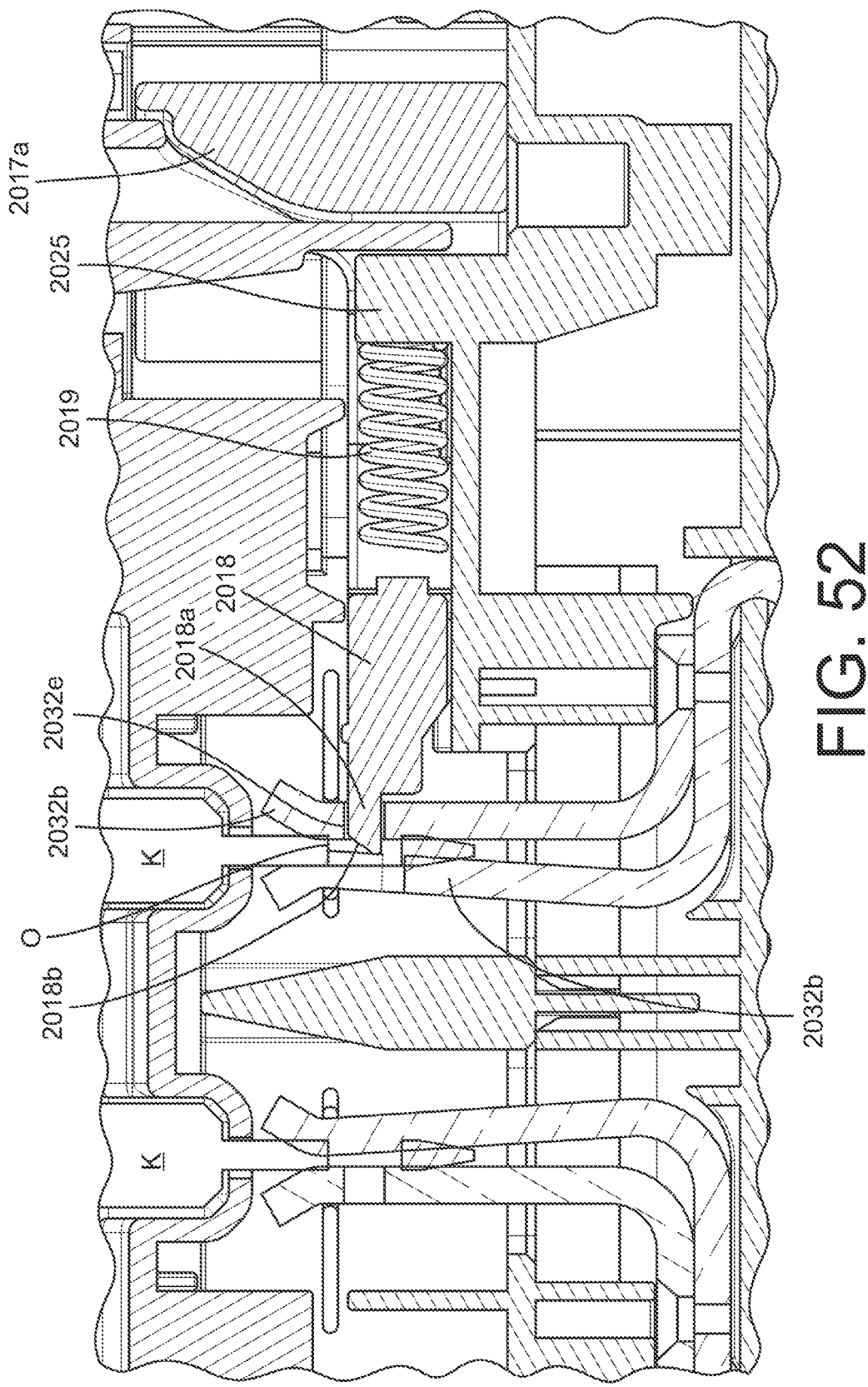
FIG. 52 is an enlarged view of the locking mechanism of the fuse holder of FIG. 51 for locking the knife blades of the fuse.
Figure 53:
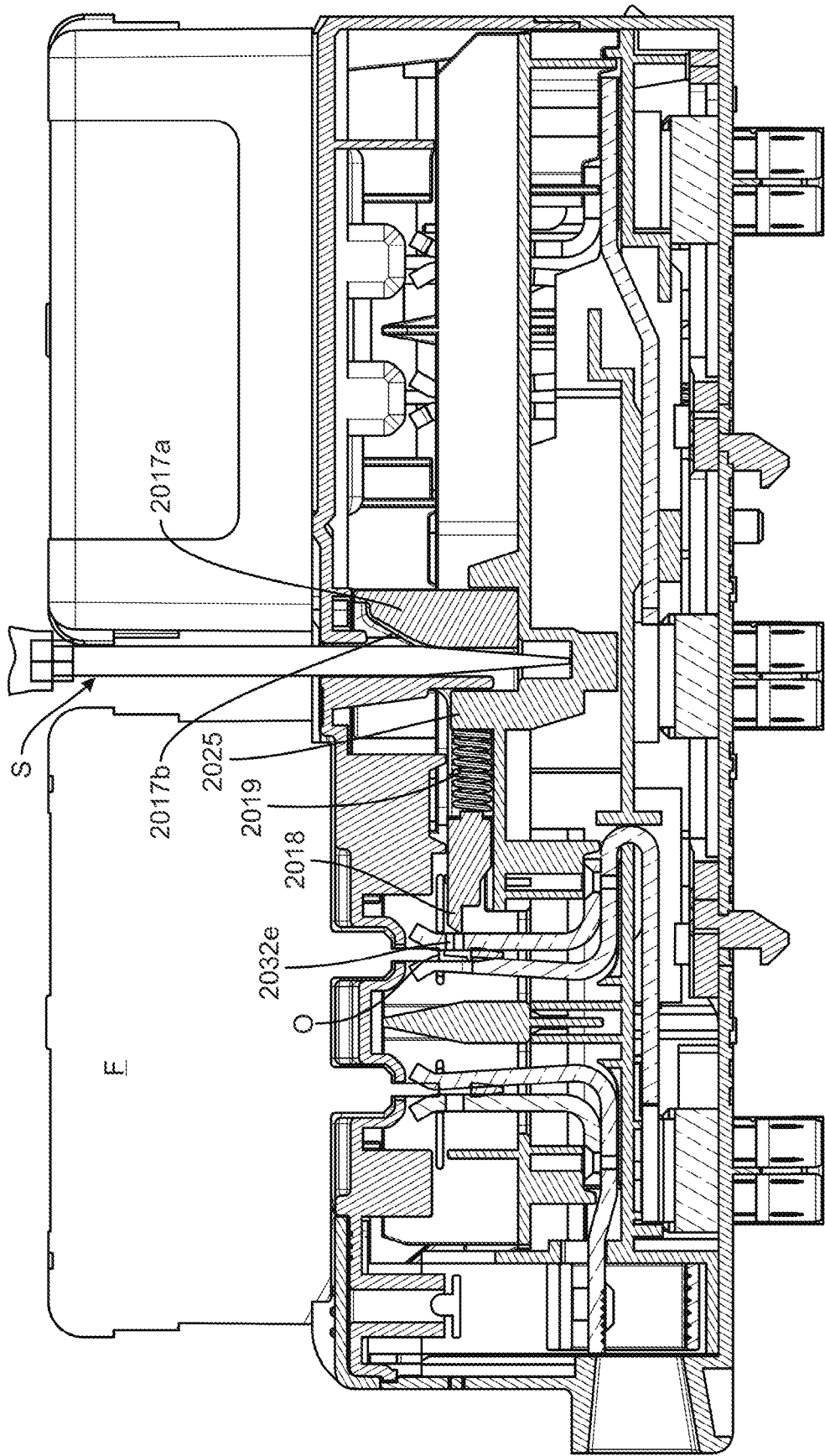
FIG. 53 is the side cut-away view of the fuse holder shown in FIG. 51 with a tool used to release the locking mechanism.

Details of the locking mechanism, and particularly the carriages and their operation, are best seen in FIGS. 51-53, which focus on the carriage 2017 that operates on the line conductor 2032. It is, of course, appreciated that the other carriages are configured and operated in the same manner. The locking body 2018 includes a needle 2018a protruding toward the conductor 2032. The near-most contact 2032b of the conductor defines a hole 2032e through which the needle 2018a extends in the locking position of the carriage, as shown in FIGS. 51-52, although a hole can be provided in the other contact as well. The knife K of the fuse F also defines a hole O through which the needle also extends. It can be appreciated that the needle 2018a prevents removal of the knife K by mechanical interference between the needle the hole O in the knife. Since the locking feature of the carriage is due to this mechanical interference, the spring force needed for the spring 2019 is much less than the clamping spring forces required for the fuse holders 10, 1010. In particular, the spring force only needs to hold the needle 2018a in position within the hole 2032e in the conductor contact 2032b and within the hole O of the knife. In one specific embodiment, that force is 5N.

As best seen in FIG. 52, the needle 2018a includes a beveled tip 2018b. The beveled tip 2018b is engaged by the knife as the knife K is inserted between the contacts 2032b, at which point the angled surface of the beveled tip acts as a cam surface to push the needle and the locking body 2018 away from the conductor 2032 (to the right in FIG. 52). This action pushes the locking body 2018 against the spring 2019 to compress the spring against the anchor plate 2025. In one specific embodiment, the spring is compressed to a force of 15N to allow the knife K to pass in between the contacts 2032b. Once the hole O is lined up with the hole 2032e in the contact, the spring 2019 pushes the needle 2018a into the hole to lock the knife.

The knife K is mechanically locked within the fuse holder by the spring-biased needle 2018. The lock can be easily released by a tool, such as a screwdriver S extending through a tool opening 2055a, 2055b, 2055c (see FIG. 50), as shown in FIG. 53. As described above, the carriage 2017 includes a cam element 2017a at the end of the carriage opposite the locking body 2018. In particular, the carriage is configured so that the cam element 2017a is outboard of the anchor plate 2025 when the carriage is mounted on the front plate 2022, as shown in FIGS. 50-53. As best seen in FIG. 53, the cam element defines a curved surface 2017b that is contacted by the tip of the tool S. As the screwdriver S is pushed into the carriage the tip bears against the curved surface 2017b to gradually push the cam element, and thus the carriage 2017 and the locking needle 2018a, away from the knife K. This camming motion compresses the spring 2019 as the needle is moved away from the knife until the needle 2018a moves out of the hole O in the knife K and the hole 2032e in the contact. As noted above, the spring force when the needle leaves the hole O is about 15N, which is easily overcome by manual manipulation of the screwdriver S.

In an alternative embodiment, the tool opening 2055a, 2055b, 2055c can be replaced with a manually operated button that includes the elongated tool S. Pressing the button pushes the tool against the curved surface 2017b in the same manner as the use of a separate screwdriver.

Figure 47:
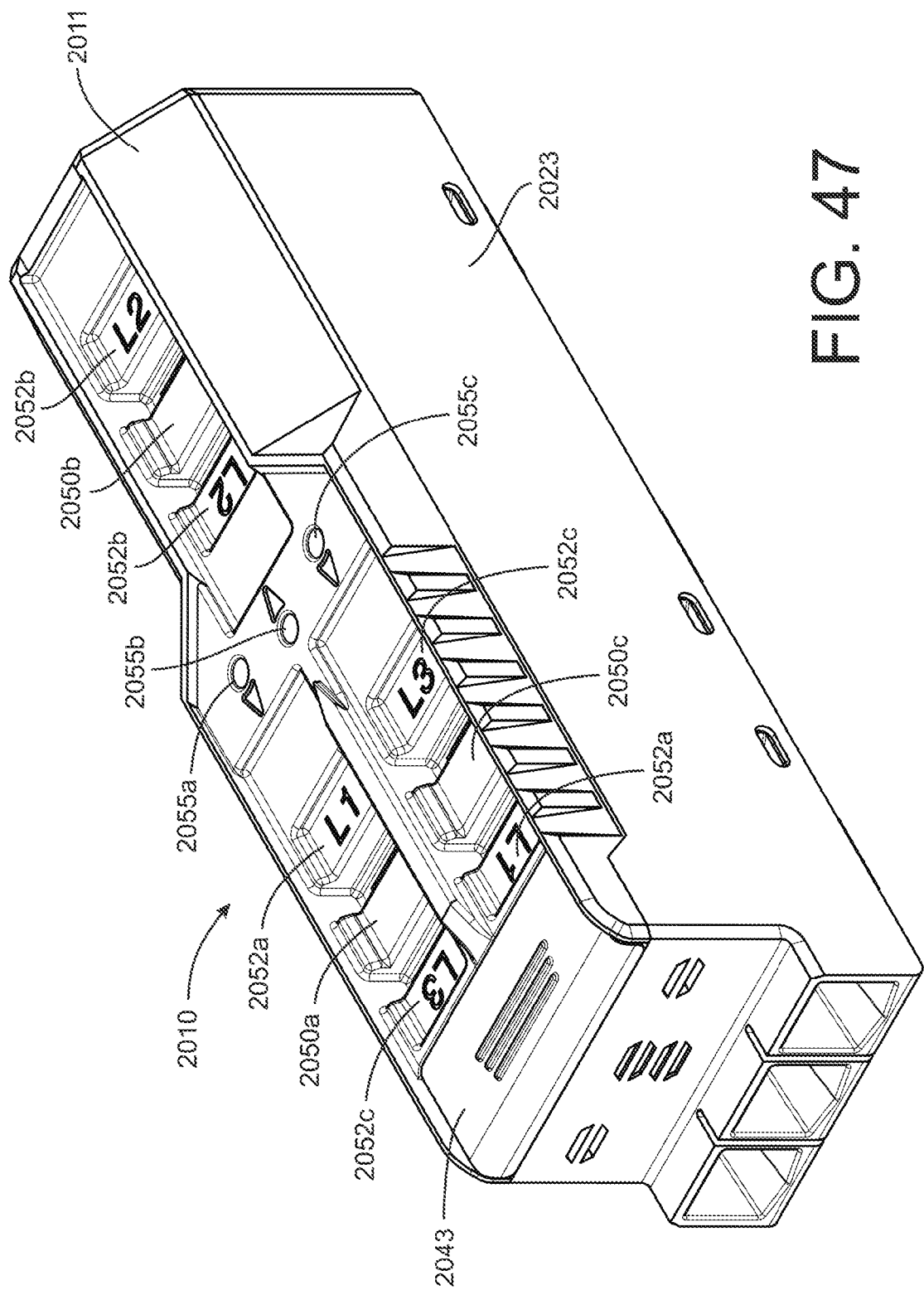
FIG. 47 is a perspective view of a fuse holder of another embodiment of the present disclosure.
Figure 48:
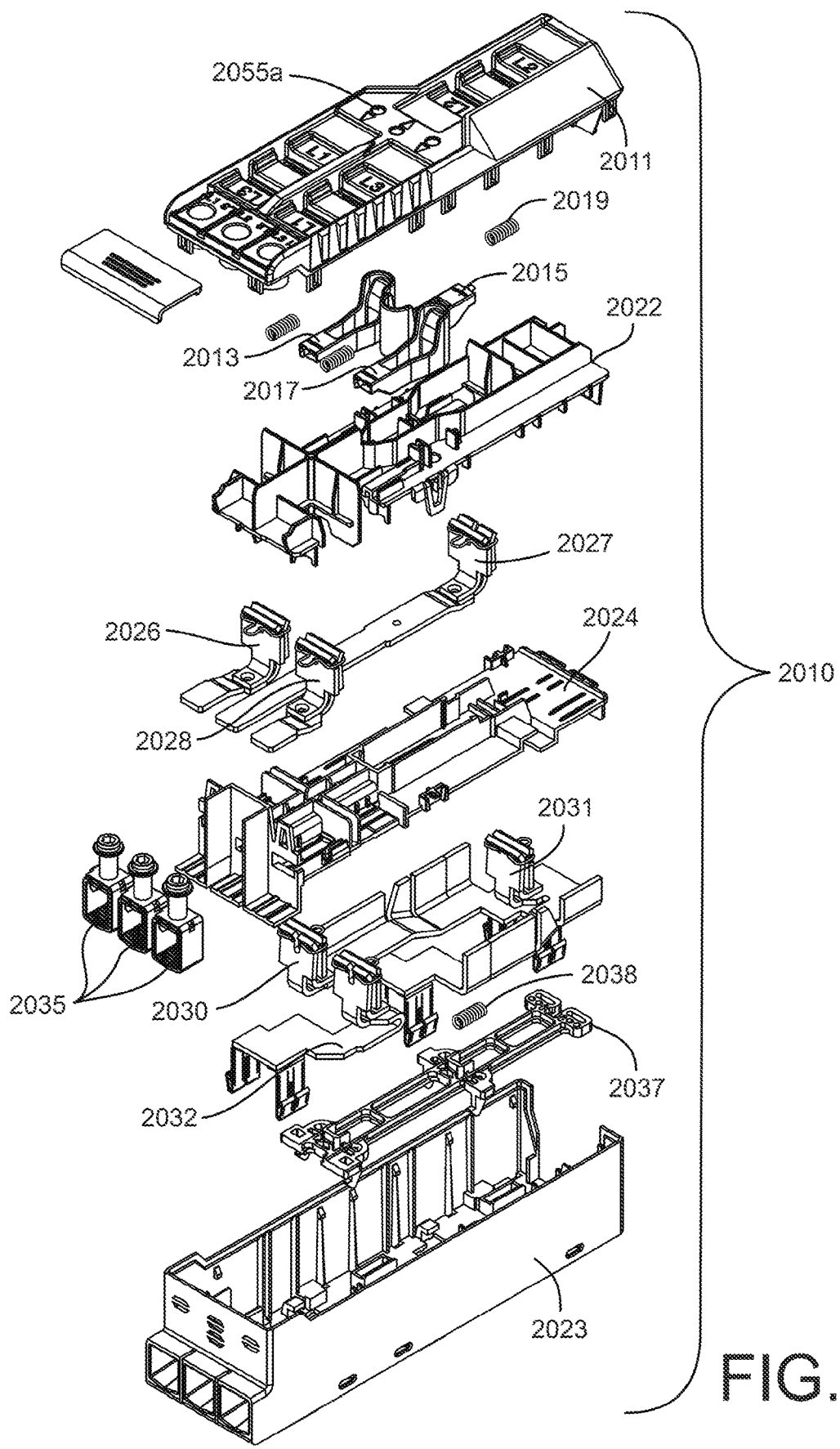
FIG. 48 is an exploded vide of the fuse holder shown in FIG. 47.

As shown in FIG. 50, the cam elements 2018 of the carriages 2017 for each phase are aligned with each other. The cover 2011 defines three tool openings 2055a, 2055b, 2055c aligned with the cam elements of the three carriages, as shown in FIG. 47. Each opening includes an indicator arrow pointing to the particular phase associated with the particular carriage so that the user can select which fuse to remove.

Figure 54:
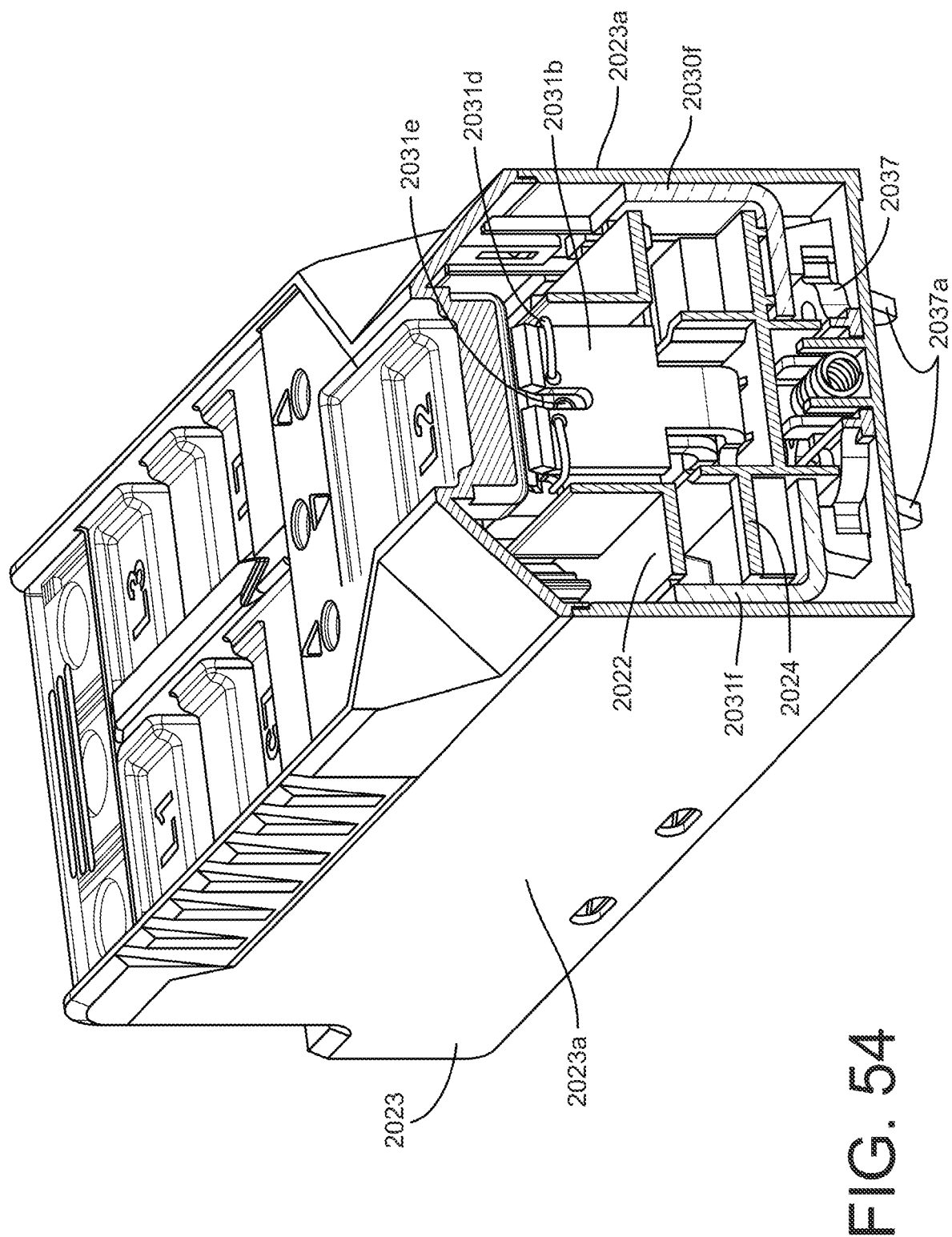
FIG. 54 is an end perspective view of the fuse holder shown in FIG. 47, with an end wall of the base plate removed.
Figure 55:
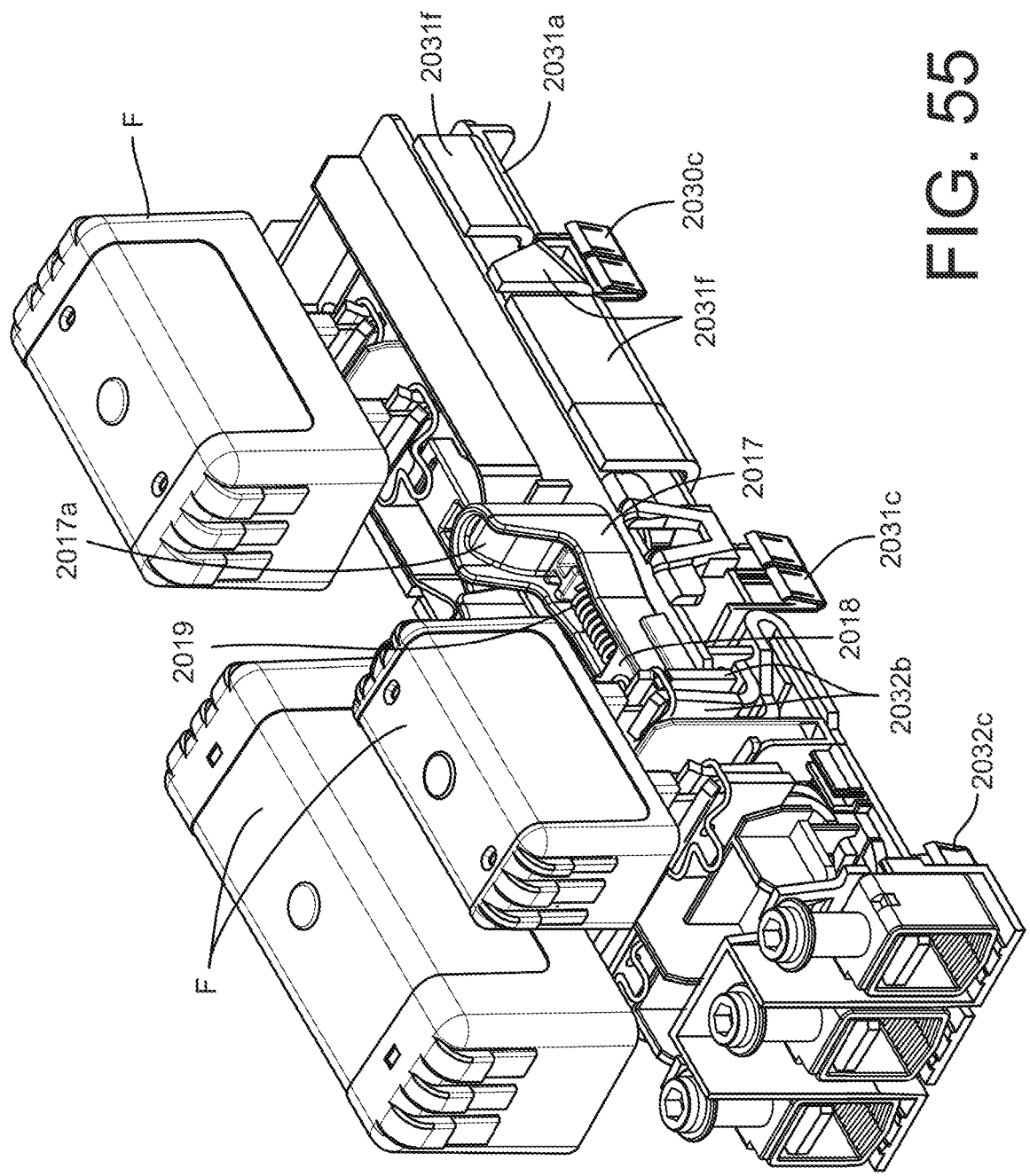
FIG. 55 is a perspective view of the fuse holder of FIG. 47 with the cover and the base plate removed and three fuses engaged to the fuse holder.

Another feature of the fuse holder 2010 is illustrated in FIGS. 49, 54 and 55. In this feature, each of the line conductors 2030-2032 are provided with heat dissipation features. It is known that current running through the conductors causes the temperature of the conductors to increase. The conductors thus become heat generators within the fuse holder 2010. This feature directs the heat generated by the conductors to the side walls 2023a of the base plate 2023. In particular, at least two of the conductors, 2030 and 2031, includes at least one wing, 2030f and 2031f, extending from a lateral edge of the corresponding leg 2030a, 2031a, as best seen in FIG. 49. As shown in FIG. 54, the wings are arranged for direct heat transfer contact with the side walls 2023a of the base plate 2023. The wings 2030f, 2031f are configured to extend along most of the length of the corresponding legs to maximize the heat transfer surface for optimal heat dissipation. The wings can be integral with the arm of the corresponding conductor or can be separately attached to the arm in a heat conductive manner. Preferably, the wings are stamped with the arm of the conductor and then bent relative to the arm, as shown in FIG. 49. The third conductor 2032 does not include similar wings because the conductor is centrally located within the fuse holder 2011.

In order to maximize the heat dissipation capability of the fuse holder 2011, the base plate 2023 is formed of a heat conductive plastic or resin material. In one embodiment, the material has a thermal conductivity of at least 0.9 W/mK. In a specific embodiment, the material of the base plate is impregnated with heat conductive components, such as glass fibers or conductive powders. One suitable material is polyamide 6.6 (PA66) that is a heat-stabilized, electrically neutral moldable polyamide. Heat generated by the conductors 2030, 2031 is thermally conducted by the wings 2030f, 2031f to the side walls 2023a, where convection draws the heat to the ambient air.

Figure 56:
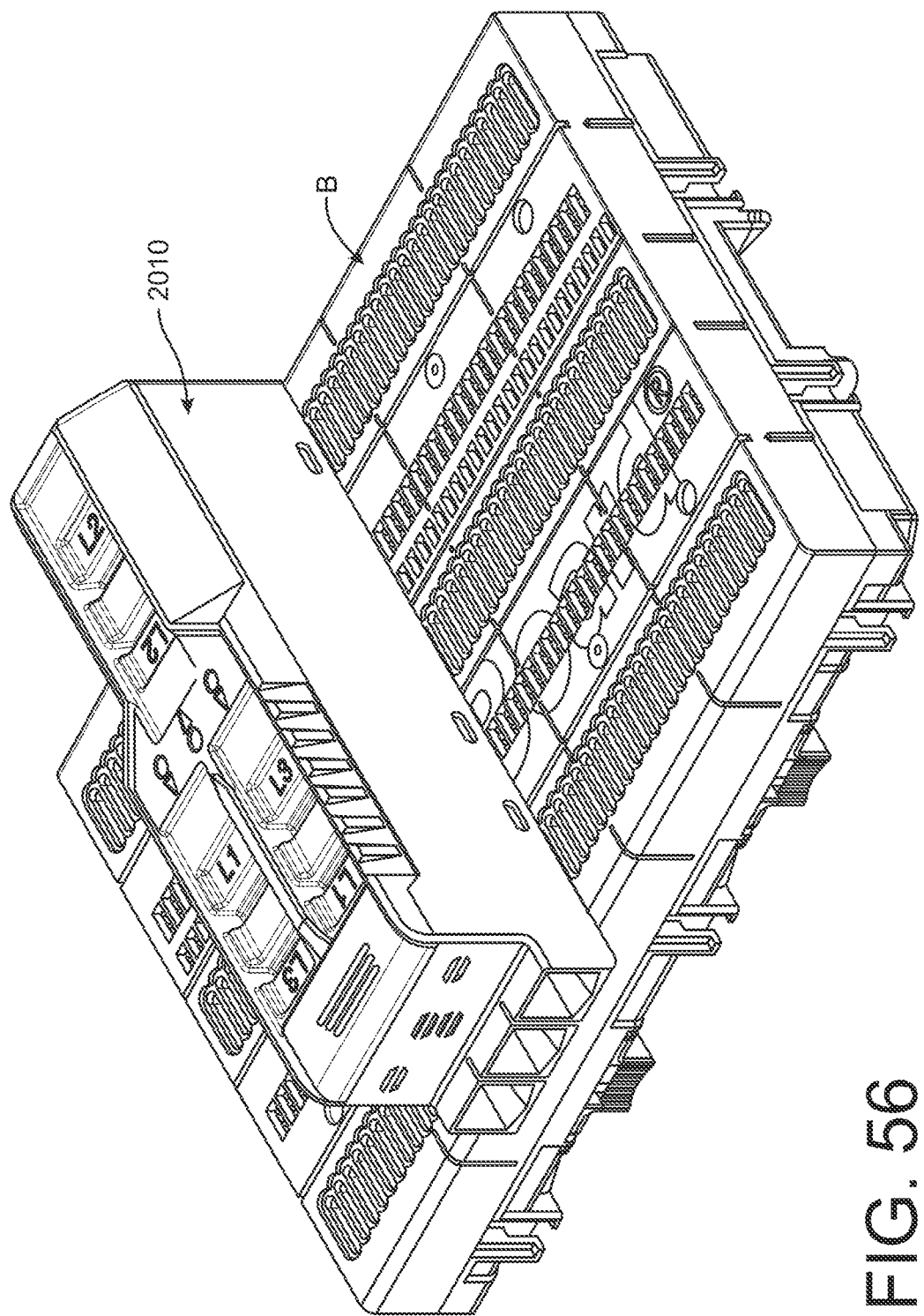
FIG. 56 is a perspective view of the fuse holder of FIG. 47 mounted on a conventional cross-board busbar device.

The fuse holder 2010 shown in FIG. 56 is mounted on a conventional cross-board type busbar device B, in the same manner as the other fuse holders 10 and 1010. In particular, the latches 2037a engage the busbar device and the line conductor contacts are in electrical contact with slots in the device.

Figure 57:
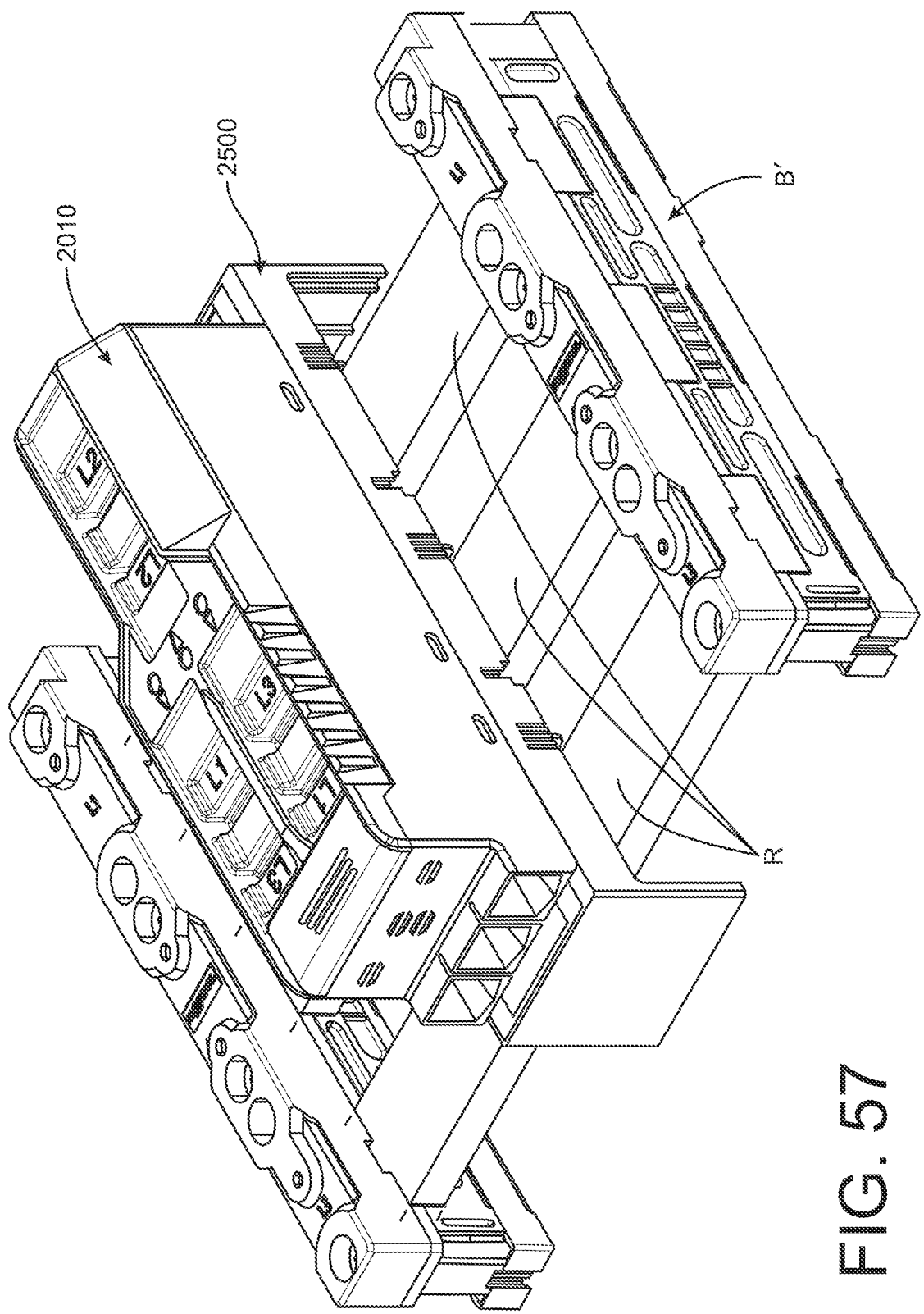
FIG. 57 is a top perspective view of the fuse holder of FIG. 47 mounted on a massive busbar device using an adapter.
Figure 58:
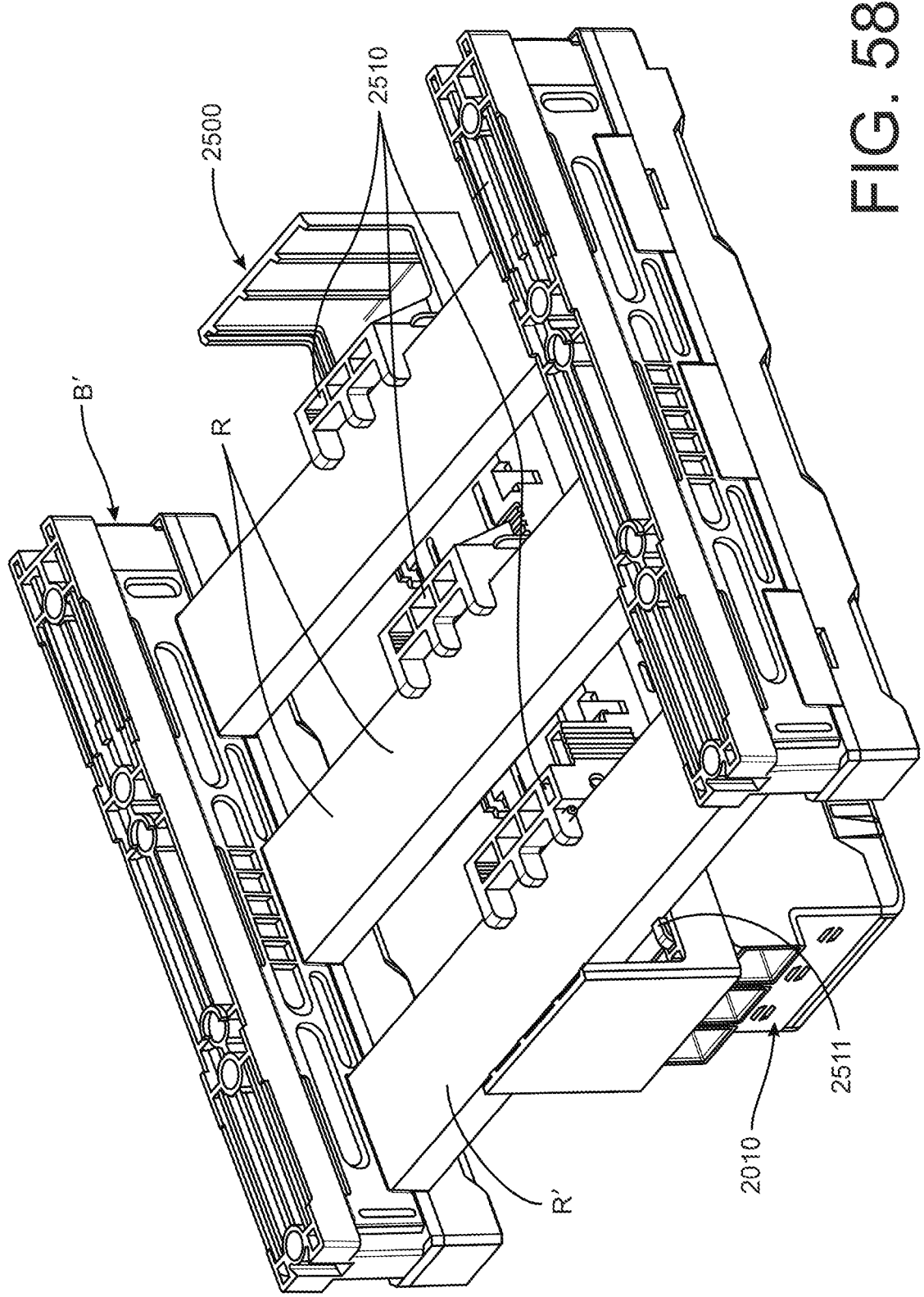
FIG. 58 is a bottom perspective view of the fuse holder and adapter mounted on the massive busbar device of FIG. 57.
Figure 59:
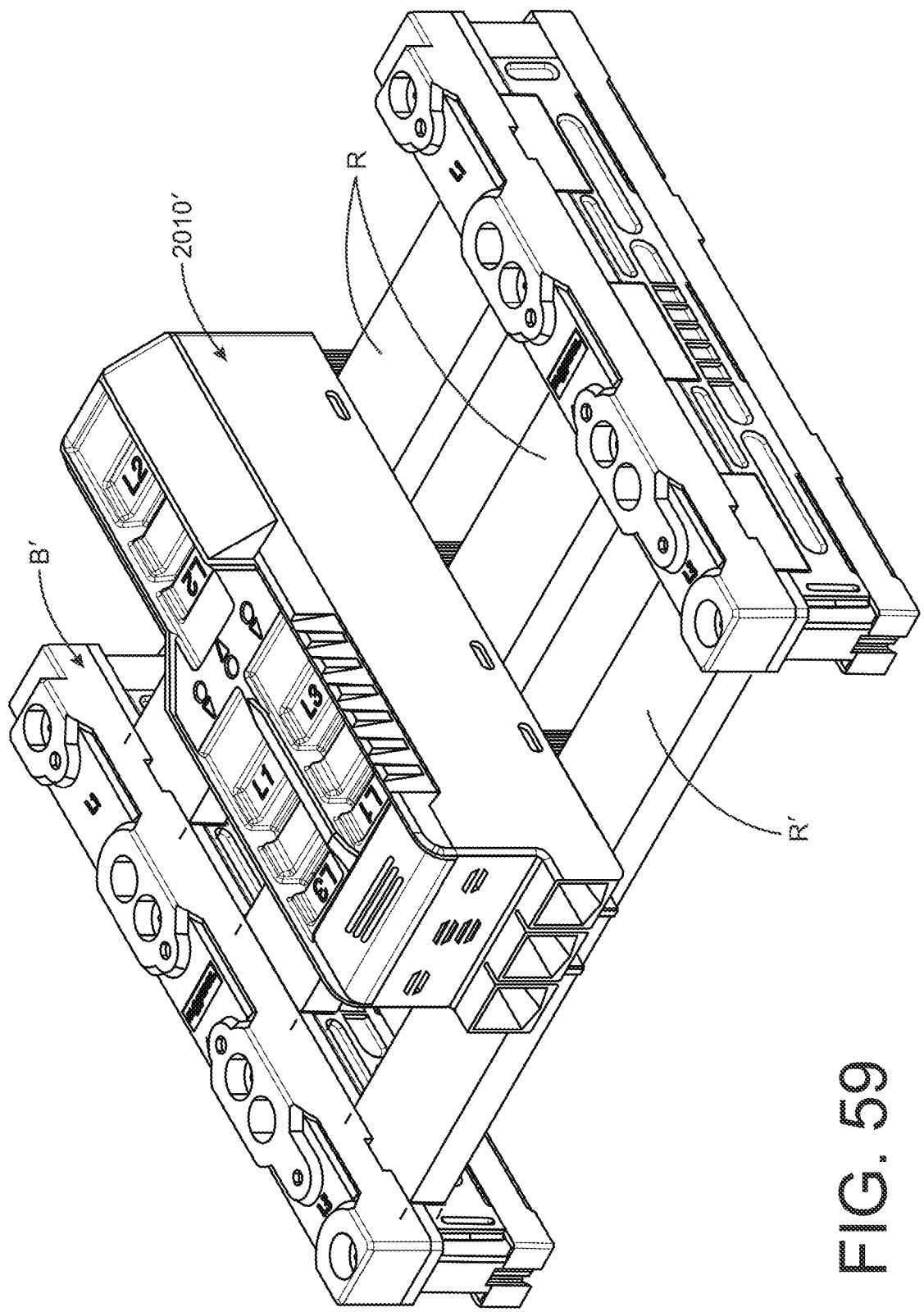
FIG. 59 is a top perspective view of a modified fuse holder mounted directly on a massive busbar device.
Figure 60:
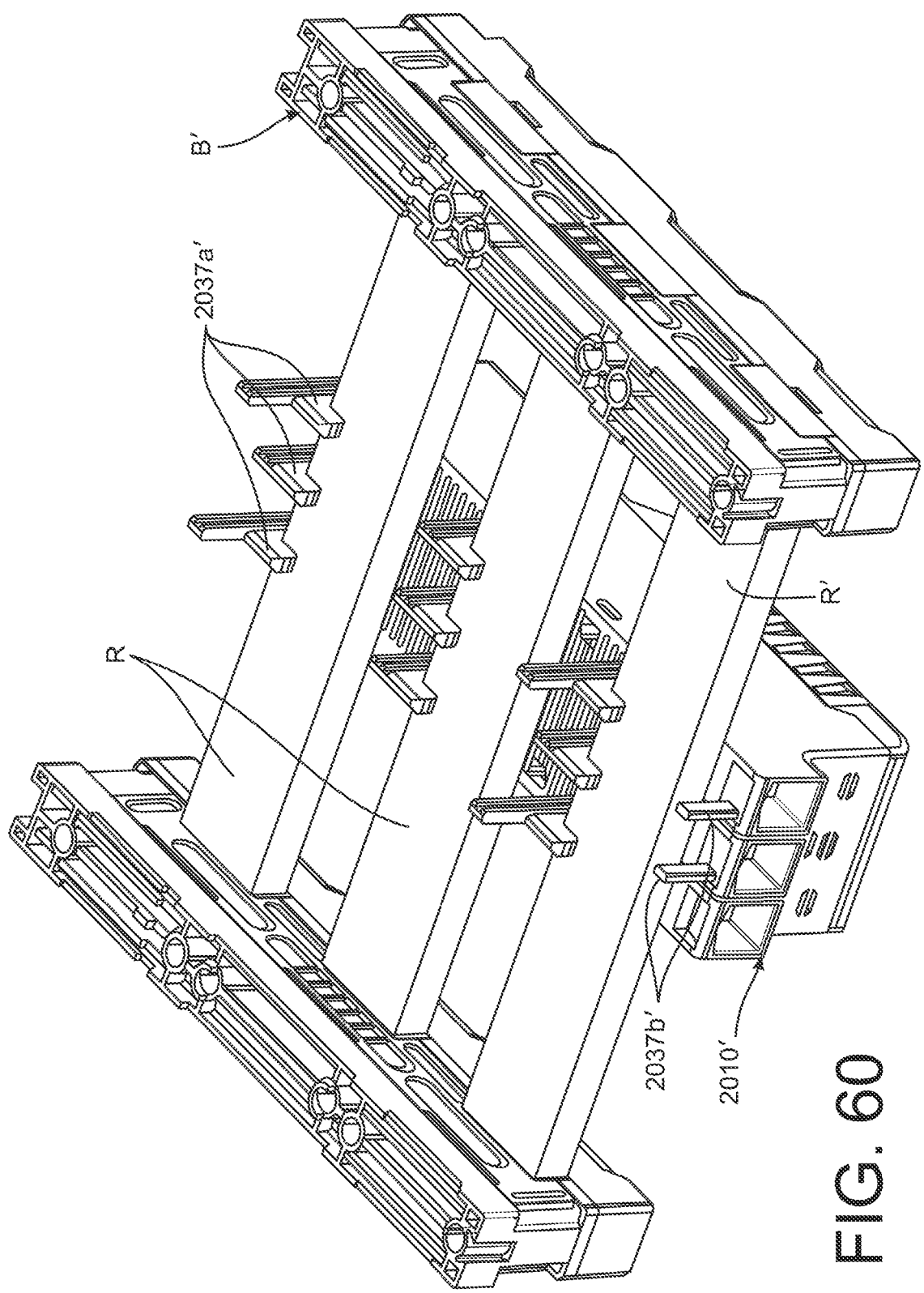
FIG. 60 is a bottom perspective view of the fuse holder mounted on the massive busbar device shown in FIG. 59.
Figure 61:
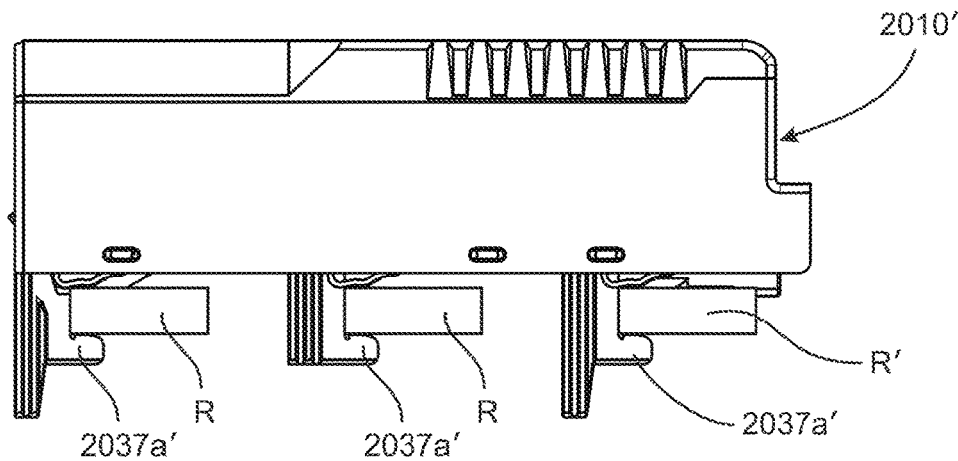
FIG. 61 is a side view of the fuse holder mounted on the massive busbar device shown in FIG. 59.

In FIGS. 57-58, the fuse holder 2010 is shown mounted on a massive busbar device B' that includes large contact rails R for each of the phases. In some cases, the rails R can have a rectangular cross-section of 10 mm×30 mm. In this version, an adapter 2500 is provided on which the fuse holder is directly mounted. The adapter includes an interface similar to the cross-board type busbar device B that is engaged by the latches 2037a to hold the fuse holder on the device with the contacts 2030c-2032c of the line conductor in electrical contact with the contact slots S, as described above. As shown in FIG. 58, the adapter 2500 includes a series of flanges 2510 that slidably engage the rails R of the massive busbar device B'. A pair of latches 2511 at one end of the adapter are configured to releasably engage one rail R' to lock the adapter, and thus the fuse holder 2010, to the busbar device B'. In one embodiment, the latches 2511 are in the form of spring clips that are depressed as the rail R' is moved into engagement with the flange 2510 and that can be depressed to release the adapter 2500 from the rails.

FIGS. 59-64 show a modified fuse holder 2010' that is configured to be mounted directly to the rails R of the massive busbar device B'. In this version, the latch plate 2037 of the fuse holder 2010 is modified to provide a series of flanges 2037a' that are configured to slidably engage the rails R of the busbar device B'. The latch plate is further modified to include a pair of latches 2037b' at one end of the fuse holder that are configured to releasably engage one rail R' to lock the fuse holder 2010' to the busbar device B'.

Figure 62:
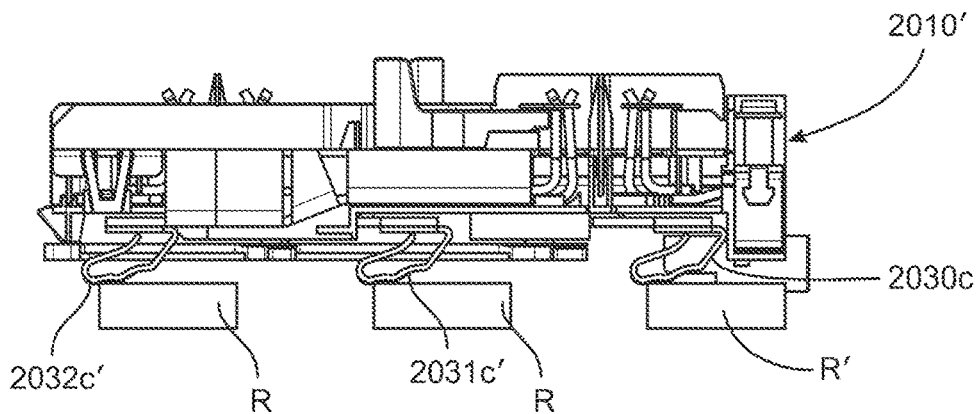
FIG. 62 is a partial cross-section view of the fuse holder shown in FIG. 61.
Figure 63:
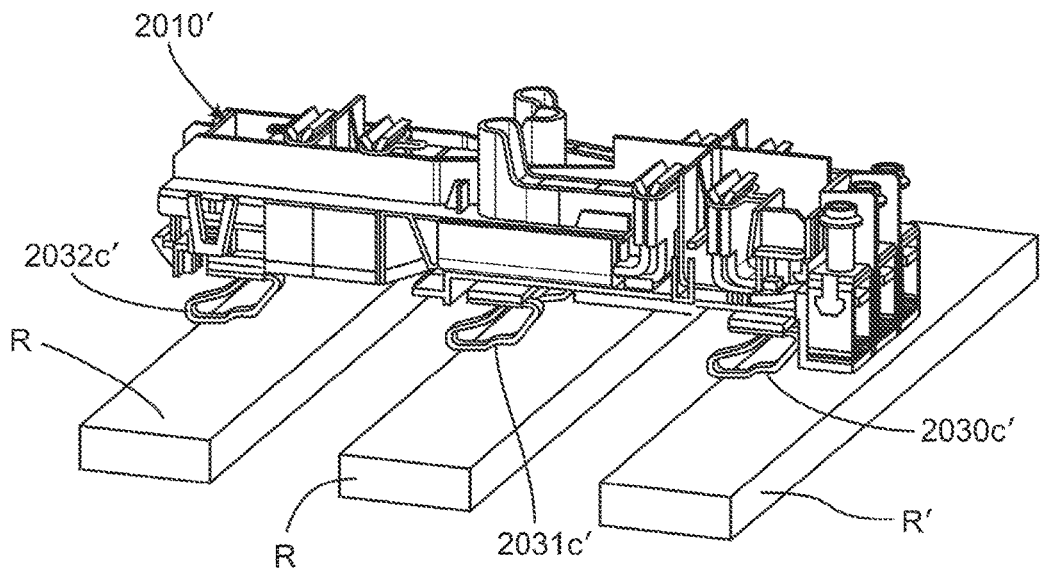
FIG. 63 is a cut-away perspective view of the fuse holder shown in FIG. 61.
Figure 64:
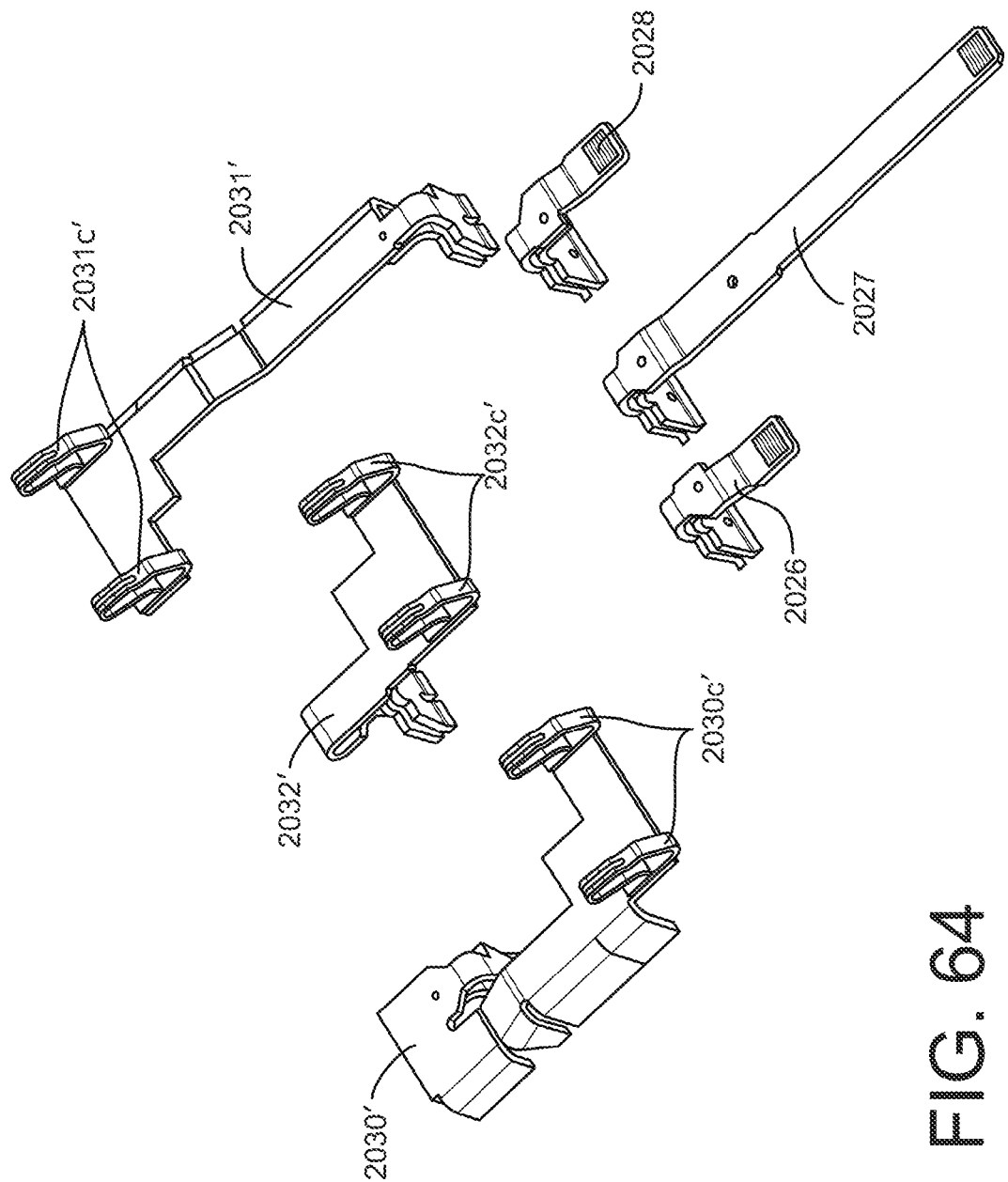
FIG. 64 includes perspective views of the conductors of the fuse holder shown in FIG. 61.

As best shown in FIGS. 62-64, the line conductors 2030', 2031' and 2032' are modified to include contacts specifically configured to engage the rails R, R'. In particular, the busbar contact portions 2030c', 2031c' and 2032c' are spring-type contacts that bear against the rails R, R' when the fuse holder 2010' is engaged to the rails by the flanges 2037a'. As shown in FIG. 64, the line conductors 2030'-2032' are identical to the conductors 2030-2032 except for the modification of the busbar contacts 2030c'-2032c' described above.

The present disclosure should be considered as illustrative and not restrictive in character. It is understood that only certain embodiments have been presented and that all changes, modifications and further applications that come within the spirit of the disclosure are desired to be protected.

What is claimed is:

1. A fuse holder for connecting a fuse, having a pair of knives, to a busbar device, the fuse holder comprising:
    a housing defining;
        a pair of fuse contact openings in a front face of the housing configured to receive the knives of the fuse in a respective one of the contact openings when the fuse is inserted into the fuse holder; and
        a busbar contact opening in a back face of the housing;
    a wire terminal mounted within said housing and accessible for electrical connection with a wire of an external device;
    a line conductor mounted within said housing and including;
        a fuse contact portion aligned with one of the pair of fuse contact openings to contact a knife of the fuse received through said fuse contact opening, and
        a busbar contact portion extending through said busbar contact opening and configured for electrical connection to the busbar device when the fuse holder is mounted on the busbar device;
    a load conductor mounted within said housing and including;
        a fuse contact portion aligned with the other of the pair of fuse contact openings to contact a knife of the fuse received through said fuse contact opening, and
        a terminal contact portion in contact with said wire terminal;
    an engagement mechanism for releasably engaging the fuse holder to the busbar device; and
    a locking mechanism for releasably locking at least one knife of the fuse to the fuse holder.

2. The fuse holder of claim 1, in which at least one knife of the fuse includes an opening therethrough,
    wherein one conductor of said line conductor and said load conductor includes a hole therethrough that is aligned with the hole in the at least one knife of the fuse when the knives are received in the contact openings of the fuse holder; and
    the locking mechanism includes a locking member disposed within said housing and slidable relative to said one conductor, said locking member configured to simultaneously engage the hole in said one conductor and in the hole in the knife when the knives are received in the contact openings of the fuse holder, to prevent removal of the knife from the fuse holder.

3. The fuse holder of claim 2, wherein the locking mechanism includes an elongated carriage slidably disposed within said housing, said carriage including;
    a needle forming said locking member and extending from one end of said carriage that is aligned with said hole in said one conductor and sized to extend through said hole in said one conductor and said hole in said knife in a locking position;
    a spring disposed between said needle and said plate arrangement configured to bias said needle to said locking position.

4. The fuse holder of claim 3, wherein said needle includes a beveled tip that is arranged to be contacted by the knife as the knife is inserted into the fuse holder to push the needle against the spring.

5. The fuse holder of claim 3, wherein said carriage further comprises a cam element disposed at an opposite end of said carriage, said cam element defining a curved surface configured to move said carriage away from said locking position upon engagement with a tool against said curved surface.

6. The fuse holder of claim 1, further comprising a plate arrangement mounted within said housing configured to support, in fixed relation to said housing, said load conductor and said line conductor so that said fuse contact portions of the load conductor and line conductor are each aligned with a corresponding one of said pair of fuse contact openings, said plate arrangement further configured to support said line conductor so that said busbar contact portion extends through said busbar contact opening and to support said load conductor so that said terminal contact portion is in electrical contact with said wire terminal.

7. A fuse holder for connecting a fuse, having a pair of knives, to a busbar device, in which the fuse holder is configured for connecting three fuses to a three-phase electrical line, the fuse holder comprising:
    a housing defining;
        for each of the three fuses, a pair of fuse contact openings in a front face of the housing configured to receive the knives of the fuse in a respective one of the contact openings when the corresponding fuse is inserted into the fuse holder; and
        a busbar contact opening in a back face of the housing;
    a wire terminal mounted within said housing and accessible for electrical connection with a wire of an external device;
    for each of the three fuses, a line conductor mounted within said housing and including;

a fuse contact portion aligned with one of the pair of fuse contact openings to contact a knife of the corresponding fuse received through said fuse contact opening, and a busbar contact portion extending through said busbar contact opening and configured for electrical connection to the busbar device when the fuse holder is mounted on the busbar device;

for each of the three fuses, a load conductor mounted within said housing and including;

a fuse contact portion aligned with the other of the pair of fuse contact openings to contact a knife of the corresponding fuse received through said fuse contact opening, and a terminal contact portion in contact with said wire terminal; and an engagement mechanism for releasably engaging the fuse holder to the busbar device, wherein the line conductors for each of the three phases are configured so that the busbar contact portions of the line conductors are vertically separated along a length of said housing for electrical engagement to the busbar device.

8. The fuse holder of claim 7, wherein said load conductor and said line conductor for two of the three phases are configured so that the corresponding fuse contact portions are laterally adjacent each other; and said load conductor and said line conductor for the third of the three phases is configured so that the corresponding fuse contact portions are vertically adjacent the corresponding fuse contact portions for the other two phases along the length of the housing.

9. The fuse holder of claim 7, wherein said housing defines, for each of the three fuses, a fuse bay including a recess in a front face of said housing configured to receive the corresponding fuse therein, said pair of fuse contact openings for each of the three fuses arranged in a corresponding recess.

10. The fuse holder of claim 9, wherein said fuse bay for each of the three phases includes indicia indicative of the corresponding one of the three phases.

11. A fuse holder of claim 1, further comprising:

a plate arrangement mounted within said housing configured to support, in fixed relation to said housing, said load conductor and said line conductor so that said fuse contact portions of the load and line conductors are each aligned with a corresponding one of the pair of fuse contact openings, said plate arrangement further configured to support said line conductor so that said busbar contact portion extends through said busbar contact opening and to support said load conductor so that said terminal contact portion is in electrical contact with said wire terminal;

wherein said locking mechanism includes;

a carriage slidably disposed within said housing and including a spring plate and pair of clamping plates, one each of the clamping plates facing the fuse contact portion of a corresponding one of the line conductor and the load conductor; and a biasing spring disposed between said plate arrangement and said spring plate, said biasing spring configured to exert a spring force on said spring plate of said carriage to bias said clamping plates toward the fuse contact portions of the corresponding line and load conductor;

wherein the fuse contact openings are arranged so that, when the fuse is inserted into the fuse holder, each of the pair of knives of the fuse is inserted between and in frictional engagement with the fuse contact portion, of a corresponding one of the line conductor and the load conductor, and a corresponding one of said clamping plates, to thereby move the carriage against the spring force exerted on the carriage.

12. The fuse holder of claim 11, further comprising:

a tool opening defined in said housing; and a release post on said carriage, said release post accessible by an elongated tool extending through said tool opening, said release post configured to move said carriage against the spring force exerted on the carriage to move said pair of clamping plates away from the fuse contact portions.

13. The fuse holder of claim 12 wherein said release post and said tool opening are physically remote from the line and load conductors so that a tool extending through said tool opening to access said release post cannot contact the line and load conductors.

14. A fuse holder for connecting a fuse, having a pair of knives, to a busbar device, comprising:

a housing defining;

a pair of fuse contact openings in a front face of the housing configured to receive the knives of the fuse in a respective one of the contact openings when the fuse is inserted into the fuse holder;

a busbar contact opening in a back face of the housing;

an ejector opening defined in said housing;

an ejector slidably mounted in the ejector opening to contact the fuse when the fuse is inserted into the fuse holder; and an ejector spring mounted within the housing to push the ejector through the ejector opening and against the fuse, said spring configured to push the ejector outward relative to the ejector opening against the fuse to dislodge the fuse from the fuse holder;

a wire terminal mounted within said housing and accessible for electrical connection with a wire of an external device;

a line conductor mounted within said housing and including;

a fuse contact portion aligned with one of the pair of fuse contact openings to contact a knife of the fuse received through said fuse contact opening, and a busbar contact portion extending through said busbar contact opening and configured for electrical connection to the busbar device when the fuse holder is mounted on the busbar device;

a load conductor mounted within said housing and including;

a fuse contact portion aligned with the other of the pair of fuse contact openings to contact a knife of the fuse received through said fuse contact opening, and a terminal contact portion in contact with said wire terminal;

an engagement mechanism for releasably engaging the fuse holder to the busbar device.

15. The fuse holder of claim 14, wherein said ejector opening is arranged between said pair of fuse contact openings defined in said housing.

16. The fuse holder of claim 11, wherein biasing spring is configured to generate a clamping force of 50-150 N to clamp each of the pair of knives between the corresponding fuse contact portion and the corresponding clamping plate.

* * * * *